(12) United States Patent
Brooks et al.

(10) Patent No.: US 8,854,728 B1
(45) Date of Patent: Oct. 7, 2014

(54) ENDCAPS FOR HOLLOW-CORE OPTICAL FIBERS AND METHOD

(71) Applicant: Lockheed Martin Corporation, Bethesda, MD (US)

(72) Inventors: Christopher D. Brooks, San Francisco, CA (US); Fabio Di Teodoro, Lawndale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/927,081

(22) Filed: Jun. 25, 2013

Related U.S. Application Data

(62) Division of application No. 13/043,342, filed on Mar. 8, 2011, now Pat. No. 8,472,763, which is a division of application No. 11/420,751, filed on May 27, 2006, now Pat. No. 7,941,019, which is a division of application No. 11/420,729, filed on May 26, 2006, now Pat. No. 7,391,561.

(60) Provisional application No. 60/797,931, filed on May 5, 2006, provisional application No. 60/746,166, filed on May 1, 2006, provisional application No. 60/703,822, filed on Jul. 29, 2005.

(51) Int. Cl.
*H01S 3/067* (2006.01)

(52) U.S. Cl.
USPC .......................................... 359/341.1; 385/76

(58) Field of Classification Search
USPC ..................... 359/341.1; 385/87, 77, 76, 84
See application file for complete search history.

(56) References Cited

U.S. PATENT DOCUMENTS

| | | | |
|---|---|---|---|
| 7,165,861 B2 * | 1/2007 | Wickart | 362/154 |
| 2007/0014528 A1 * | 1/2007 | Busse et al. | 385/139 |
| 2008/0159702 A1 * | 7/2008 | Skovgaard et al. | 385/125 |

* cited by examiner

*Primary Examiner* — Mark Hellner
(74) *Attorney, Agent, or Firm* — Charles A. Lemaire; Jonathan M. Rixen; Lemaire Patent Law Firm, P.L.L.C.

(57) ABSTRACT

A method and apparatus use a photonic-crystal fiber having a very large core while maintaining a single transverse mode. In some fiber lasers and amplifiers having large cores problems exist related to energy being generated at multiple-modes (i.e., polygamy), and of mode hopping (i.e., promiscuity) due to limited control of energy levels and fluctuations. The problems of multiple-modes and mode hopping result from the use of large-diameter waveguides, and are addressed by the invention. This is especially true in lasers using large amounts of energy (i.e., lasers in the one-megawatt or more range). By using multiple small waveguides in parallel, large amounts of energy can be passed through a laser, but with better control such that the aforementioned problems can be reduced. An additional advantage is that the polarization of the light can be maintained better than by using a single fiber core.

20 Claims, 17 Drawing Sheets

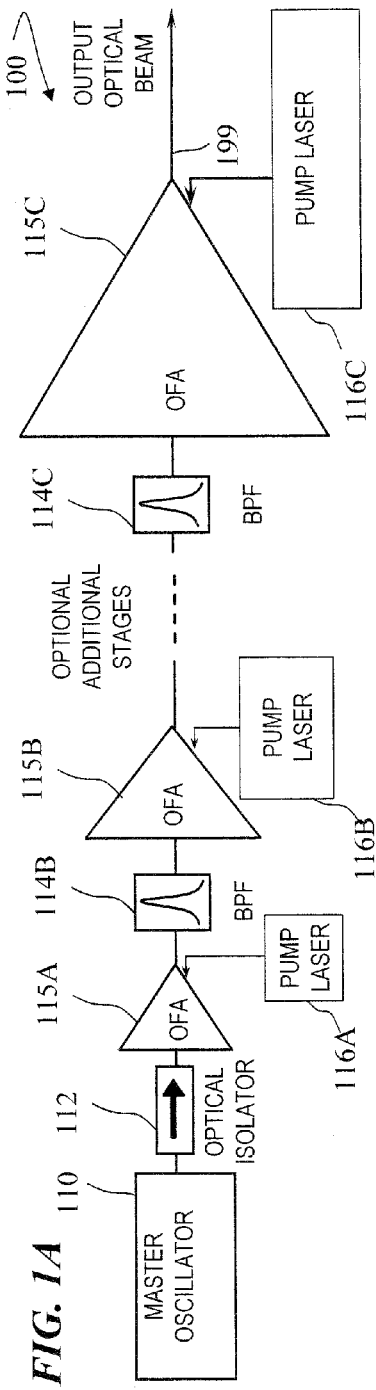
*FIG. 1A*
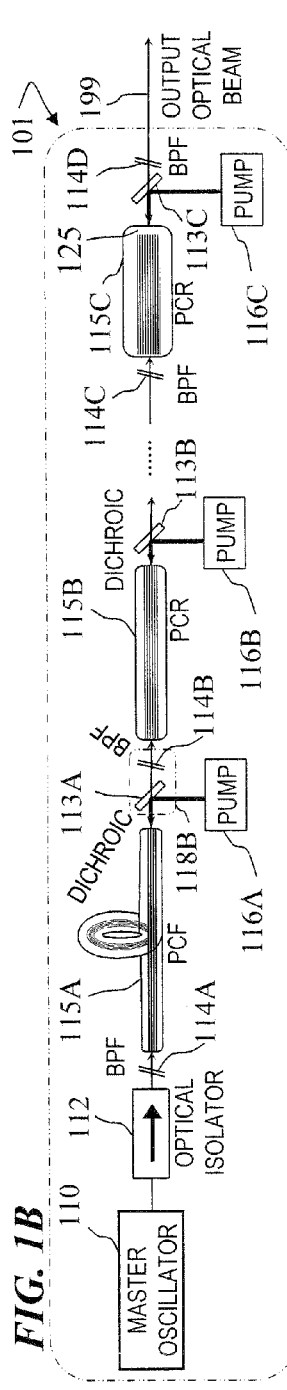
*FIG. 1B*
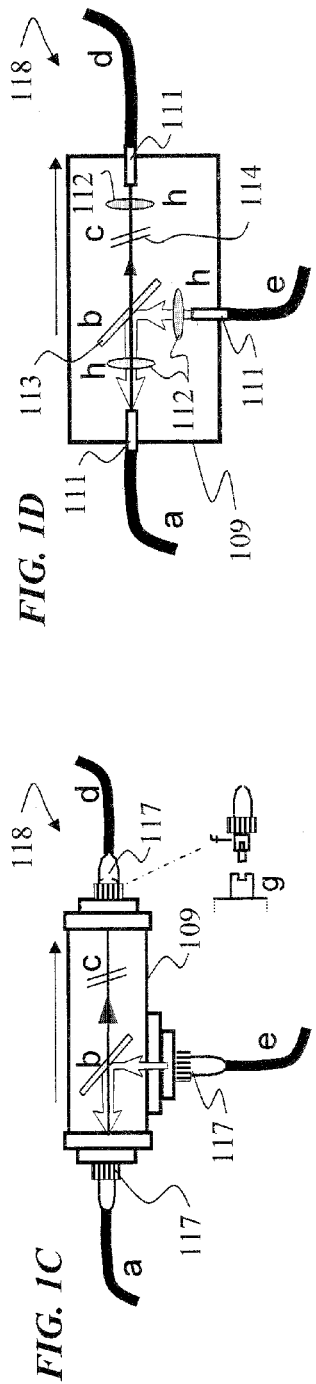
*FIG. 1C*
*FIG. 1D*

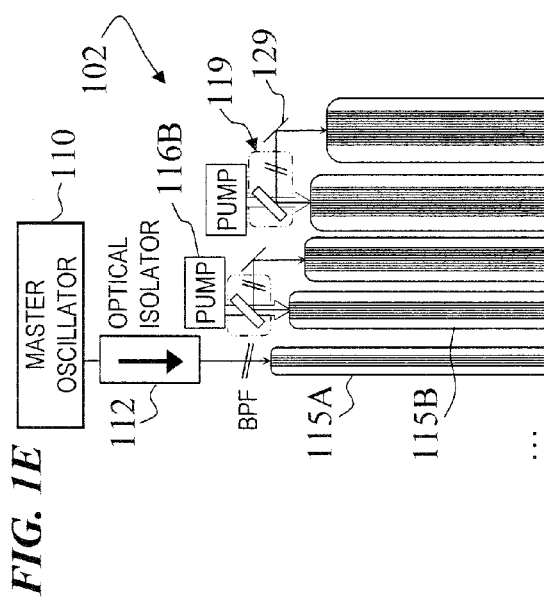

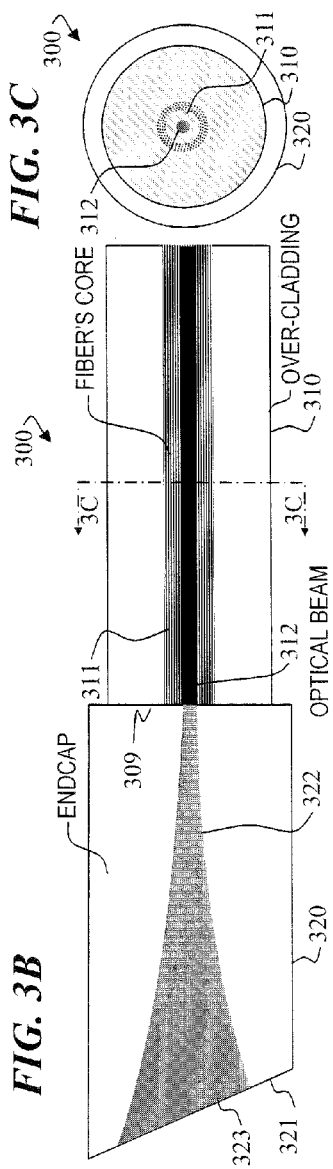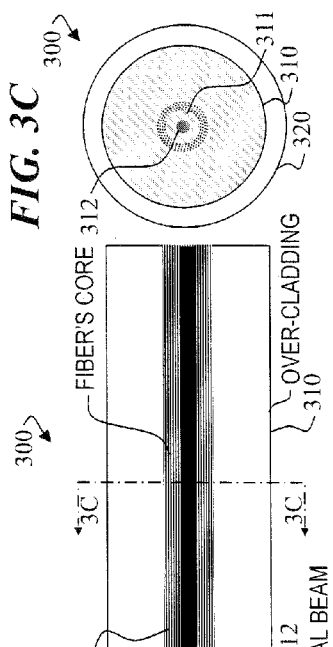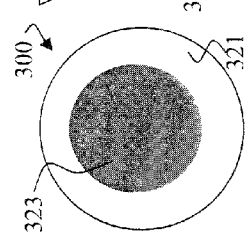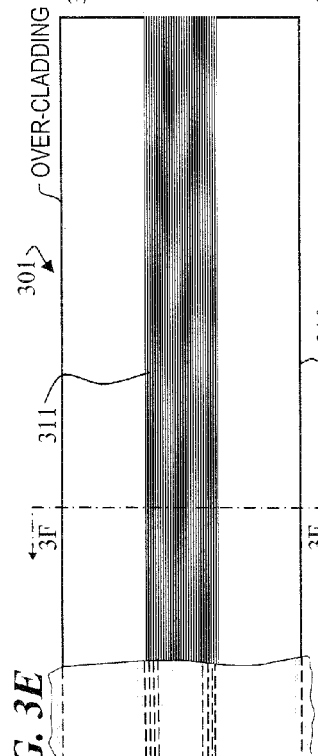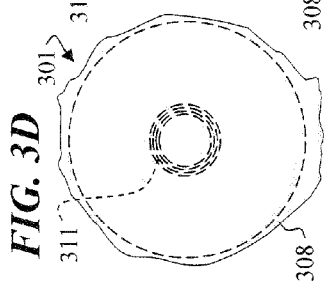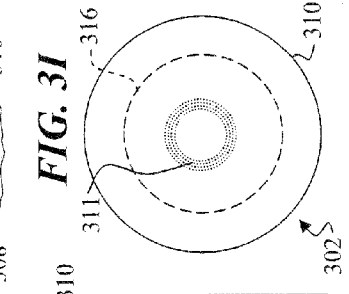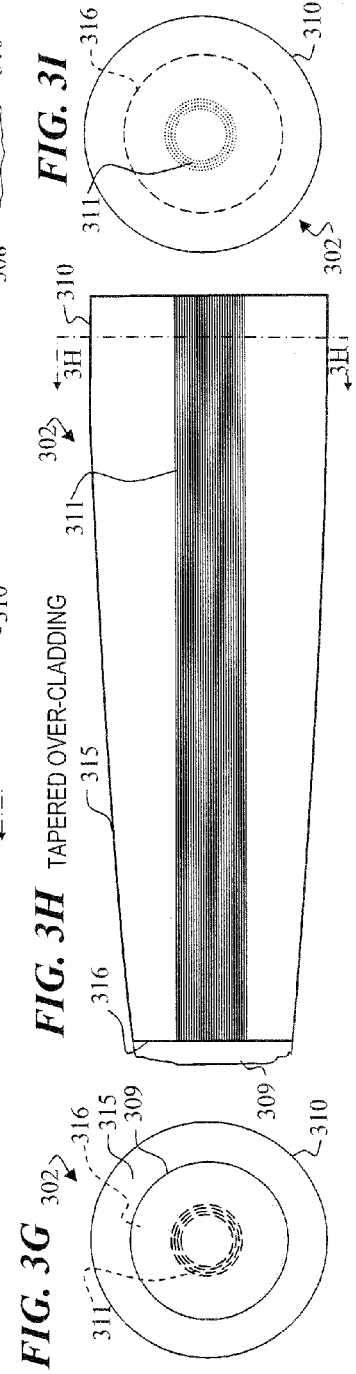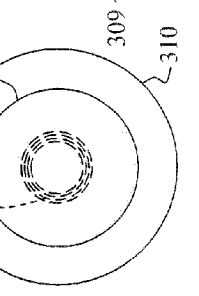

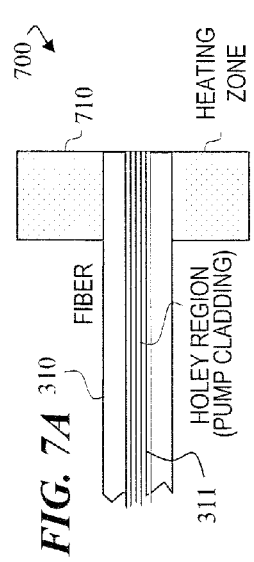

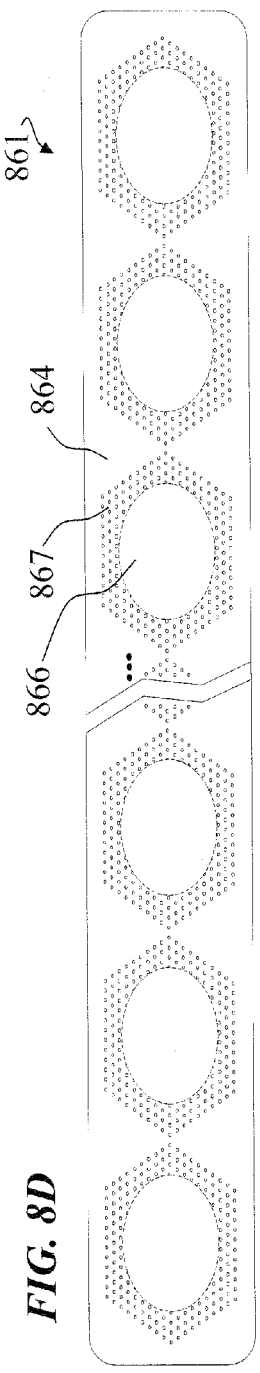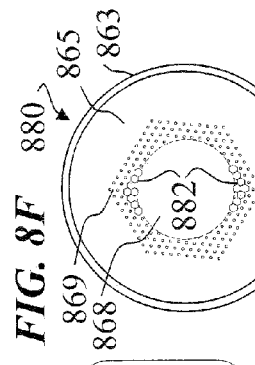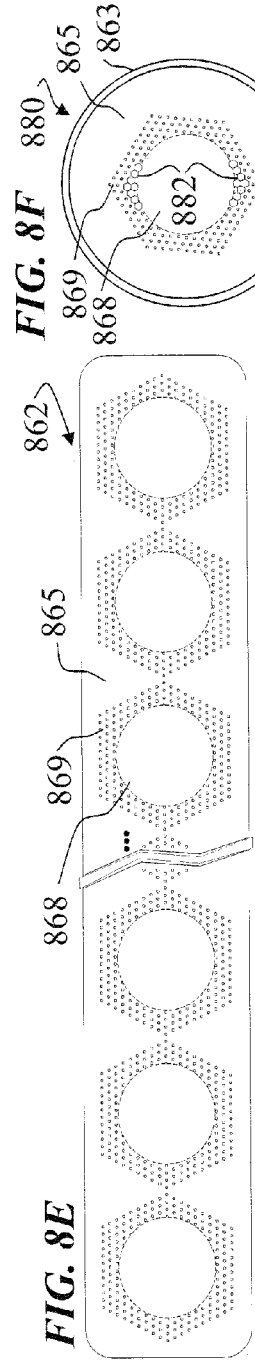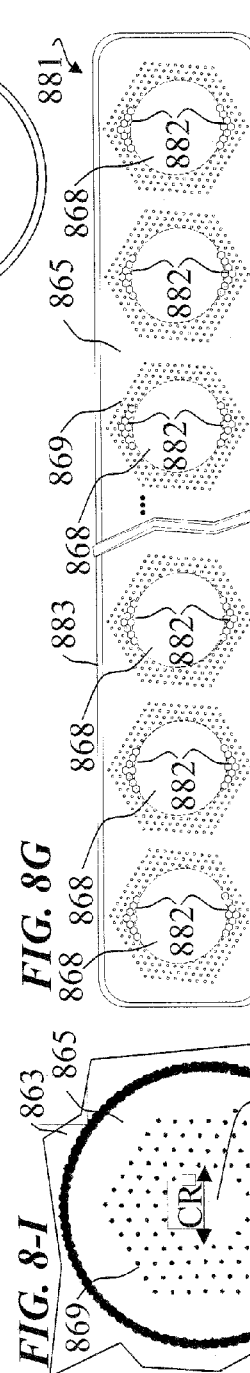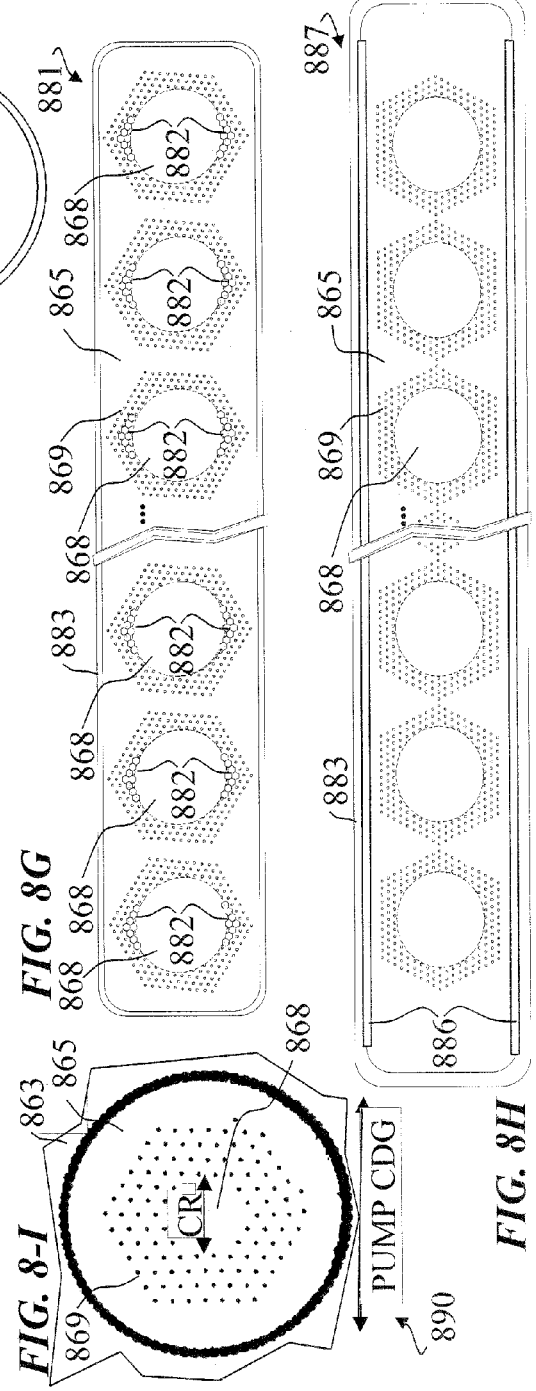
FIG. 8D  FIG. 8E  FIG. 8F  FIG. 8G  FIG. 8H  FIG. 8I

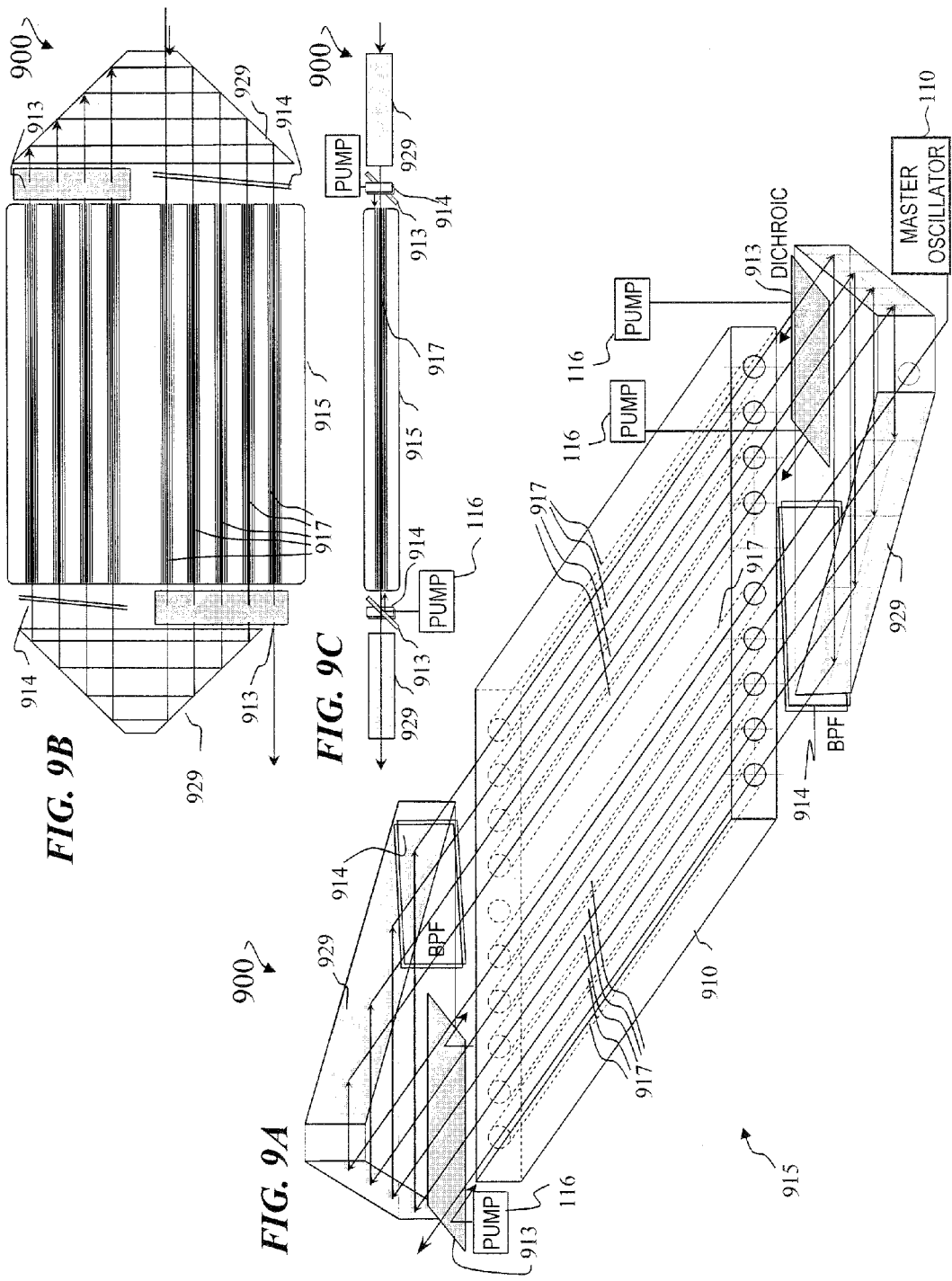

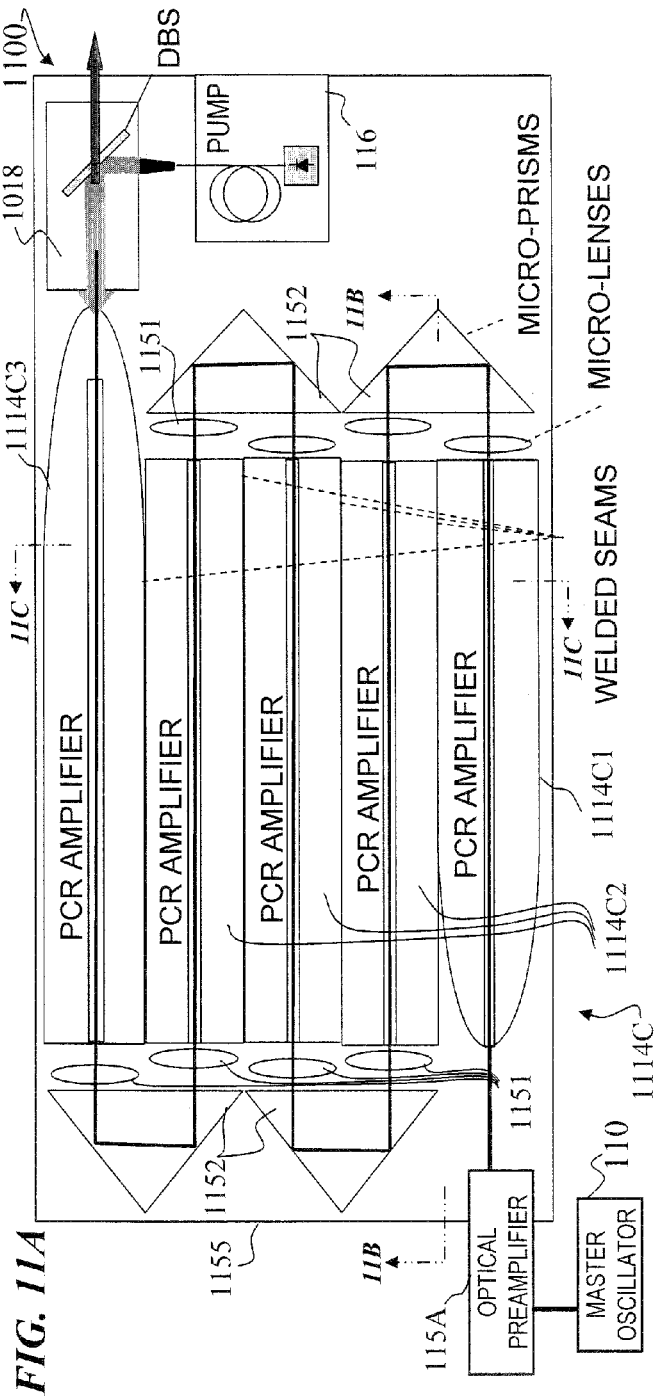
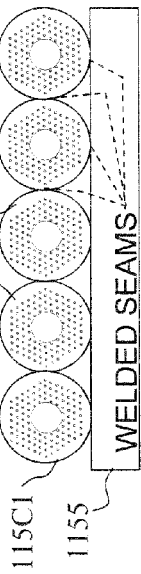
*FIG. 11A*
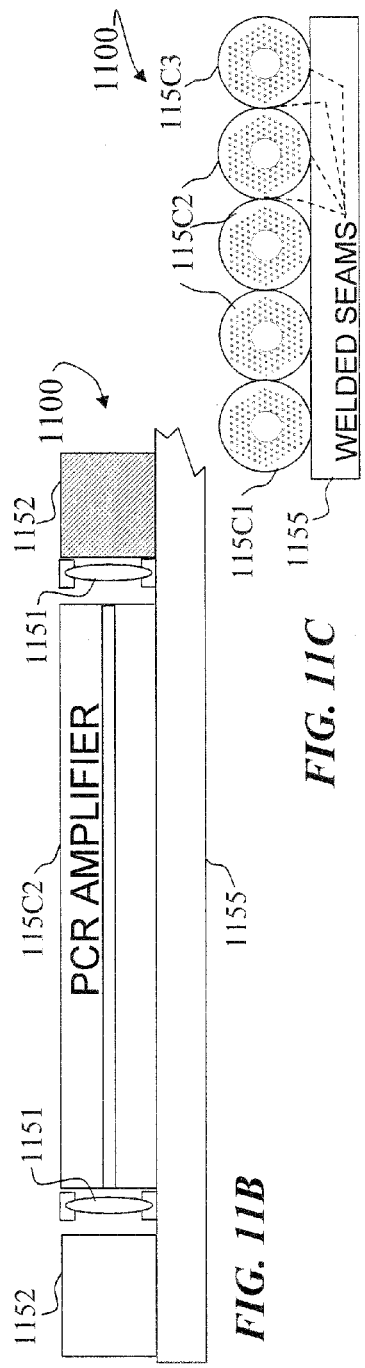
*FIG. 11B*
*FIG. 11C*

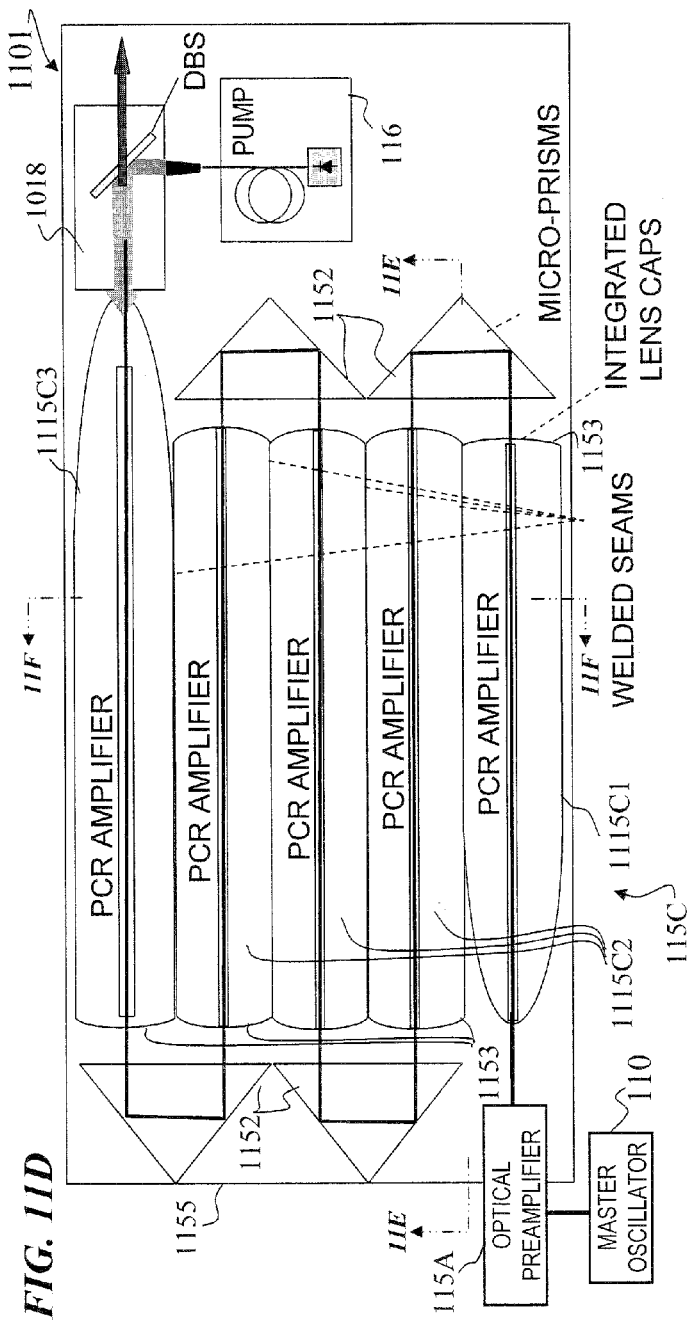
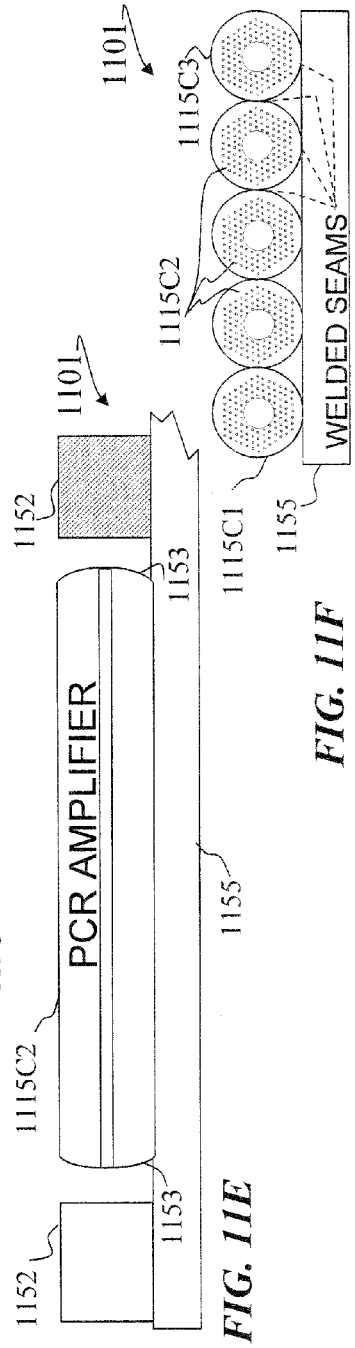
FIG. 11D
FIG. 11E
FIG. 11F

FIG. 11-I

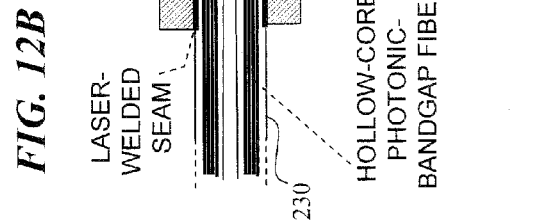
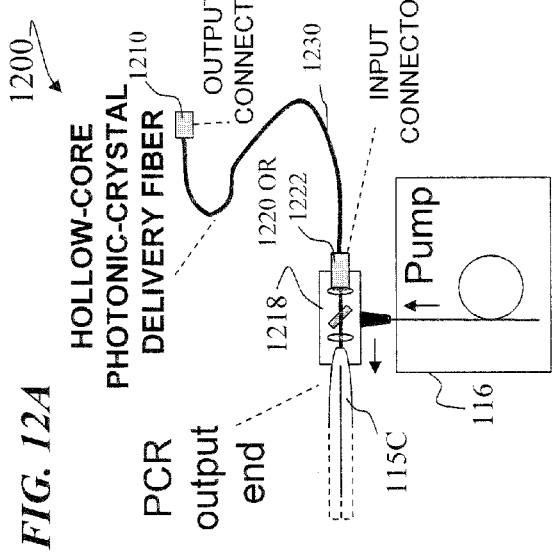
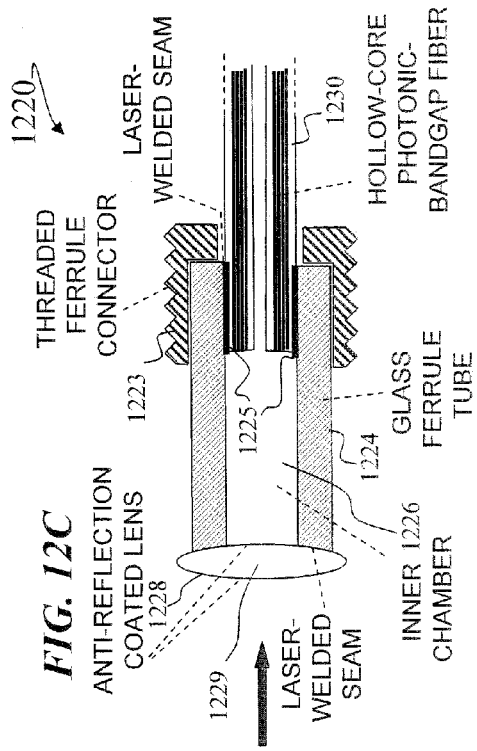
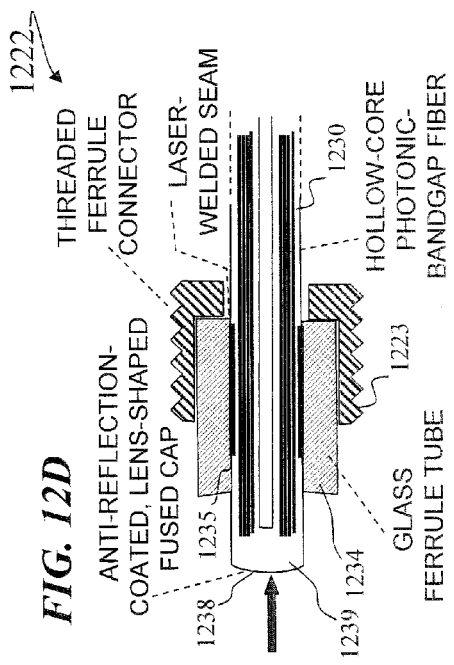

ENDCAPS FOR HOLLOW-CORE OPTICAL FIBERS AND METHOD

CROSS-REFERENCE TO RELATED APPLICATIONS

This is a divisional of U.S. patent application Ser. No. 13/043,342 entitled "SPECTRAL BEAM COMBINATION OF LASER BEAMS," filed on Mar. 8, 2011 (which issued as U.S. Pat. No. 8,472,763 on Jun. 25, 2013), which is a divisional of U.S. patent application Ser. No. 11/420,751 entitled "MONOLITHIC PUMP BLOCK FOR OPTICAL AMPLIFIERS AND ASSOCIATED METHOD" filed on May 27, 2006 (which issued as U.S. Pat. No. 7,941,019 on May 10, 2011), which was a divisional of U.S. patent application Ser. No. 11/420,729 entitled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" filed on May 26, 2006 (which issued as U.S. Pat. No. 7,391,561 on Jun. 24, 2008), which claimed benefit of U.S. Provisional Patent Application 60/703,822 filed on Jul. 29, 2005, titled "FIBER-BASED OPTICAL SOURCE FEATURING A LARGE-CORE, RARE-EARTH-DOPED PHOTONIC CRYSTAL FIBER FOR GENERATION OF HIGH POWER PULSED RADIATION," and U.S. Provisional Patent Application 60/746,166 filed on May 1, 2006, titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD," and U.S. Provisional Patent Application 60/797,931 filed on May 5, 2006, titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD," each of which is incorporated herein by reference in its entirety. This application is also related to U.S. patent application Ser. No. 11/420,730 entitled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD" filed on May 26, 2006 (which issued as U.S. Pat. No. 7,430,352 on Sep. 30, 2008), which is incorporated herein by reference in its entirety.

STATEMENT REGARDING FEDERALLY SPONSORED RESEARCH OR DEVELOPMENT

This invention was made with Government support under contract FA9451-04-D-0412/0001 awarded by the U.S. Air Force. The Government has certain rights in the invention.

FIELD OF THE INVENTION

The invention relates generally to high-power optical amplifiers and lasers and more particularly to methods and apparatus applicable for photonic-crystal optical fibers and similar structures suitable for very high peak-power and average-power optical output, near-diffraction-limited beam quality, multi-kHz pulse-repetition rate, highly controlled spectral properties including narrow line width and high signal-to-noise ratios.

BACKGROUND OF THE INVENTION

Rare-earth (RE) doped, pulsed fiber lasers and amplifiers constitute efficient and compact optical sources that can emit a diffraction-limited Gaussian beam of highly controlled spectral quality. The output power generated by these sources is limited, however, by parasitic nonlinear optical effects, amplified spontaneous emission, and damage to optical components due to high optical power.

Nonlinear effects include stimulated Brillouin and Raman scattering (SBS and SRS), self- and cross-phase modulation (SPM and XPM), and four-wave mixing (FWM). The common origin of these effects is the high optical intensity in the fiber core and long path for the nonlinear interaction between the in-fiber optical beam and fiber material (e.g., silica). These effects hamper in particular the generation of high-peak-power pulses by causing unwanted spectral broadening, distortion of the pulse temporal profile, and sudden power instabilities that result in optical damages.

The build-up of amplified spontaneous emission (ASE) is due to the high optical gain available in the fiber core in the time interval between pulses. ASE constitutes an unwanted continuous-wave (CW) noise, which degrades the pulse/background contrast and, most importantly, limits the attainable pulse energy by using up gain.

Finally, optical damages can occur in the fiber because of material breakdown in the presence of high optical intensities. The fiber facets are especially vulnerable because exposed to potential contaminants and subject to defects that can initiate damage.

There is a need for fiber lasers and optical amplifiers configured to emit pulses of considerably higher energy and peak power than currently available. These sources must be designed so as to circumvent the limitations described above.

SUMMARY OF THE INVENTION

In some embodiments, the present invention provides one or more optical-pulse amplifiers based on photonic-crystal-fiber technology, which simultaneously provide one or more of the following: pulse peak power in excess of 1 megawatt (MW), near-diffraction-limited beam quality ($M^2 < 1.5$), multi-kHz pulse-repetition rate, and highly controlled spectral properties that include, in some embodiments, pulse linewidth of 50 GHz or less and signal-to-noise ratio of 30 dB or more. $M^2$ is a widely used dimensionless beam-propagation-quality parameter and the definition adopted hereafter is the same provided in the current ISO Standard for beam quality characterization (ISO 11146). For a pure Gaussian beam, $M^2 = 1$. In this document, signal-to-noise ratio is defined as the intensity ratio between the pulse's spectral peak and that of background radiation at wavelengths other than those of the pulse.

In some embodiments, the present invention provides pulsed fiber lasers and amplifiers for applications that require pulses that are a few nanoseconds long at multi-kHz pulse-repetition rates (PRR), exhibiting one or more of the following characteristics: high peak power (useful for applications such as, e.g., wavelength conversion, materials processing, and ranging), high pulse energy (useful for applications such as, e.g., illumination and imaging), and narrow spectral linewidth (useful for applications such as, e.g., remote sensing and wavelength conversion). The present invention provides fiber-based sources that generate higher pulse energies and peak powers than are conventionally available, while also achieving compactness, efficiency, and high beam quality.

In some embodiments, the present invention provides high-power pulsed fiber lasers and amplifiers based on photonic-crystal-fiber technology, which produce high peak power (>500 kilowatt (kW)) linearly polarized output beams of near-diffraction-limited beam quality and narrow spectral linewidth that can be effectively used for generation of high-peak-power visible and ultraviolet radiation by means of frequency conversion in nonlinear crystals. In some embodiments, the outputs from several linearly polarized, spectrally narrow, high-peak-power fiber lasers and/or amplifiers based on the same technology and arranged in a suitable pattern can be combined spectrally by using an external dispersive optical element to produce a beam of near-diffraction-limited beam quality and peak power/pulse energy approximately equal to the sum of the peak powers/pulse energies from each individual fiber laser/amplifier. The benefit of this beam-combination scheme is that it produces a peak power in a single beam that is much higher than the damage threshold for an individual fiber.

Optical fibers are waveguides, in which a certain number of transverse modes of radiation can exist and propagate with low loss. Different transverse modes correspond to different transverse profiles of optical intensity. In step-index fibers, the fundamental mode profile is very similar to a Gaussian. Fibers that support only this mode (usually referred to as "single-mode fibers") inherently produce the best beam quality. For a given refractive index step between core and cladding, the number of transverse modes supported by a fiber is proportional to the core diameter. Therefore, large-core fibers tend to be multimode, which degrades the beam quality.

Moreover, in multimode fibers, thermal and mechanical perturbations can effect uncontrolled changes in the mode pattern and beam pointing. In large-core RE-doped fibers, different modes exhibit different spatial overlap with the dopant distribution, and hence different modes experience different gain, therefore sudden mode pattern changes result in power instabilities. These instabilities can also result in sudden intensity spikes that damage the fiber facet or body, especially in fiber lasers/amplifiers emitting high peak power (e.g., in the range of 1 MW or higher). The present invention addresses these problems, among others.

BRIEF DESCRIPTION OF THE FIGURES

FIG. 1A is a block diagram of a master-oscillator/power-amplifier (MOPA) system 100 having high-peak-power optical amplifiers including one or more gain stages, pump blocks and rare-earth-doped photonic-crystal-fiber (PCF) power amplifiers.

FIG. 1B is a schematic diagram of a system 101 having high-peak-power optical amplifiers including one or more gain stages, pump blocks and rare-earth-doped photonic-crystal-fiber (PCF) power amplifiers.

FIG. 1C is a block diagram of a pump block 118.

FIG. 1D is a schematic diagram of a pump block 118.

FIG. 1E is a schematic diagram of a compact system 102 having high-peak-power rare-earth-doped photonic-crystal-fiber (PCF)/photonic-crystal-rod (PCR) optical power amplifiers.

FIG. 1F is a schematic diagram of a compact system 103 having high-peak-power rare-earth-doped PCF/PCR optical power amplifiers.

FIG. 1G is a schematic diagram of a pump block 119.

FIG. 1H is a schematic diagram of a compact system 104 having high-peak-power rare-earth-doped PCF/PCR optical amplifiers.

FIG. 1I is a schematic diagram of a pump block 121.

FIG. 2 is a schematic diagram of a high-peak-power rare-earth-doped photonic-crystal-rod optical power amplifier 200.

FIG. 3A is an end-view schematic diagram of a high-peak-power rare-earth-doped photonic-crystal rod 300 having a beam-expanding endcap.

FIG. 3B is a side-view schematic diagram of PCR 300 having a beam-expanding endcap.

FIG. 3C is a cross-section schematic diagram of PCR 300 having a beam-expanding endcap.

FIG. 3D is an end-view schematic diagram of a high-peak-power rare-earth-doped photonic-crystal rod 301 partially fabricated into having a beam-expanding endcap.

FIG. 3E is a side-view schematic diagram of PCR 301.

FIG. 3F is a cross-section schematic diagram of PCR 301.

FIG. 3G is an end-view schematic diagram of a high-peak-power rare-earth-doped photonic-crystal rod 302 partially fabricated into having a beam-expanding endcap after tapering.

FIG. 3H is a side-view schematic diagram of PCR 302.

FIG. 3I is a cross-section schematic diagram of PCR 302.

FIG. 7A is a side-view block diagram of a system 700 for forming a beam-expanding endcap onto high-peak-power rare-earth-doped photonic-crystal rod 310 at a time before collapsing the holey region of the endcap.

FIG. 7B is a side-view block diagram of a system 700 at a time after collapsing the end portion of the holey region of the endcap.

FIG. 7C is a side-view block diagram of a system 700 at a time after moving the endcap further into the heating region.

FIG. 7D is a side-view block diagram of a system 700 at a time after further collapsing the end portion of the holey region of the endcap.

FIG. 7E is a side-view block diagram of photonic-crystal rod 310 at a time after collapsing the holey region of the endcap and angle-polishing the end.

FIG. 7F is an end-view block diagram of a system 700.

FIG. 7G is an end-view block diagram of a system 701 for forming a beam-expanding endcap onto ribbon-like high-peak-power rare-earth-doped photonic-crystal rod.

FIG. 8D is a cross-section-view schematic diagram of a preform 861 configured to compensate for lateral shrinkage in later forming of a ribbon-like high-peak-power rare-earth-doped photonic-crystal rod inner-cladding/core portion 862.

FIG. 8E is a cross-section-view schematic diagram of a ribbon-like high-peak-power rare-earth-doped photonic-crystal-rod inner-cladding/core portion 862.

FIG. 8F is a cross-section-view schematic diagram of a polarizing high-peak-power rare-earth-doped photonic-crystal rod 880.

FIG. 8G is a cross-section-view schematic diagram of a single-polarization high-peak-power rare-earth-doped PCF or PCR ribbon 881.

FIG. 8H is a cross-section-view schematic diagram of ribbon PCR 887 having stress elements 886 to induce birefringence in cores 868.

FIG. 8-I is a cross-section-view schematic diagram of a central portion of a high-peak-power rare-earth-doped photonic-crystal rod 890.

FIG. 9A is a perspective-view schematic diagram of a high-peak-power rare-earth-doped PCF or PCR ribbon MOPA laser system 900.

FIG. 9B is a plan-view schematic diagram of MOPA laser system 900.

FIG. 9C is an elevation-view schematic diagram of MOPA laser system 900.

FIG. 11A is a perspective-view schematic diagram of a high-peak-power rare-earth-doped laser-welded PCF or PCR MOPA laser system 1100.

FIG. 11B is an elevation-view schematic diagram of MOPA laser system 1100.

FIG. 11C is an end-view schematic diagram of MOPA laser system 1100.

FIG. 11D is a perspective-view schematic diagram of another high-peak-power rare-earth-doped laser-welded PCF or PCR MOPA laser system 1101.

FIG. 11E is an elevation-view schematic diagram of MOPA laser system 1101.

FIG. 11F is an end-view schematic diagram of MOPA laser system 1101.

FIG. 11-I is an end-view schematic diagram of MOPA laser system 1102.

FIG. 12A is a schematic diagram of a high-peak-power rare-earth-doped PCF or PCR MOPA laser system 1200 having an improved delivery fiber 1230.

FIG. 12B is a cross-section-view schematic diagram of an output end 1210 of improved delivery fiber 1230.

FIG. 12C is a cross-section-view schematic diagram of an input end 1220 of improved delivery fiber 1230.

FIG. 12D is a cross-section-view schematic diagram of an alternative input end 1222 of improved delivery fiber 1230.

DETAILED DESCRIPTION

Figure 3J:
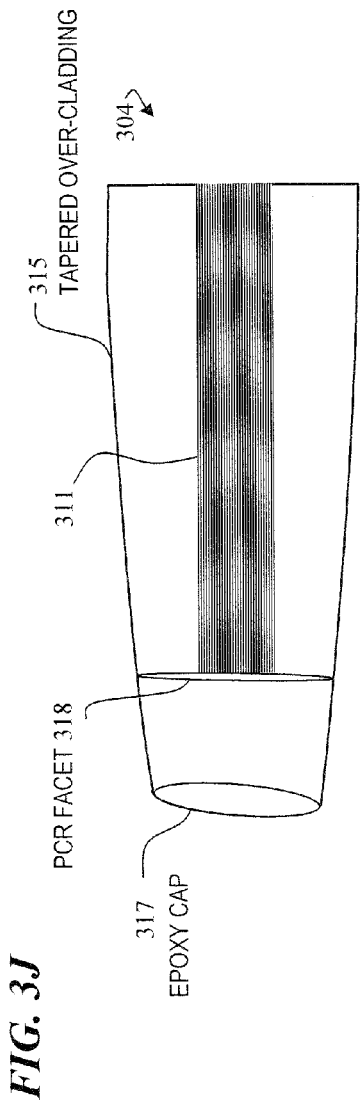
FIG. 3J is a microphotograph of PCR 304 after tapering the end and before removing the epoxy cap and collapsing the air cladding to form the beam-expanding endcap.

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

As used herein, an optical-waveguide device is defined as any device that provides a constrained guided optical path in a solid, for example, an optical fiber having one or more waveguide cores or an optical slab or monolithic substrate having a width and length each larger than the thickness, and having one or more waveguides formed therein (e.g., laterally spaced waveguides formed by diffusion of a index-modifying material through a mask to form surface or near-surface waveguides). An optical fiber is defined as any device having one or more cores or internal waveguides and a length much longer than a transverse width, for example a glass fiber drawn from a melt or preform or extruded from an extruder. A thin optical fiber is defined as a fiber that is thin enough to be readily bent to some non-infinite radius (e.g., a conventional optical fiber). A rod-like fiber (also referred to hereafter as "rod waveguide" or simply "rod") is defined as a fiber that is thick enough to readily hold its shape when released (e.g., a glass rod having a diameter of 1 millimeter (mm) or more). An optical ribbon is defined as a fiber having two or more signal cores laterally spaced across a width of the fiber. An optical ribbon rod is defined as a fiber having two or more signal cores laterally spaced across a width of the fiber and that is thick enough to readily hold its shape when released.

Major factors limiting the pulse peak power and energy in pulsed fiber-based sources are parasitic nonlinear optical effects (NLEs) and inter-pulse amplified spontaneous emission (ASE).

A great deal of prior art and published literature has attempted to address the issue of parasitic NLEs in fiber pulse amplifiers. These parasitic nonlinear optical effects arise, at sufficiently high pulse peak power, from the nonlinear interaction between the optical pulses confined in the fiber core and the silica-based material of the fiber. NLEs include stimulated Brillouin scattering and stimulated Raman scattering (SBS and SRS), self- and cross-phase modulation (SPM and XPM), and four-wave mixing (FWM, also referred to as "cross-talk"). Different NLEs have the following in common:
  a) the pulse optical power at which they set on (referred to as "threshold power" and coinciding with the maximum pulse power achievable) is proportional to the fiber core area and inversely proportional to the fiber length. In other words, long fibers of small core favor NLEs; and b) they cause:
   i. unwanted spectral broadening of the optical pulses and/or wavelength conversion, and
   ii. optical feedback, power instabilities and ensuing potential damages to the optical components.

Because of the above-described dependence of the NLE threshold power on fiber length and core area, a widely adopted method for avoiding NLEs has been to resort to fibers featuring as large a core as possible. These fibers are best known in the art as large-mode-area (LMA) fibers and exhibit core areas more than an order of magnitude larger than those of conventional single-mode fibers used for telecommunications.

A major problem with this approach is that for cores that are large enough, the cores guide several transverse modes, which degrade the beam quality (i.e., will result in a beam-quality factor $M^2$ much greater than 1). Bend-loss-induced mode selection (see, e.g., U.S. Pat. No. 6,496,301 issued to Koplow et al., which is incorporated herein by reference) in combination with mode-matched launching (see, e.g., U.S. Pat. No. 5,818,630 issued to Fermann et al., which is incorporated herein by reference) has been shown to be a way for recovering near-diffraction-limited ($M^2$ of about 1) beam quality in multimode fibers of medium core size (20 to 30 microns in diameter). However, as the core area and diameter increases, the bend-induced discrimination between fundamental and higher-order mode becomes marginal, which results in either poor beam quality (if there is loose coiling of the fiber) or a large efficiency penalty (if there is tight coiling of the fiber). To continue increasing the core area without beam-quality or efficiency penalties, special fiber designs are ultimately required, regardless of the methods used.

In some embodiments, the present invention uses photonic-crystal fibers (PCFs) as an example of these special designs. As is well known in the art (see, for example, J. Limpert et al., *Optics Express* 12, 1313-1319 (2004) and G. Bonati et al., Late Breaking Developments—Session 5709-2a, *Photonics West* 2005 (San Jose, Calif.), each of which is incorporated herein by reference), the internal air/silica microstructure of PCFs affords finer control on the refractive-index profile than is possible in standard fiber-manufacturing processes.

Some embodiments of the present invention optionally include certain aspects disclosed in U.S. Provisional Patent Application 60/703,824 filed on Jul. 29, 2005, titled "PERIODIC FIBER TO SUPPRESS NONLINEAR EFFECTS IN RARE-EARTH-DOPED FIBER AMPLIFIERS AND LASERS," which is hereby incorporated by reference in its entirety.

Some embodiments of the present invention provide highly efficient rare-earth-doped single-mode PCFs of exceedingly large core diameter, in which the single-mode characteristic is enabled by precisely obtaining a very low NA in the core through careful design of the PCF's internal air/silica microstructure, without the need for additional conditions such as bending or special launching conditions.

In contrast to large-core, rare-earth-doped PCFs that have been used as amplifiers to generate an output beam of high average power (see, for example, J. Limpert, A. Liem, M. Reich, T. Schreiber, S. Nolte, H. Zellmer, A. Tünnermann, J. Broeng, A. Petersson, and C. Jakobsen, "Low-nonlinearity single-transverse-mode ytterbium-doped photonic crystal fiber amplifier," *Optics Express* 12, 1313-1319 (2004), G. Bonati et al., "Late Breaking Developments,"—Session 5709-2a, *Photonics West* 2005 (San Jose, Calif.), and F. Roser et al. *Optics Letters* 30, 2754-2756 (2005), each of which is incorporated herein by reference) (for which NLEs do not pose a severe limitation), their use to generate high-peak-power optical pulses (power of 1 MW or greater) exhibiting minimal NLEs and beam quality $M^2$ of about 1 had never been demonstrated or patented to date and no prior art has been found on this topic. Indeed, the first report of megawatt-peak-power generation from a rare-earth-doped photonic-crystal-fiber (PCF) amplifier was published by the inventors (F. Di Teodoro and C. D. Brooks, *Optics Letters* 30, 2694-2696 (2005)).

If single-mode PCFs of core diameter up to about 40 microns (µm) can still be bent tight enough to suit practical packaging requirements, excessive bend loss characterizes those with larger cores.

The present invention, in some embodiments, uses a simple way to circumvent the issue of bend loss while maintaining intrinsic single-mode operation in very large cores, to wit, to avoid bending altogether by designing the PCF to have a straight core, either by holding the fiber so its core is straight, or forming the core in a rod.

The concept of a photonic-crystal rod was introduced very recently by Limpert and coworkers, who described a rod-like photonic-crystal-fiber laser generating average output power in excess of 120 W (J. Limpert et al., *Optics Express* 13, 1055-1058 (2005)) as well as a Q-switched laser generating 0.5 mJ pulse energy (J. Limpert et al., *Applied Physics B: Lasers and Optics* 81, 19 (2005)). An important finding of this work was that, despite the short length, the rod did not require active waste-heat removal owing to its very large glass overcladding (about 1.7 mm diameter), which helped maintain a large surface/active-volume ratio. The overcladding was also instrumental in minimizing bend loss and, since the rod is not to be bent, an external polymer jacket (used for mechanical support in standard fibers that are to be coiled) is not required, which improves power handling. (Most jacket polymers degrade quickly and ignite at temperatures of greater than 100 degrees C. These temperatures are not unusual at the outer surface of fibers generating high average power. Temperatures are especially high in gain fibers exhibiting very efficient pump-light absorption, in which most of the pump light is absorbed (and most of the heat is generated) over a short length.)

To date, reported photonic-crystal rods featured core diameter of no larger than about 35 µm (J. Limpert et al., *Optics Express* 13, 1055-1058 (2005)) and the inventors know of no prior art on the use of such rods for high-peak-power pulse amplification. The inventors have demonstrated the use of a 70-µm-core-diameter Ytterbium (Yb) doped photonic-crystal rod to generate optical pulses of peak power greater than three (3) MW, near-diffraction-limited beam quality ($M^2$ of about 1), negligible NLEs, and narrow spectral linewidth (<13 GHz). The inventors have further demonstrated the use of a 100-µm-core-diameter Yb-doped photonic-crystal rod to generate optical pulses of peak power greater than four (4) MW, near-diffraction-limited beam quality ($M^2$ of about 1.3), negligible NLEs, and narrow spectral linewidth (<20 GHz).

Rare-earth or other suitable dopants (selected for the desired signal wavelengths and/or pump wavelengths) are used in the optical amplifiers of the present invention. In some embodiments, Yb-doped fibers are used for signal wavelengths of about 1.0 micron, Erbium (Er)-doped or Er/Yb-codoped fibers are used for signal wavelengths of about 1.5 microns, and Thulium (Tm)-doped or Tm/Holmium (Ho)-codoped fibers are used for signal wavelengths of about 2.0 microns or longer.

In some embodiments, the detrimental amplified spontaneous emission (ASE) is addressed by using gain staging with inter-stage spectral filtering (short, large-core-diameter PCF amplifiers each separated from the next by narrow-linewidth optical filters). The spectral filter rejects most of the ASE generated in the previous stage, thus disrupting the build-up of ASE from stage to stage. Moreover, the spectral filter rejects also backward-propagating ASE, thus providing optical isolation for the prior stages and preventing detrimental effects such as parasitic lasing and depletion of stored energy that is meant for the forward-traveling pulses. In some embodiments, each PCF amplifier is short to prevent buildup of non-linear effects, and the pump-cladding diameter is kept small (presenting a low ratio of pump-cladding diameter to core diameter, for example, a ration of 3 or less) in order to increase the rate of pump-light transfer from the pump cladding into the core. In addition, each amplifier stage is operated in saturated or close-to-saturated regime, corresponding to a regime in which the seed (i.e., the input) power injected in each amplifier stage is high and the gain provided by the amplifier stage is relatively low (for example <15 dB) compared to that (>30 dB) usually realized, for example, in low-output-power fiber amplifiers for telecommunications. This regime of operation minimizes the build-up of ASE generated within each stage. Overall, the gain-staged architecture described here is instrumental for maximizing energy storage and extraction, thus attaining high pulse energy and high peak power.

As used herein, the term "optical amplifier" includes both devices that amplify an optical signal from an external source (such as a master-oscillator seed laser), as well as gain media that form internal portions of lasers and thus amplify one or more self-generated laser modes.

Figures 1, 1H, 2:
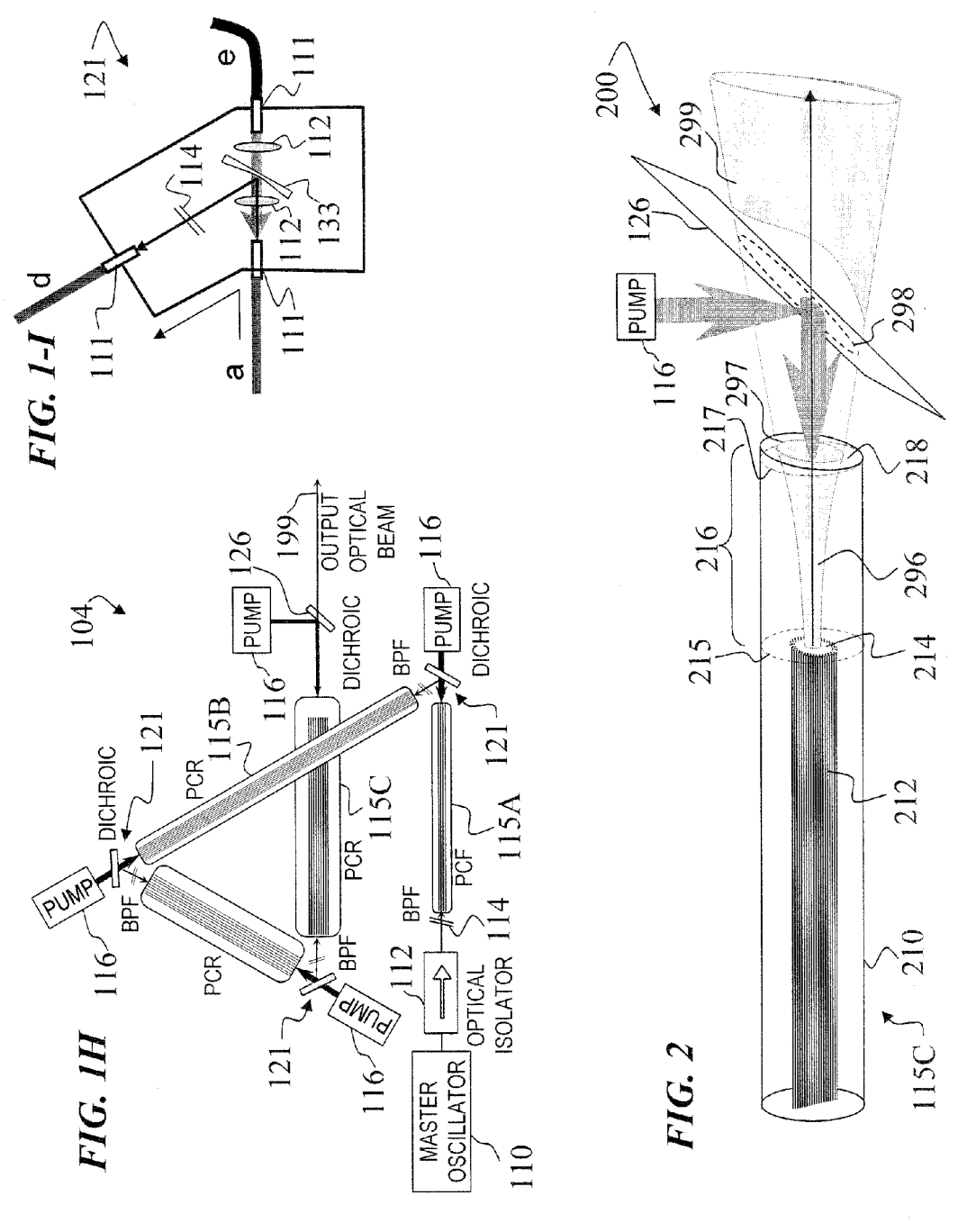

FIG. 1A is a block diagram of a MOPA system 100 having high-peak-power optical amplifiers including one or more gain stages, pump blocks and rare-earth-doped photonic-crystal-fiber (PCF) power amplifiers. In some embodiments, system 100 includes a narrow-band master oscillator (MO) 110, that, in some embodiments, optionally includes a narrow-band band-pass filter (BPF, such as shown in FIG. 1B) tuned to the wavelength of interest for the laser signal, and/or a one-way optical isolator 112. The optical output of MO 110 is amplified by preamplifier 115A, to which pump laser 116A provides optical pump power. The optical output of preamplifier 115A is filtered by a narrow-band band-pass filter (BPF) 114B and input to amplifier 115B.

In some embodiments, each amplifier stage is separated from the next by a "pump block," hereafter defined as a monolithic interconnecting unit that comprises at least three fiber inlets (one for the output end of an amplifier stage, one for the input end of the next amplifier stage, and one for the output end of the pump-laser delivery fiber), a wavelength-discriminating optical component (for example, a dichroic filter or band-pass filter) that reflects the pump-laser wavelength and transmits the pulse wavelength (or vice versa), and a narrow-band band-pass filter that transmits the pulse wavelength and rejects ASE. Here, the definition "monolithic" is intended as "made of components that are optimally aligned upon assembly and do not require or allow re-alignment or further mechanical adjustment." In some embodiments, two or more of the components of the pump block are laser-welded to a suitable substrate. In some embodiments, the substrate and other pump-block components are enclosed in a sealed housing 109 (see FIG. 1C). The fiber inlets include, in turn, a fixture, ferrule, or other provision to hold the fiber in place and a lens placed at a distance from the fiber facet approximately equal to the lens focal length. The two lenses facing the output end of an amplifier stage and input end of the next amplifier stage, respectively, constitute an imaging optical system, which images the output beam from an amplifier stage into the input facet of the fiber constituting the next amplifier stage. This operation is also referred to as "coupling" or "injecting" light into the next fiber amplifier. In some embodiments, for effective coupling, the direction of propagation of the beam coupled into the fiber amplifier must lie along the axis of the acceptance cone of the fiber's core, the half-divergence angle of the beam must not exceed the numerical aperture of the fiber's core, and the diameter of the image beam must not exceed the fiber's core diameter. In some embodiments, these lenses exhibit different focal lengths to provide magnification of the beam prior to injection into the next fiber amplifier. The two lenses facing the end of an amplifier stage and output end of the pump-laser delivery fiber, respectively, form an imaging optical system, which images the pump-laser beam into the pump cladding of the fiber used in the amplifier, which is referred to as "cladding-pumping the amplifier." In some embodiments, the pump-laser beam is coupled into the output end of a fiber amplifier ("backward pumping"). In some embodiments, the pump beam is imaged onto the core of the fiber in the amplifier ("core pumping"). For core-pumping, the prescriptions for effective coupling given above apply as well. For cladding pumping, the prescriptions for effective coupling given above apply as well, provided that the word "core" is replaced by "pump cladding". In some embodiments, the lenses in the pair exhibit different focal lengths to de-magnify the pump-laser beam.

In some embodiments, an actual optical isolator (e.g., a device that includes a polarizer, Faraday rotator, and a cross-polarizer) is installed in series with one or more of the band-pass filters to provide isolation also against backward-traveling light of wavelengths within the pass band of the filters. In some embodiments, the pump block contains a half-wave plate that appropriately rotates the polarization of the pulses in such a way that the polarization is parallel to the slow optical axis (i.e., the axis of higher refractive index) of the fiber used in the successive amplifier stage, which preserves polarization from stage to stage. In some embodiments, the pump block contains a polarizer. In some embodiments, the pump block contains a beam splitter highly transmissive at the pulse wavelength, which is used to deflect a small amount of the pulse power towards a diagnostic element (e.g., photo-detector), which is used to monitor the system performance.

In some embodiments, one or more optical components forming the pump block are butt-joined and welded to an enclosure by localized heating with a $CO_2$ or Nd:YAG laser, according to welding methods well known to those skilled in the art and described in several patents (including, for example, Barnes et al., U.S. Pat. No. 4,424,435). In some embodiments, the whole enclosure or at least the portion of the enclosure onto which the component is welded consists of silica glass or other material having minimum coefficient-of-thermal-expansion (CTE) mismatch with respect to the material of the optical component itself, which avoids build up of thermally induced mechanical stress and cracks. In some embodiments, a non-optical surface of one or more components is metallized (i.e., coated with a metal such as gold or copper) and soldered to metallic parts of the enclosure with methods known to those skilled in the art. In some embodiments, one or more components are held in place by mechanical restraints attached to the enclosure. In some embodiments, the fiber inlets consist of fixtures each including a keyed receptacle for a fiber connector and a lens holder. In some embodiments, one or more fibers connected to the pump block are terminated by epoxy-free connectors featuring a glass ferrule laser-welded to the fiber tip. In some embodiments, the ferrule is made of glass of lower softening point (i.e., lower temperature at which the glass softens) compared to the material used in the fiber. In these embodiments, the fiber tip is bonded to such ferrule by inserting the fiber into the ferrule and heating (using, for example, a torch or electric discharge) the ferrule to reach its softening point, which results in shrinkage of the inner channel of the ferrule (which hosts the fiber) under surface tension and ensuing adhesion to the fiber. After sufficient intermediary amplification, the output signal beam 199 is formed by BPF 114C, output amplifier 115C, and pump 116C.

FIG. 1B is a schematic diagram of a system 101 (corresponding to one embodiment of system 100 of FIG. 1A) having serially coupled high-peak-power optical amplifiers including one or more gain stages, pump blocks and rare-earth-doped photonic-crystal-fiber (PCF) power amplifiers. In some embodiments, system 101 includes a master oscillator (MO) 110 that, in some embodiments, optionally includes a narrow-band band-pass filter (BPF) tuned to the wavelength of interest for the laser signal, and/or a one-way optical isolator 112. The optical output of MO 110 is amplified by preamplifier 115A, which has a pump block 118B at its signal output, to which pump laser 116A provides optical pump power via dichroic mirror/beamsplitter 113A (which highly reflects light of the pump wavelength and highly transmits light of the signal wavelength) and whose output is filtered by BPF 114B. In some embodiments, preamplifier 115A includes a photonic-crystal fiber having a core and/or inner cladding whose lateral extent is defined by holes extending axially along the fiber length surrounding the core, and having a low numerical aperture (NA), in order that the fiber is able to be operated in a single transverse mode. The optical output of preamplifier 115A through pump block 118B is input to amplifier 115B. After sufficient intermediary amplification, the output signal beam 199 is formed by output BPF 114C, amplifier 115C, and pump laser 116C.

In some embodiments, the master oscillator 110 produces single-frequency (i.e., single longitudinal mode), time-gated, near-transform-limited (a transform-limited pulse exhibits the narrowest possible spectral linewidth consistent with the pulse duration), few-ns-duration (e.g., 5-ns or less, in some embodiments) pulses. In some embodiments, the short pulse duration avoids SBS. The threshold power for SBS is the lowest (by about two orders of magnitude) among optical non-linear effects in silica fibers. For reasons that are well explained in several references (see G. P. Agrawal, *Nonlinear Fiber Optics*, Third Edition (Academic, San Diego, Calif., 2001) and F. Di Teodoro et al., *Optics Letters* 27, 518-520 (2002)), pulse durations of a few nanoseconds or shorter eliminate the SBS problem and are therefore important or even crucial for some embodiments of the present invention's high-peak-power pulse amplifiers. In some embodiments, the time-gated nature of the master oscillator—resulting in high pulse-versus-background contrast (i.e., high power extinction between pulses and CW background emission in the interval between pulses)—avoids seeding, within the PCF, of amplified spontaneous emission (ASE) and helps minimize the build up of ASE throughout the fiber-amplifier chain. In some embodiments, the single-frequency nature of the master-oscillator pulses prevents spectral broadening of the pulses as they are amplified through the amplifier chain, by avoiding cross-talk effects that may occur in the case of closely spaced (e.g., less than 10 GHz) longitudinal modes observable in the master oscillator's output spectrum. A major physical mechanism behind cross talk is four-wave mixing (FWM) among the longitudinal modes. FWM results in the redistribution of the pulse energy over new wavelength components, which broadens the spectrum. With a multi-longitudinal-mode master oscillator, significant FWM can occur even in the first amplifier stage of a multi-stage chain of amplifiers, and more so in successive stages. In some embodiments, the single-frequency nature of the master-oscillator pulses prevents spectral broadening of the pulses as they are amplified to high peak power by avoiding cross-phase modulation (XPM). In some embodiments, the single-frequency nature of the master-oscillator pulses prevents the run-away spectral broadening that would result from FWM involving multiple longitudinal modes generated by a multi-longitudinal-mode (i.e., not single-frequency) master oscillator, the spacing between modes being sufficiently small for FWM to occur efficiently when the master oscillator pulses are amplified to high peak power.

In some embodiments, the master oscillator 110 is a single-frequency, Q-switched solid-state microchip laser (e.g., Neodymium-Lanthanum-Scandium-Borate (Nd:LSB) microchip laser Model #STA-01-5 available from STANDA, P.O. BOX 377, 03012 Vilnius, Lithuania) as reported by the inventors in C. D. Brooks et al., *Optics Express* 13, 8999-9002 (2005). In other embodiments, an Nd:YAG microchip laser, such as a JDS Uniphase "Nanolase," may be used. In yet other embodiments, any other suitable seed laser may be used. In some embodiments, the master oscillator 110 is a solid-state laser featuring a very short resonant cavity (e.g., Neodymium-Yttrium-Aluminum garnet (Nd:YAG) microchip laser Model # NP-15010-400 available from, e.g., Teem Photonics, 888 Worcester Street, Suite 260, Wellesley Mass. 02482, U.S.A.), such that even if the cavity supports multiple longitudinal modes (i.e., the laser is not single-frequency) the spectral separation between longitudinal modes is large enough (about 50 GHz or more) that effective cross-talk (i.e., FWM) does not occur in the fiber, due to phase mismatch between the modes, as reported by the inventors in F. Di Teodoro et al., *Optics Letters* 30, 2694-2696 (2005) and F. Di Teodoro et al., *Optics Letters* 30, 3299-3301 (2005).

In some embodiments, some other types of Q-switched diode-pumped bulk solid-state laser or Q-switched fiber laser can be used. In some embodiments, the master oscillator is a CW laser (e.g., in some embodiments, the 1.06-µm-wavelength diode laser model LC96A1060 manufactured by Bookham (Bookham Worldwide Headquarters, 2584 Junction Ave., San Jose, Calif. 95134, www.bookham.com), or, in still other embodiments, the fiber laser model "Boostik" Y10 manufactured by Koheras (KOHERAS A/S, Blokken 84, DK-3460 Birkerød—Denmark, www.koheras.com)), which is externally modulated by using an external electro-optic or acousto-optic modulator used as an optical "chopper" to provide the requisite optical pulses. In some embodiments, time gates (e.g., acousto-optic or electro-optic modulators) synchronized with the master oscillator pulses are inserted between the amplifier stages to increase suppression of the CW background. In some embodiments, the master oscillator is a gain-switched laser (e.g., a CW diode laser driven by a temporally modulated electric current). In some embodiments the master oscillator is replaced by a spectrally broad-band optical source (e.g., fiber ASE source similar to the "Scorpion" model manufactured by NP Photonics), the output of which is transmitted through an optical band-pass filter and a modulator to produce pulses of select spectral linewidth and temporal characteristics.

In some embodiments, the first preamplifier stage includes an amplifying fiber from Liekki having a core diameter of 32 microns (µm), a cladding diameter of 250 microns and a 2-meter length arranged in a 10-cm-diameter coil. In some embodiments, an inter-stage bandpass filter manufactured by Barr Associates is used for ASE rejection. In some embodiments, this configuration is then coupled to an output PCF stage having a PCF amplifying fiber having a core diameter of 40 microns (µm), a cladding diameter of 170 microns and a 1.5-meter length. In some embodiments, the output dichroic mirror/beamsplitter 113C is a long-pass filter that is highly reflective at 976 nm and highly transmissive at 1064 nm, and the path from pump 116C includes a short-wavelength-pass filter that is highly transmissive at 976 nm and highly reflective at 1064 nm.

In some embodiments, the preamplifier stages are omitted, and a microchip laser (such as, for example, a JDS Uniphase "Nanolase" type) is directly coupled to the output PCF stage having a polarizing PCF amplifying fiber having a core diameter of 41 microns (µm), a cladding diameter of 200 microns and a 3-meter length. In some embodiments, the polarizing PCF amplifying fiber includes a plurality of stress-inducing rods in the hole array (e.g., at two opposite sides of the core) that preferentially promote one polarization state (see, e.g., FIG. 8F below).

In some embodiments, the final amplifier 115C (and, in some embodiments, other earlier amplifiers as well) is formed as a substantially straight photonic-crystal rod (PCR), with a very low core NA, which would have relatively high bending losses if it were not operated and maintained substantially straight. In some embodiments, the ends of the photonic-crystal-rod holes that define the core and/or inner cladding are collapsed at the output end of the PCR (note the small gap 125 between the right-hand end of the schematically illustrated photonic-crystal-rod holes and the right-hand end of the rod outline), in order that the output laser beam will start to diverge before exiting the PCR, thus reducing the power density of the output laser beam as it encounters the exit facet of the PCR 115C, and reducing the probability of damaging the facet due to the laser-beam power. In some embodiments, the PCR used as the final or earlier amplifier stage is segmented into two or more successive pieces that are laid out at an angle with respect to each other so as to provide a more compact form factor. In some embodiments, each pair of PCR segments are joined by using a short piece (e.g., about 1-cm length, in some embodiments) of bridge fiber (see, e.g., bridge fiber 1020 of FIG. 10) characterized by (a) core diameter equal to or larger than the core diameter in the PCR, (b) pump-cladding diameter and numerical aperture equal to or higher than those of the PCR pump cladding, (in contrast to other embodiments of the present invention wherein the pump-cladding diameter is smaller than the PCR pump cladding as is the case for bridge fiber 1020 of FIG. 10) and (c) core NA higher than the PCR core NA such that the piece of bridge fiber can be bent at a desired radius with negligible bend loss. In some embodiments, the bridge fiber is bent to a 180-degree angle in order to place the successive PCR segments parallel to one another (side-by-side such that their cores are non-co-linear) and achieve a small physical footprint.

In some embodiments, the piece of bridge fiber is fusion-spliced to both PCR segments and guides light from one PCR segment to the next with low loss. Although the core NA of the bridge fiber is much higher than that of the PCR, which enables multiple transverse modes to be guided in the bridge-fiber segment, the fundamental mode in the PCR exhibits high spatial overlap with transverse modes in the bridge fiber that exhibit a single central maximum, such as the fundamental mode. These modes are therefore preferentially excited. As these modes approximate a Gaussian profile, their $M^2$ value is close to 1, which leads to minimum degradation in the optical brightness of the PCR beam as it enters the bridge fiber. Since negligible mode scrambling occurs given the very short length of the piece of bridge fiber, the optical brightness of the beam exiting the PCR is preserved to a large extent as it travels through the whole length of the bridge fiber. As a result, at the splice marking the transition from the bridge fiber into the next segment of PCR, the splice loss is low, which allows for high-efficiency operation of the segmented amplifier. In other embodiments (rather than using a bridge fiber as just described), light from one PCR segment to the next is transmitted using optical micro-components (e.g., a collimating lens, a mirror, and a focusing lens). In some embodiments, since each segment provides only a fraction of the optical gain of the PCR as a whole, BPFs are not required between segments of a single PCR amplifier stage, as they are used, instead, between amplifier stages.

In some embodiments, the present invention includes one or more photonic-crystal-fiber (PCF) amplifiers having a very large-mode-area (LMA) core while maintaining a single transverse mode for the signal beam in the core. In some embodiments, a master oscillator is used to obtain a temporal sequence of narrow-linewidth short-duration optical pulses that are amplified through a series of PCF power-amplifier stages, each separated from the prior stage by a one-way optical isolator and/or a narrow-linewidth band-pass filter (e.g., pump block 118B).

In some embodiments, the optical-source design based on the master-oscillator/power-amplifier (MOPA) architecture (FIGS. 1A, 1B) permits production of high-power pulses (in excess of 1-MW peak power), while retaining diffraction-limited beam quality, spectrally narrow output, linear polarization, and high efficiency. In some embodiments, target applications include lidar (i.e., light detection and ranging), illumination, remote sensing, high-speed marking, harmonic generation (e.g., visible and/or UV light), and pumping of optical parametric oscillators (OPOs), just to name a few.

A transform-limited pulse (also known as a Fourier-transform-limited pulse or a bandwidth-limited pulse) is a pulse of a wave that has the minimum possible duration for a given spectral bandwidth, since any shorter pulse will have a broader spectral bandwidth due to Fourier transformation of the pulse shape onto other spectral frequencies. In some embodiments, transform-limited pulses have a constant phase across all frequencies making up the pulse. Any waveform can be disassembled into its spectral components by Fourier transformation. The length of a pulse is determined by its complex spectral components, which include not just their relative intensities, but also the relative positions (spectral phase) of these spectral components.

In some embodiments, the invention uses master oscillators featuring very short cavities (e.g., microchip lasers), such that the inter-modal spectral separation is large enough (about 50 GHz or more) that effective four-wave mixing (FWM) does not occur in the fiber, due to phase mismatches between the modes. However, even with this type of master oscillator, some embodiments avoid multi-longitudinal modes in order to reduce or suppress at least two undesirable results: First, FWM can become phase-matched in the case where the light propagating in the fiber is in a well-defined polarization state. Second, upon amplification to high peak powers, the presence of multiple modes leads to nonlinear cross-phase modulation, which, in turn, causes spectral broadening. Further, even in single-frequency master oscillators, phase or amplitude fluctuations (which cause departure from transform-limited behavior) strongly favor nonlinear self-phase modulation, which, again, broadens the spectrum.

Because of the very high gain achieved in some embodiments of fiber amplifiers, build-up of inter-pulse ASE is possible in CW-pumped fiber amplifiers seeded by pulses of repetition rates in the kHz range. In ideal conditions, ASE would be seeded only by photons spontaneously emitted by the rare-earth dopants along the fiber and captured in the core. Typically, this yields a very small amount of ASE optical power. However, if the pulsed master oscillator 110 produces some appreciable amount of undesirable CW background light (i.e., between the pulses that are desired), then this CW light will also be amplified in the fiber, resulting in much higher ASE power at the cost of limiting the energy available to amplify the pulse. This CW background from the master oscillator is especially detrimental because it travels through the entire fiber length, and thus experiences higher gain than spontaneous emission from within the amplifying fibers (only spontaneous-emission photons generated near the fiber's entry facet experience the whole fiber length's gain). Moreover, since at least a fraction of the CW background light has the same wavelength as the pulse (i.e., the CW light is "in-band"), it cannot be spectrally removed by filtering, even in multi-stage amplifiers. A background-free pulsed master oscillator is therefore very desirable in some embodiments of the present invention for pulse amplifiers that are subject to ASE build-up. In some embodiments, a Q-switched laser is used as an optical source that has little or no CW background signal between pulses. In fact, typical Q-switched lasers are, by their nature, background free—a pulse is generated only when an intracavity switch is turned to the "open" position. Typically, when the switch is closed, negligible light leaks out of the cavity.) In some embodiments, the power amplifier (e.g., that portion of system 101 to the right of master oscillator 110) is configured as a multi-stage chain of rare-earth-doped fibers, each stage being end-pumped in a backward direction by a fiber-coupled diode-pump laser. With pump light counter-propagating with respect to the amplified pulses, two benefits, both either important or even crucial for high-power pulse amplification, are obtained: First, the pulse-energy growth along the fiber is nearly exponential and therefore the amplified pulse attains its maximum peak power very close to the fiber output facet, which minimizes the silica-to-high-power-pulse interaction length for nonlinear generation. Second, most of the pump power, and thus gain, is made available in the final portion of the fiber encountered by the signal and is more effectively extracted by the signal pulse (already amplified in the first portion of the fiber), which improves efficiency. Conversely, in co-propagating pumping, most of the gain is available at the fiber signal-input end where the pulse exhibits the lowest power, which tends to increase the silica-pulse interaction length, thus favoring non-linearities.

FIG. 1C is a block diagram of an inter-stage pumping/filtering/isolating unit 118 (also denoted as "pump block" 118 in this document). In some embodiments, at the left is the prior stage amplifier "a" that connects using a ferrule 117 into pump block 118 to deliver its output signal and to obtain pump light. In some embodiments, pump block 118 resides in housing 109, which, in some embodiments, forms a monolithic optical bench for the components therein.

In other embodiments, the various components of the pump block 118 are laser-welded to a suitable monolithic substrate (such as a glass substrate that is compatible with the glass of the dichroic mirror/beamsplitter "b" and band-pass filter (BPF) "c" and any lenses (such as 112 shown in FIG. 1D)) for physical stability. In some such embodiments, the laser-welded assembly is placed and/or sealed in a housing 109.

In some embodiments, at the bottom is the fiber "e" that connects using a ferrule 117 into pump block 118 to deliver pump light. Dichroic mirror/beamsplitter "b" (corresponding to dichroic mirror/beamsplitter 113 of FIG. 1D) is highly transmissive for light having the signal wavelength (e.g., 1064 nm, in some embodiments) towards following stages to the right and highly reflective for light having the pump wavelength (e.g., about 976 nm, in some embodiments) towards the prior stage to the left. The signal light passes through spectral band-pass filter (BPF) "c" and exits pump block 118 into following amplifier stage "d" through a ferrule 117. In some embodiments, each ferrule 117 includes a two-part disconnectable ferrule pair plug "f" and socket "g" or other suitable connector.

FIG. 1D is a schematic diagram of a pump block 118, showing additional details. In some embodiments, each optical port has one or more focusing elements 112, such as lenses "h," to focus and shape the optical beams from the respective fiber endcaps 111. In some embodiments, the signal light (e.g., 1064 nm) from endcap 111 of PCF "a" passes left to right through an entry lens 112, dichroic mirror/beamsplitter 113 ("b"), BPF 114 ("c"), and an exit lens 112 that focuses it into endcap 111 of PCF "d" for further amplification, while the pump light (e.g., 976 nm) passes up from the endcap 111 of pump-delivery fiber "e" through a pump lens 112 and reflects to the left off dichroic mirror/beamsplitter 113 and through an entry lens 112 back into the endcap 111 of PCF "a" where it is used to pump that previous stage.

End pumping of fiber amplifiers is a very-well-established method for pumping. However, alternatives to end pumping have been introduced in recent years, for one or more of the following reasons:

a. Eliminating free-space optical paths (for robustness/stability);
b. Free up the fiber-amplifier ends (e.g., to enable splicing);
c. Distributing entry points for pump light over the fiber length (for heat-dissipation purposes); and
d. Increasing the pumping efficiency.

Such alternatives include V-groove side pumping and pumping through fused fiber bundles. While ultimately relying on end pumping, the pump-block design illustrated in FIG. 1C and FIG. 1D is an ideal solution for some embodiments of high-power pulse amplifiers. In fact, the motivations for adopting alternative pumping methods ("a." through "d.", as listed above) are either irrelevant for this specific application or fully addressed by pump blocks.

First, the existence of free-space optical paths in the injection of pump light into a fiber is not undesirable, per se, but only if the coupling of light in and out of fibers relies on generic bulk optical mounts of limited mechanical stability and/or cumbersome footprint, and if a fiber-end treatment of sufficient quality is not available. Both these potential issues are eliminated in the setup illustrated in FIG. 1C and FIG. 1D as discussed above.

Further, while the benefits of distributing pump-injection points along the fiber are significant for diluting the thermal load in long fiber sources (several meters or more), such as those used in high-power CW fiber lasers, they are substantially non-existent in high-power pulsed fiber sources, in which the fibers must be as short as possible to suppress optical nonlinearities. Thermal management in such short fibers is addressed, instead, by appropriate fiber designs such as the photonic-crystal rod described in this document.

Still further, the inventors have demonstrated that pump-coupling efficiency close to 90% (i.e., similar to the best values obtained using fused-pump couplers) can be obtained using end pumping only.

In some embodiments, the fiber amplifier is staged (i.e., separated into a plurality of amplification stages, each connected through a highly wavelength-selective filter to minimize ASE by having lower gain in each fiber portion and through inter-stage spectral filtering). In some embodiments, the spectral filter acts also as an optical isolator in few-ns-duration pulse applications.

In some embodiments, each fiber-amplifier stage is backward-pumped using a monolithic "pump block" (which does not rely on fused couplers). In some embodiments, fibers are all connected in an epoxy-free fashion, for maximum reliability in high-power applications. In some embodiments, one or more of the final power amplifier(s) is a rod-like photonic-crystal fiber having a core diameter of about 35 microns or more. In other embodiments, the rod-like photonic-crystal fiber has a core diameter of about 40 microns or more, about 45 microns or more, about 50 microns or more, about 55 microns or more, about 60 microns or more, about 65 microns or more, about 75 microns or more, about 80 microns or more, about 85 microns or more, about 90 microns or more, about 95 microns or more, about 100 microns or more, about 125 microns or more, about 150 microns or more, about 175 microns or more, about 200 microns or more, or about 250 microns or more, just to name a few. In some embodiments, this fiber presents enabling characteristics for high-peak-power generation that include: a very large core having extra-low NA (e.g., for suppression of nonlinearities and single-mode beam quality), negligible bend losses (e.g., a rod-like photonic-crystal fiber that is kept substantially straight), short length, and excellent thermal properties.

High-Peak-Power, Linearly-Polarized, Diffraction-Limited Pulses from a Large-Core Yb-Doped Photonic-Crystal Fiber (PCF) and Photonic-Crystal Rod (PCR) and their Use to Generate High-Peak-Power UV, Visible, and Infrared Light In some embodiments, a single-polarization, single-transverse-mode, Yb-doped PCF (i.e., a PCF that guides light only in one transverse mode and one polarization state) having large core (40 μm diameter) is used in a high-peak-power pulse amplifier.

In some embodiments, the single-polarization nature of the PCF is imparted by axial elements (referred to as "stress elements") positioned in close proximity to the core and made of material that exhibits thermal expansion coefficient markedly different from that of the core, such that stress is accumulated in the core as the PCF is drawn and such stress induce birefringence as described in T. Schreiber et al., Optics Express 13, 7621-7630 (2005) and by the inventors in F. Di Teodoro et al., Advanced Solid-State Photonics (ASSP, 29 Jan.-1 Feb. 2006, Incline Village, Nev.) Technical Digest, Paper ME3. In some other embodiments, the single-polarization nature of the PCF stems from incorporating features that cause the PCF cross section to depart from circular symmetry, thus inducing form birefringence.

In some embodiments, a single-polarization PCF is implemented in a master-oscillator/power-amplifier (MOPA) optical source. In at least one embodiment, the MOPA source consists of a master oscillator (Nd:LSB microchip laser Model #STA-01-5 available from STANDA, referred to above) seeding a backward-pumped two-stage fiber amplifier, in which the PCF has a core diameter of approximately 40 microns and is featured in the final amplifier. From this MOPA, high-energy (>0.6 mJ), high-peak-power (>600 kW), high-average-power (>6 W), 1.06-μm-wavelength, 1-ns pulses in a stably linearly polarized (100:1 polarized, corresponding to a degree of polarization of 99%) output beam of single-mode, near-diffraction-limited spatial quality ($M^2<1.3$) and narrow spectral linewidth (10 GHz) can be obtained, as reported by the inventors in F. Di Teodoro et al., *Advanced Solid-State Photonics* (ASSP, 29 Jan.-1 Feb. 2006, Incline Village, Nev.) Technical Digest, Paper ME3.

In at least one embodiment, a single-transverse-mode, large-core, Yb-doped PCF amplifier generates 1.06-μm-wavelength, diffraction-limited, sub-ns optical pulses when seeded by a master oscillator (Nd:YAG microchip laser Model # NP-15010-400 available from Teem Photonics). By building this amplifier, the inventors have obtained a peak power of greater than 700 kW (the highest in a linearly polarized output from a fiber), and exhibiting a stable degree of polarization (100:1 polarized).

In some embodiments the single-polarization PCF is replaced by a polarization-maintaining PCF, i.e., a PCF that maintains the polarization of the light launched in its input end through birefringence induced in the core by the same design features (stress elements or asymmetry) used in the single-polarization PCF.

In some embodiments, the MOPA source includes multiple stages of amplification all featuring single-polarization or polarization-maintaining fibers, with the final amplifier featuring a very-large-core (>50 μm diameter) Yb-doped photonic-crystal rod (PCR) that emits a single-transverse-mode, near-diffraction-limited output beam ($M^2<1.5$) and features, in some embodiments, stress elements in close proximity to the core, similar to those present in the PCF described above or, in other embodiments, design features that depart from cross-sectional circular symmetry (resulting in form birefringence). By virtue of such characteristics, which make the PCR behave as a polarization-maintaining or single-polarization waveguide, the PCR emits a linearly-polarized beam (e.g., 50:1 polarized in some embodiments, or between 50:1 and 100:1 polarized in other embodiments, or better than 100:1 polarized in other embodiments). In some embodiments, the PCR featuring stress elements exhibits core diameter between 50 and 100 μm. In some other embodiments, the PCR featuring stress elements exhibits core diameter>100 μm.

In some embodiments, the PCR emits a linearly polarized output beam of wavelength in the 1.0-1.1-μm range and single-transverse-mode, near-diffraction-limited quality, and pulse peak power in excess of 1 MW, pulse energy in excess of 1 mJ, and pulse spectral linewidth<50 GHz.

In some embodiments, an amplifier featuring a single-transverse-mode, single-polarization or polarization maintaining, large-core (≥40-μm diameter), Yb-doped PCF is used to generate high-peak-power (>100-kW) pulses in the visible wavelength range 500-550 nm, through frequency doubling of the fundamental wavelength (in the range 1.0-1.1 μm) in a nonlinear crystal. In some embodiments, said nonlinear crystal is a piece of lithium triborate (LBO), as reported by the inventors in F. Di Teodoro et al., *Advanced Solid-State Photonics* (ASSP, 29 Jan.-1 Feb. 2006, Incline Village, Nev.) Technical Digest, Paper ME3 or crystal, just to name a few). In other embodiments, the nonlinear crystal could be a piece of potassium dihydrogen phosphate (KDP) or potassium titanium oxide phosphate (KTP), just to name a few.

In some embodiments, an amplifier featuring a single-transverse-mode, single-polarization or polarization-maintaining, very-large-core (>50-μm diameter), Yb-doped PCR is used to generate high-peak-power (>100-kW) pulses in the visible wavelength range 500-550 nm, by means of the same frequency-doubling methods described in the previous paragraph.

In at least one embodiment, as reported by the inventors in F. Di Teodoro et al., *Advanced Solid-State Photonics* (ASSP, 29 Jan.-1 Feb. 2006, Incline Village, Nev.) Technical Digest, Paper ME3, frequency doubling in a LBO crystal of the output from an optical source featuring a 40-μm-core-diameter, single-polarization, single-transverse-mode Yb-doped PCF as the final amplifier produced peak power in excess of 400 kW at 531-nm wavelength in ~1-ns pulses at repetition rate ~10 kHz.

In some embodiments, high-peak-power visible sources obtained by frequency doubling of high-peak-power sources featuring a single-polarization or polarization-maintaining, large-core, single-transverse-mode, Yb-doped PCF or PCR are used for materials-processing applications including laser marking or cutting or drilling or conditioning of metals, semiconductors, plastics, and ceramics. In other embodiments, these sources are used for medical applications including ablation, scarification, abrasion, or other conditioning of live tissues.

In some embodiments, a single-transverse-mode, large-core (≥40-μm diameter), Yb-doped PCF is used to generate high-peak-power (>100-kW) pulses in the UV through frequency tripling, quadrupling, and quintupling of the fundamental wavelength (in the range 1.0-1.1 μm) in a nonlinear crystals (e.g., in some embodiments, two LBO crystals or one LBO crystal and one cesium LBO (CLBO) in series, just to name a few).

In at least one embodiment, as reported by the inventors in F. Di Teodoro et al., Advanced Solid-State Photonics (ASSP, 29 Jan.-1 Feb. 2006, Incline Village, Nev.) Technical Digest, Paper ME3, frequency tripling and quadrupling of the output from an optical source featuring a 40-μm-core-diameter, single-polarization, single-transverse-mode Yb-doped PCF as the final amplifier produced peak power in excess of 160 kW at 354-nm and 190 kW at 265.5-nm wavelength, respectively.

In some embodiments, the wavelength of the UV light generated by frequency tripling can be in the range 333-367 nm. In some embodiments, the wavelength of the UV light generated by frequency quadrupling can be in the range 250-275 nm. In some embodiments, the wavelength of the UV light generated by frequency quintupling is in the range 200-220 nm.

In some embodiments, an optical UV source features a very-large-core PCR such as the as the final amplifier before a wavelength-conversion device.

In some embodiments, the optical source obtained by frequency tripling, quadrupling, or quintupling of the output of a high-peak-power source of fundamental wavelength in the range 1.0-1.1 μm, based on a single-polarization or polarization-maintaining, single-transverse-mode, large-core or very-large-core Yb-doped PCF or PCR constitutes an efficient and compact high-peak-power optical source generating UV light at power levels suitable for remote sensing of biological and chemical agents and pollutants. In some embodiments, the biological agents detected contain the amino acids tryptophan, phenylalanine, and tyrosine, just to name a few, which are identified by detecting their fluorescence emitted upon irradiation by UV light in the 250-275-nm wavelength range (Committee on Materials and Manufacturing Processes for Advanced Sensors, National Research Council, *Sensor Systems for Biological Agent Attacks: Protecting Buildings and Military Bases*, National Academy Press, Washington D.C., 2005. See p. 73). In some embodiments, the chemical agents detected contain toxic compounds such as acrolein, which is identified by detecting their fluorescence emitted upon irradiation by UV light in the 333-367-nm wavelength range. In some embodiments, this UV source represents an enabling technology for long-range detection of airborne toxic biological and chemical agents executed via the method of UV laser-induced-fluorescence (LIF) LIDAR by optical systems incorporating the described UV source and installed on unmanned airborne vehicles (UAVs). In some embodiments, this UV source constitutes an enabling technology for portable, in-the-field devices, which can be deployed in a variety of scientific, industrial, and national-security applications.

In some embodiments, the use of a single-polarization or polarization-maintaining, single-transverse-mode, large-core (≥40-μm diameter) Yb-doped PCF enables the efficient production of high-peak-power UV light through frequency tripling, quadrupling, and quintupling. In some embodiments, the use of said PCF is instrumental in overcoming the limitations of small-core (<25-μm diameter) polarization-maintaining fibers, which incur detrimental optical nonlinearities when used to produce high-peak-power (>300-kW) pulses and are therefore unable to sustain efficient UV generation. In some embodiments, the use of said PCF overcomes the limitations of large-core (>25-μm diameter) standard (solid-silica) fibers, which are typically unable to generate an output beam in a stable polarization state (>50:1 polarized) because of multi-mode operation and/or insufficient in-fiber discrimination between orthogonal polarization states, resulting again in inefficient UV generation.

In some embodiments, even higher peak power in the UV (for example, in some embodiments, >500 kW) is enabled by frequency tripling, quadrupling, or quintupling of a source featuring an amplifier that consists of a backward-pumped very-large-core (>50-μm diameter) PCR.

In some embodiments, a pulsed optical source featuring an Yb-doped, large-core PCF or very-large-core PCR and generating spectrally narrow, linearly polarized, high-peak-power pulses in the 1.0-1.1-μm wavelength range is used to generate light in the deep UV by high harmonics generation. For example, in one embodiment, light in the 167-183-nm wavelength range is obtained by sixth harmonic generation of the fundamental 1.0-1.1-μm pulses, in another embodiment, light in the 142-157-nm wavelength range is obtained by 7th harmonic generation; in yet another embodiment, light in the 125-137-nm wavelength range is obtained by 8th harmonic generation. In other embodiments, even shorter wavelengths are obtained by higher harmonic generation. In all of these embodiments, the efficient generation of optical power useable by applications such as laser marking and spectroscopy at these short wavelengths is fundamentally enabled by the high peak power (>1 MW), linear polarization, beam quality, and narrow pulse spectral linewidth of the pulsed fiber-based sources described in this invention, which permits the overcoming of limitations in standard fibers. Indeed, no prior art reporting generation of harmonics higher than the fifth from any fiber-based sources exists to date.

In some embodiments, an optical source featuring single-transverse-mode, single-polarization or polarization-maintaining, Yb-doped PCF or PCR amplifiers is used to generate mid-infrared light in the 1.5-4.0-μm wavelength range by frequency conversion in an optical parametric oscillator (OPO) or optical parametric generator (OPG). In some embodiments, the OPO includes nonlinear crystal (e.g., in some embodiments, periodically-poled lithium niobate (PPLN) or KTP) incorporated in an optical cavity formed by two or more minors, as described, for example, in A. Henderson et al., *Optics Express* 14, 767-772 (2006).

In some embodiments, the pulse energy, peak power, and average power obtained at mid-infrared wavelengths using a source that features a large-core PCF or very-large-core PCR are higher than obtained by pumping the OPO with a source featuring small-core (less than about 25-μm diameter) polarization-maintaining fibers exhibiting peak-power and polarization shortcomings.

In some embodiments, mid-infrared wavelengths longer than 4 µm are generated by using a pulsed optical source that generates light in the 1.0-1.1-µm wavelength range, features a large-core PCF or very-large-core PCR, and is followed by two OPO in series (for example, in some embodiments, a PPLN OPO pumped by said source and generating signal or idler beam in the wavelength range 2-3 µm, which is used to pump a second OPO featuring, in some embodiments, a zinc germanium phosphide (ZGP) crystal). In some other embodiments, the optical source featuring PCF and/or PCR as described above is followed by a single OPO directly generating radiation at wavelengths longer than about 4 µm (e.g., in some embodiments, an OPO featuring an optically patterned gallium arsenide (OPGaAs) crystal).

High-Energy, Chirped-Pulse-Amplifier Systems Featuring Large-Core PCF or Very-Large-Core PCR.

In some embodiments, an Yb-doped, large-core PCF or very-large-core PCR is used as the power amplifier in a chirped pulsed amplification (CPA) system. In CPA, low-pulse-energy, ultra-short pulses (e.g., pulses shorter than 10 ps, in some embodiments) produced by a seeder (e.g., a mode-locked solid-state laser in some embodiments) are temporally stretched to a duration of a few nanoseconds using a bulk diffraction grating pair, chirped fiber Bragg grating, or dispersive delay line (i.e., a piece of un-doped optical fiber) and injected into an amplifier to increase the pulse energy (e.g., up to a few mJ in some embodiments). The pulse-stretching process is instrumental in lowering the peak power, which permits the achieving of high pulse energies without encountering problems such as optical damages or spectral degradation. Upon amplification, the pulses are recompressed to their original duration using another bulk diffraction grating pair or other dispersive optical assembly capable of sustaining very high peak power without damages. CPA systems using Yb-doped fiber amplifiers are well documented in the literature (see A. Galvanauskas, IEEE J. Selected Topics in Quantum Electron. 7, 504 (2001)) and, recently, CPA systems featuring Yb-doped photonic-crystal-fiber amplifiers have been reported (see F. Roser et al., Opt. Lett. 30, 2754 (2005)). However, to date, the pulse energy obtained in these fiber-based systems has been <1.5 mJ, limited by spectral degradation caused by optical nonlinearities due to high peak power. In some embodiments, very-large-core (core diameter>50-µm) PCRs enable scaling of pulse energy to values>1.5 mJ, as higher peak power compared to previously implemented fibers can be achieved without the onset of parasitic nonlinearities. In some embodiments, a single-polarization, Yb-doped PCR of core diameter>50 µm is used as the amplifier in the CPA system. In some embodiments, the core diameter of the used PCR is between 50 and 100 µm. In some embodiments, the core diameter of the used PCR is >100 µm.

In some embodiments, the very-large-core Yb-doped PCR amplifier used for high-pulse-energy amplification of stretched pulses is fusion-spliced to a hollow-core photonic-band-gap (PBG) fiber. The dispersion properties of this fiber are tailored to recompress the pulses to their original duration, while the hollow core permits the obtaining of very high peak power without incurring optical damages.

In some embodiments, the high-peak-power pulsed output of an Yb-doped, large-core PCF or very-large-core PCR is remotely delivered by means of a passive delivery fiber. In some embodiments, a hollow-core PBG delivery fiber of core diameter matching, in some embodiments, that of the PCF or PCR, is used to ensure that the pulses travel along an air-filled path, which minimizes optical nonlinearities even if the delivery fiber is several meters long, thus affording the preservation of spectral properties in the delivered pulses. In some embodiments, the ends of the PBG fibers are "connectorized" in such a way that optical feedback onto the PCF or PCR facet is minimized.

MW-Peak-Power, MJ-Pulse-Energy, Multi-kHz-Repetition-Rate Pulses from Yb-Doped Fiber Amplifiers In at least one embodiment, MW-peak-power, mJ-pulse-energy, multi-kHz-repetition-rate pulses from Yb-doped fiber amplifiers are implemented in a laser. In some embodiments, Yb-doped fiber amplifiers are used to generate high peak powers in pulses of excellent spectral/spatial quality.

Still further, in some embodiments, the inventors implemented a 1-ns pulse, Q-switched microchip laser (having a wavelength of 1062 nm) operating at about a 10-kHz pulse-repetition rate (PRR) that seeds (produces "seed" laser pulses each of 1-ns duration that are fed into) a dual-stage amplifier featuring a fiber preamplifier as its first stage and a 40-µm-core Yb-doped photonic-crystal fiber (PCF) as the second, or power-amplifier stage. In some embodiments of this amplifier, diffraction-limited ($M^2$=1.05) pulses are output with each pulse having about one-nanosecond duration, about 1.1-millijoule (mJ) energy, about 1.1-megawatt (MW) peak power, about 10.2-W average power, a spectral linewidth of about 9 GHz, negligible nonlinearities, and slope efficiency of greater than seventy-three percent.

Moreover, in at least one embodiment, the inventors replaced the seed source with a shorter-pulse (less than 500-ps) microchip laser (1064 nm) having a PRR of about 13.4 kHz and obtained diffraction-limited ($M^2$=1.05), about-450-ps pulses having energy of greater than 0.7 mJ, peak power in excess of 1.5 MW (the highest from a diffraction-limited fiber source), average power of about 9.5 W, and spectral linewidth of less than 35 GHz.

In at least one embodiment, the inventors demonstrated a MOPA system featuring a 1-ns pulse Q-switched microchip laser (having a wavelength of 1062 nm) that seeds a three-stage amplifier featuring a 70-µm-core-diameter Yb-doped PCF. In some embodiments, the output from this MOPA had beam quality $M^2$ ~1.1, pulse energy in excess of 3 mJ, peak power in excess of 3 MW, average power ~30 W, spectral linewidth ~13 GHz, and signal-to-noise ratio ~60 dB.

In at least one embodiment, the inventors demonstrated a MOPA system featuring a 1-ns pulse Q-switched microchip laser (having a wavelength of 1062 nm) that seeds a three-stage amplifier featuring a 1000-µm-core-diameter Yb-doped PCF. In some embodiments, the output from this MOPA had beam quality $M^2$ ~1.3, pulse energy in excess of 4.3 mJ, peak power in excess of 4.5 MW, average power ~42 W, spectral linewidth ~20 GHz, and signal-to-noise ratio ~60 dB.

Very-Large-Core, Single-Mode Yb-Doped Photonic-Crystal Fiber for Multi-Mw Peak Power Generation In some embodiments, a very-large-core, single-mode Yb-doped photonic-crystal fiber for multi-MW peak power generation is implemented. Generating high peak powers in pulsed rare-earth-doped fiber sources has been traditionally very challenging due to the onset of nonlinear optical effects, including SRS and SBS, nonlinear phase modulation, and four-wave mixing (FWM), all of which strongly degrade the spectral brightness. Additional limiting factors are fiber-facet damage and bulk optical damage.

In some embodiments, scaling the in-fiber peak power beyond the megawatt level is implemented, while retaining high spatial and spectral quality. In some embodiments, a single-mode, 40-µm-core-diameter, Yb-doped photonic-crystal fiber (PCF) is used to generate peak power greater than 1.1 MW with $M^2$ of about 1 and spectral linewidth of about 10 GHz. Again, in some embodiments, an intrinsically single-mode Yb-doped PCF featuring a core diameter greater than 60 μm is implemented. In some embodiments, the PCF is optimized for generation of multi-MW peak-power, diffraction-limited pulses exhibiting minimal optical nonlinearities, and is used as the final stage in a master-oscillator/fiber-amplifier system generating multi-kHz repetition-rate, sub-ns pulses at 1.06-μm wavelength.

Stimulated Brillouin Scattering (SBS) can lead to power limitations or even the destruction of a high-power fiber-laser system due to sporadic or unstable feedback, self-lasing, pulse compression and/or signal amplification.

In some embodiments, one way to generate output with more controlled attributes is to use a master-oscillator/power-amplifier (MOPA) architecture. The oscillator can be optimized to generate a laser seed signal having the appropriate characteristics, such as linewidth, and the power amplifier is used to increase the output power and/or pulse energy to much higher levels.

In some embodiments, the structure will also simplify the system configuration for using mode-matching techniques to achieve good beam quality for slightly multimode fiber amplifiers. For a rare-earth-doped multimode fiber, the signal launch condition plays an important role in mode selection, as described in U.S. Pat. No. 5,818,630, which is incorporated herein by reference.

In some embodiments, rare-earth-doped photonic-crystal fiber is used with a core diameter greater than 50 microns for fabricating a pulse amplifier achieving high peak powers greater than 1 MW.

In some embodiments, large-core single-polarization, rare-earth-doped photonic-crystal fibers are implemented for generation of high-peak-power (greater than 100-kW), diffraction-limited, linearly polarized pulses (i.e., for efficient generation of high-power optical pulses at visible and UV wavelengths, via harmonic generation).

Still, in some embodiments, a single-frequency, near-transform-limited, pulsed master oscillator is used to prevent spectral broadening by cross-talk effects and self-/cross-phase modulation in high-peak-power (greater than 1 MW) fiber amplifiers.

In some embodiments, an optimized design of a high-peak-power fiber amplifier is implemented including: gain staging for ASE suppression, a "pump-block" design featuring a monolithic pump-injection scheme, band-pass filter(s) as isolator(s), epoxy-free connectorization scheme(s) (i.e., for standard fibers, PCF and rod-like PCF), and a rod-like rare-earth-doped PCF power amplifier.

FIG. 1E is a schematic diagram of a compact system 102 having a plurality of high-peak-power rare-earth-doped photonic-crystal-fiber (PCF)/photonic-crystal-rod (PCR) optical power amplifiers. In some embodiments, compact system 102 is conceptually similar to system 101 of FIG. 1B, but with the addition of a highly reflective mirror 129 in or next to at least some of the pump blocks 119 between stages, in order to allow side-by-side placement of at least some of the amplifier photonic-crystal fibers and/or rods for a shorter and more compact configuration. Further, in some embodiments, in each pump block 119 the dichroic mirror/beamsplitter 113 is highly reflective for light of the signal wavelength and highly transmissive for light of the pump wavelength. In some embodiments, in order to reduce loss of pump power to parasitic signals, the filter in each pump block 119 reduces optical ASE noise of wavelengths other than the signal wavelength traveling forward, and the isolator in each pump block 119 reduces SBS, ASE and other noise traveling backward. In some embodiments, successive amplifier stages are larger diameters and shorter lengths to handle increasing power.

FIG. 1F is a schematic diagram of a compact system 103 having a plurality of high-peak-power rare-earth-doped PCF/PCR optical power amplifiers. In some embodiments, compact system 103 is conceptually similar to system 102 of FIG. 1E, but eliminates mirror 129 in or next to the pump blocks 119 between stages, in order to reduce mirror losses, but at the cost of a larger footprint of the amplifier photonic-crystal fibers and/or rods. Other aspects of system 103 are as described above for systems 101 and 102 of FIG. 1B and FIG. 1E.

FIG. 1G is a schematic diagram of a pump block 119. In some embodiments, pump block 119 is conceptually similar to pump block 118 of FIG. 1D, but the dichroic mirror/beamsplitter 123 is highly reflective for light of the signal wavelength and highly transmissive for light of the pump wavelength.

FIG. 1H is a schematic diagram of a compact system 104 having high-peak-power rare-earth-doped PCF/PCR optical power amplifiers. In some embodiments, compact system 104 is conceptually similar to system 103 of FIG. 1F, but reflects the signal at a more acute angle to form a smaller triangular footprint of the amplifier photonic-crystal fibers and/or rods. Other aspects of system 104 are as described above for systems 101, 102 and 103 of FIG. 1B, FIG. 1E and FIG. 1F.

FIG. 1I is a schematic diagram of a pump block 121. In some embodiments, pump block 121 is conceptually similar to pump block 119 of FIG. 1G, but the dichroic mirror/beamsplitter 133 reflects at a smaller angle. In other embodiments, an even smaller angle of reflection is used to allow a bow-tie-shaped compact system similar to system 104 but with a footprint approaching that of system 102, described above. In some embodiments, dichroic mirror/beamsplitter 133 has a parabolic or other shape that focuses the reflected signal, allowing elimination of one or more of the lenses 112.

A key factor limiting the peak power in pulse fiber amplifiers is optical damage occurring in the fiber output facet. This part of the fiber is the most vulnerable to optical damages due to the inevitable presence of microscopic defects and/or contaminants on the facet surface, which can absorb light, heat up, and eventually release shock waves resulting in catastrophic cracks. A widely accepted value for the peak optical intensity at the onset of surface damage in silica is about 40 GW/cm$^2$ for optical-pulse durations of about 1 ns (see, for example, B. C. Stuart et al., *Physical Review B* 53, 1749-1761 (1996)). Because of the tiny beam area in the fiber core, such optical intensity can be reached at relatively modest pulse peak powers. For example, a pulse peak power of about 8 kW is sufficient to produce facet damage in telecommunication fibers (e.g., having an in-core beam area of about $2 \times 10^{-7}$ cm$^2$) and a pulse peak power of about 350 kW is sufficient to produce facet damage in the 40-micron core-diameter PCF described in this document (having an in-core beam area of about $9 \times 10^{-6}$ cm$^2$). Conversely, the threshold intensity for bulk damage within each fiber is typically higher by more than order of magnitude than the above values.

FIG. 2 is a schematic diagram of a high-peak-power rare-earth-doped photonic-crystal-rod optical power amplifier 200. In some embodiments, a photonic-crystal fiber or rod 115C includes an array of parallel holes 212 that surround a core 214 that has substantially the same index of refraction as the inner cladding 210 surrounding the core. The use of photonic-crystal-fiber holes allows more precise control over the index of refraction, allowing the design of cores having a very low NA, and thus providing optical-amplifier operation using even fibers or rods having large core areas in a single lowest-order (LP01) mode, resulting in an output beam with high beam quality for high-power amplifiers. In some embodiments, the problem of facet damage can be completely or substantially eliminated by using a beam-expanding endcap 216. In some embodiments, the photonic-crystal-fiber holes are collapsed (e.g., melted shut) or filled with an index-matching compound, such that the core ends at a plane 215, and the signal 296 expands to a larger spot 297 on exit facet 218. In some embodiments, facet 218 of endcap 216 is angle-polished (relative to plane 217, which is perpendicular to the beam axis) to prevent optical feedback, as is done with standard fiber facets. The beam exiting the doped-fiber portion at plane 215 expands in the endcap freely by diffraction (i.e., without changes in spatial quality, $M^2$) provided that its diameter remains smaller than the outer diameter of the endcap. In some embodiments, by expanding the beam, the optical intensity at the output facet of the endcap is made lower than the surface-damage threshold for silica, which avoids damage to the endcap. The magnification factor (defined as the ratio between in-core and expanded beam diameter) is approximately proportional to the endcap length. In some embodiments, the endcap is thus made to a length proportional to the spot size 297 having the desired beam radius at facet 218. In some embodiments, a laser-diode pump 116 provides backward-traveling pump light reflected by dichroic mirror/beamsplitter 126 (which, in some embodiments, has a reflective surface that also focuses the pump beam into facet 218). Output beam 299 has further expanded to size 298 at dichroic mirror/beamsplitter 126, reducing the possibility of damage to that component, while retaining diffraction-limited quality.

FIG. 3A is an end-view schematic diagram of a high-peak-power rare-earth-doped photonic-crystal rod 300 (PCR 300) having a beam-expanding endcap that can be used in a linearly polarized, diffraction-limited, pulsed fiber amplifier, having a large-core Yb-doped photonic-crystal structure, as described herein. FIG. 3B is a side-view schematic diagram of PCR 300. FIG. 3C is a cross-section schematic diagram of PCR 300. Several publications (see, for example, J. Limpert et al., Applied Physics B 75, 477-479 (2002)) describe one concept of an endcap in preparing optical-fiber ends.

Referring to FIG. 3B, photonic-crystal fiber 310 has a rare-earth-doped core 311 surrounded by long narrow holes (or long narrow regions of a solid having a lower index of refraction or concentric layers of alternately lower and higher indices of refraction) aligned parallel to the central axis of the fiber, having sizes and arranged in a spaced pattern that defines the size and numerical aperture of the core that contains the signal optical beam 312 (see, e.g., U.S. Pat. No. 6,845,204 to Broeng et al., issued Jan. 18, 2005, and U.S. Pat. No. 6,829,421 to Forbes et al., issued Dec. 7, 2004, which are both incorporated herein by reference). In some embodiments endcap 320 is a short piece of core-less fiber or rod, fusion-spliced to the output end 309 of fiber 310, such that beam 312 exits the core into diffracted beam 322 that expands to the size of spot 323 by the time it reaches exit facet 321. In other embodiments, the endcap 320 is a short piece of fiber having a core with a diameter much larger than the rare-earth-doped fiber 310 to which it is fusion-spliced. In a simple embodiment, this large-core fiber used for endcap 320 is a commercially available undoped multimode fiber, wherein preservation of beam quality is ensured as long as the diameter of the beam 322 expanding in the endcap remains smaller than the core diameter of endcap 320. If this condition (or the condition above, for coreless endcaps) is not met, the free diffraction of the beam will be hindered by the optical guidance of the multimode core, which results in beam-quality degradation.

MW-Peak-Power, MJ-Pulse-Energy, Multi-kHz-Repetition-Rate Pulses from Fiber Amplifiers Directly Emitting in the "Eye-Safe" Wavelength Range.

In some embodiments, a pulsed optical beam in the 1.5-1.6-µm and 1.8-2.5-µm wavelength ranges, usually referred to as "eye-safe wavelengths", is generated while retaining the same design solutions, advantages, and performance capabilities (including high pulse energy and high peak/average power, narrow-spectrum, and single-transverse-mode beam quality) of optical sources based on Yb-doped PCF and PCR operating in the 1.0-1.1-µm wavelength range.

In some embodiments, optical sources operating at eye-safe wavelengths are configured like the MOPA schematically illustrated in FIG. 1A and include all of the components of said MOPA, each of which has the same functionality, with the provisions that the master oscillator 110 is a laser emitting light of eye-safe wavelength in the 1.5-1.6-µm range, each optical component used in the MOPA is designed for operation at the wavelength emitted by the master oscillator, each amplifier stage in the MOPA is built using Er-doped or Er/Yb-codoped fiber, and one or more of the amplifiers, among which the final amplifier 115C, feature a large-core (e.g., in some embodiments, at least 30-µm diameter) Er-doped or Er/Yb-codoped, single-transverse-mode PCF.

In some embodiments, the final amplifier 115C features a single-transverse-mode, very large-core (at least 50-µm diameter) Er-doped or Er/Yb-codoped PCR, which is designed in a similar way to the Yb-doped PCR described in previous embodiments.

In some embodiments, Er-doped and Er/Yb-codoped PCFs and/or PCRs feature embedded stress-inducing elements, or in other embodiments, design features that depart from cross-sectional circular symmetry so as to induce sufficient birefringence in the core, which ensures maintenance of the polarization state of input light and/or guidance of only one polarization state, as previously described for Yb-doped PCFs and PCRs, resulting in linearly polarized output with polarization extinction of 25:1 or better.

In some embodiments, the peak power emitted by Er-doped and Er/Yb-codoped PCFs or PCRs implemented as amplifiers in MOPA systems exceeds 300 kW in the wavelength range 1.5-1.6 µm, while the beam quality is inherently single-transverse-mode near-diffraction-limited ($M^2<1.5$) and the pulse spectral linewidth is <50 GHz.

In some embodiments, the peak power emitted by the Er-doped and Er/Yb-codoped PCFs or PCRs exceeds 300 kW in the wavelength range 1.5-1.6 µm, while the beam quality is inherently single-transverse-mode near-diffraction-limited ($M^2<1.5$) and the pulse spectral linewidth is <50 GHz, and the output beam is >50:1 polarized.

In some embodiments, the peak power emitted by the Er-doped and Er/Yb-codoped PCFs or PCRs exceeds 500 kW in the wavelength range 1.5-1.6 µm, while the beam quality is inherently single-transverse-mode near-diffraction-limited ($M^2<1.5$). In some embodiments, the peak power emitted by the Er-doped and Er/Yb-codoped PCFs or PCRs exceeds 750 kW in the wavelength range 1.5-1.6 µm, while the beam quality is inherently single-transverse-mode near-diffraction-limited ($M^2<1.5$). In some embodiments, the peak power emitted by the Er-doped and Er/Yb-codoped PCFs or PCRs exceeds 1 MW in the wavelength range 1.5-1.6 µm, while the beam quality is inherently single-transverse-mode near-diffraction-limited ($M^2<1.5$).

In some embodiments, the linearly polarized, high-peak-power, spectrally narrow output of a MOPA systems featuring Er-doped or Er/Yb-codoped PCFs and/or PCRs is used for wavelength conversion in a nonlinear crystal or set of nonlinear crystals.

In some embodiments, the output from Er-doped or Er/Yb-codoped PCF or PCR pulsed amplifiers emitting spectrally narrow, linearly polarized light is used to efficiently generate pulsed light in the 750-800-nm wavelength range through second-harmonic generation in a PPLN crystal, (see e.g., A. Galvanauskas et al., *Optics Letters* 22, 105-107 (1997), and U.S. Pat. No. 6,014,249 "Apparatus and method for the generation of high-power femtosecond pulses from a fiber amplifier" to Fermann et al, which are both incorporated herein by reference) or periodically-poled KTP (PPKTP) crystal (see e.g. Champert et al., *Applied Physics Letters* 78, 2420-2421 (2001)), just to name a few. In all such embodiments, the peak power in the second-harmonic beam is much higher (>100 kW) than obtained in any prior art, which is enabled by the use of photonic-crystal-fiber technology as explained above.

In some embodiments, visible light in the 500-533-nm wavelength range and UV light in the 375-400-nm wavelength range are obtained, respectively, by third- and fourth-harmonic generation of a high-peak-power Er-doped or Er/Yb-codoped PCF or PCR amplifier as described above in a nonlinear crystal. In some embodiments, the nonlinear crystal used can be fan-out poled magnesium-oxide (MgO) doped lithium niobate ($LiNbO_3$) as shown in K. Moutzouris et al., *Optics Express* 14, 1905-1912 (2006). The peak power obtained in this wavelength range is higher than any prior art, thanks to the use of PCF/PCR technology.

In some embodiments, efficient higher-harmonic (fifth, sixth, seventh or higher) generation of Er-doped or Er/Yb-codoped PCF or PCR amplifiers is made possible by the high peak power, narrow spectral linewidth, and linear polarization offered by these sources, so as to produce light of wavelength<375 nm.

In some embodiments, a high-peak-power Er-doped or Er/Yb-codoped PCF or PCR amplifier is used to pump an OPO or OPG featuring PPLN or other crystal so as to enable generation of light in the 3-4-μm wavelength and achieve higher peak power, pulse energy, and/or average power in this wavelength range than in any example of prior art concerning OPOs or OPGs pumped by fiber-based sources operating at eye-safe wavelengths.

In some embodiments, the system consisting of OPO/OPG pumped by Er-doped or Er/Yb-codoped PCF or PCR amplifier features a front-end consisting of readily available and reliable components traditionally used in telecommunication applications and represents a key enabling technology for lower-cost, higher-power, higher-reliability military infrared countermeasures.

In some embodiments, a very-large-core Er-doped or Er/Yb-codoped PCR as described above is used as a stretched-pulsed amplifier attaining pulse energy>0.5 mJ in a CPA system producing pulse duration <10 ps in the 1.5-1.6-μm wavelength range.

Embodiments corresponding to all of the previous embodiments of pulsed eye-safe sources can be realized by means of large-core or very-large-core PCFs and/or PCRs emitting a near-diffraction-limited output ($M^2$<1.5) and doped with thulium (Tm) and/or Holmium (Ho) which emit light in the 1.8-2.5-μm wavelength range.

Fiber-End Treatment for High-Peak-Power Handling

In some embodiments, beam-expanding endcaps for PCFs are fabricated by thermally collapsing the inner axial channels over a desired length from the facet, which destroys waveguidance in the PCF core and pump cladding and, therefore, enables free beam expansion. In some embodiments, controlled thermal collapse of the inner PCF axial channels is obtained through heating with a commercial fusion splicer. The resulting endcap diameter coincides with that of the PCF overcladding. Note that, in some embodiments, the endcap constitutes also a protective seal (i.e., it closes the ends of the channels), which enables standard polishing of the PCF facets. Without endcaps, it would be impossible to polish a PCF without the risk that water, polishing compounds, glass particulate and other contaminants would be attracted into the PCF air-filled inner channels by capillarity, which would compromise the PCF performance.

Although a similar endcap-fabrication method has been described in the open literature (see, for example, R. E. Christiansen et al., *Proceedings of the 4th Reunion Espanola of Optoelectronics* (OPTOEL 2005), CI-5 pp. 37-49), the available prior art pertains to short endcaps only, the length of which cannot exceed the width of the electric arc or filament of the fusion splicer (less than about one millimeter). This limitation hampers beam expansion, especially in the case of large-core, intrinsically single-mode PCFs. Indeed, the divergence angle of a near-diffraction-limited beam exiting a fiber is inversely proportional to the mode field diameter, whereas its Rayleigh range is proportional to the mode field area (the Rayleigh range, $z_R$, is the distance from the core over which a near-diffraction-limited beam exiting a fiber exhibits negligible divergence and is defined as $z_R = \pi n \times MFD^2 / (\lambda M^2)$ where n is the material refractive index, MFD is the mode field diameter, and λ is the wavelength). Both properties tend to lower the rate of beam expansion per endcap unit length. For example, the beam-diameter magnification factor provided by a 1-mm-long endcap exceeds 100 for a small-core telecommunication-like fiber (MFD of about 5 microns), but is only about 1.5 for the single-mode 40-micron-core-diameter PCF described above. Longer endcaps are then required to generate megawatt peak powers without surface damage. Moreover, no prior art has been found that describes methods for fabricating endcaps (of any length) in photonic-crystal rods.

The present invention provides an endcap-fabrication method that enables endcaps of arbitrary length for photonic-crystal fibers (PCFs) and photonic-crystal rods (PCRs). In a simple embodiment, this method relies on commercially available fiber fusion splicers only. The method includes two steps: tapering and zipping.

As previously described, PCRs are characterized by a large (greater than about one mm in diameter) silica overcladding. This overcladding leads to a considerably larger size and thermal mass compared to standard fibers (e.g., fibers for telecommunications). Therefore, PCRs are not amenable to being processed with standard fusion splicers because (a) their dimensions are incompatible with key splicer features (mainly, electrode spacing or filament size), and (b) higher temperatures and/or longer fusion times are required to cause the collapse of the inner holes than are available on such splicers.

Some embodiments of the present invention utilize a simple first step to overcome this problem—tapering down the PCR over-cladding near the facet by grinding, lapping, or shaving it on a commercial fiber polisher.

FIG. 3D is an end-view schematic diagram of a high-peak-power rare-earth-doped photonic-crystal rod 301 partially fabricated into having a beam-expanding endcap by applying a protective epoxy cap 308 that is later to be removed. FIG. 3E is a side-view schematic diagram of PCR 301. FIG. 3F is a cross-section schematic diagram of PCR 301. In some embodiments, before and during the tapering, the temporary epoxy cap 308 is applied to the PCR's end 316 to seal the PCR holes and prevent contamination during grinding or polishing. PCR 301 starts with a rod 310 having photonic-crystal-rod holes 311, the ends of which are sealed with cap 308, e.g., a polymer such as epoxy. In some embodiments, a recommended material for the epoxy cap is Crystalbond™, an inexpensive and residue-free adhesive of high viscosity and extremely short (less than ten seconds) hardening time. One current source is Electron Microscopy Sciences, P.O. Box 550, 1560 Industry Road, Hatfield, Pa. 19440; also at (www.emsdiasum.com/microscopy/products/materials/adhesives.aspx?mm=9).

FIG. 3G is an end-view schematic diagram of a high-peak-power rare-earth-doped photonic-crystal rod 302 partially fabricated into having a dispersing endcap after tapering. FIG. 3H is a side-view schematic diagram of PCR 302. FIG. 3I is a cross-section schematic diagram of PCR 302. Some embodiments use a commercial rough, waterproof sanding pad (e.g., 220 grit SiC sandpaper) mounted to a standard rotary fiber polisher. The taper 315 reduces the over-cladding diameter to a value compatible with fusion splicers over a suitably short portion of the rod near the facet, and also does not compromise the rigidity of the rod and, therefore, does not introduce bend loss.

FIG. 3J is a microphotograph of PCR 304 after tapering the end and before removing the epoxy cap and collapsing the air cladding to form the beam-expanding endcap. In some embodiments, the epoxy cap is removed by breaking the rod 2-3 mm from the PCR facet 318.

In some embodiments, a second step includes piece-wise thermal collapsing of cladding holes ("zipping"). The fabrication of endcaps of arbitrary length on PCFs or end-tapered PCRs (both hereafter referred to as "the fiber") is illustrated in FIGS. 7A, 7B, 7C, and 7D.

In some embodiments, the method includes the following operations: (a) positioning the fiber tip into the heating zone of the splicer, i.e., the space between the electrodes in an arc splicer or the filament oven in a filament splicer, respectively; (b) running a fusion splicing cycle that provides sufficient heat to collapse the fiber inner channels in the heating zone— this operation forms a preliminary endcap (in some embodiments, the heating process during the fusion cycle is controlled by setting appropriate values for the current in the arc discharge (or in the filament) and fusion time. Setting these parameters is a standard procedure in the use of commercial fusion splicers. In some embodiments, the amount of heat supplied to the fiber should be just enough to collapse the channels, not more. Excessive heating may result in bending of the fiber tip.); (c) feeding the fiber through such that the inner edge of the preliminary endcap approximately corresponds to the edge of the heating zone (in some embodiments, this operation can be executed very accurately by using the electronically controlled step motor that positions the splicer holder (in manual setting) and the splicer display as the monitor); and (d) running the fusion cycle again—the inner channels will zip up inward over the width of the heating zone, thus extending the existing endcap. Steps (c) and (d) can be repeated an arbitrary number of times to obtain the desired endcap length.

Figure 4A:
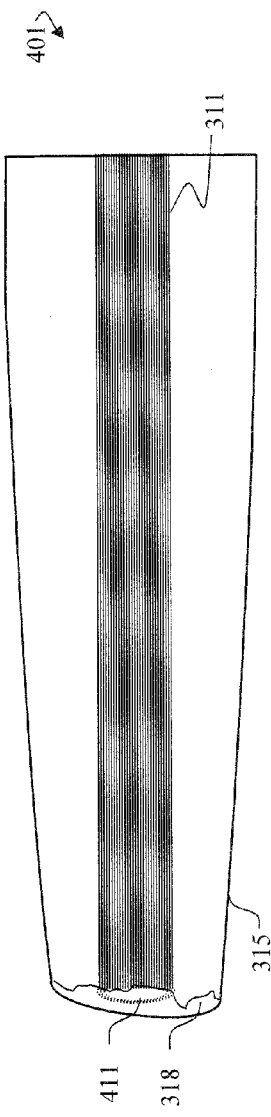
FIG. 4A is a side-view schematic diagram of a high-peak-power rare-earth-doped photonic-crystal rod (PCR) 401 partially fabricated into having a beam-expanding endcap.

FIG. 4A is a side-view schematic diagram of a tapered high-peak-power rare-earth-doped photonic-crystal rod 401 partially fabricated into having a beam-expanding endcap after tapering and removing the epoxy cap. In the embodiments of FIGS. 4A-4D, the taper 315 is formed before collapsing or filling the holey region of the endcap, e.g., by melting the rod or by filling with an index-matching substance. In some embodiments, a vacuum is applied via the far end of the holey region to assist the collapsing/filling. At this point, the holey region end 411 is at the rod end.

Figure 4B:
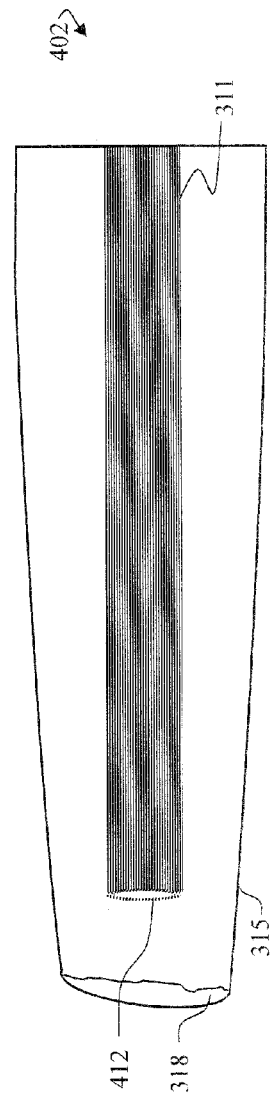
FIG. 4B is a side-view schematic diagram of PCR 402 after partially collapsing the holey region of the endcap.

FIG. 4B is a side-view schematic diagram of a high-peak-power rare-earth-doped photonic-crystal rod 402 after partially collapsing/filling the holey region of the endcap. At this point, the holey region end 412 is a short distance in from the rod end.

Figure 4C:
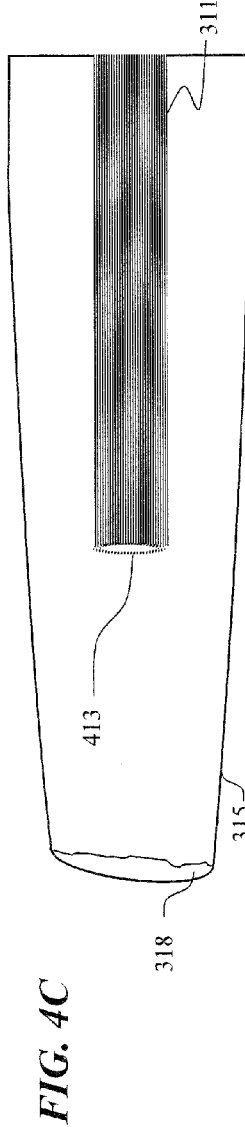
FIG. 4C is a diagram of PCR 403 after further collapsing the holey region of the endcap.

FIG. 4C is a side-view schematic diagram of a high-peak-power rare-earth-doped photonic-crystal rod 403 after further collapsing/filling the holey region of the endcap. At this point, the holey region end 413 is a further distance in from the rod end.

Figure 4D:
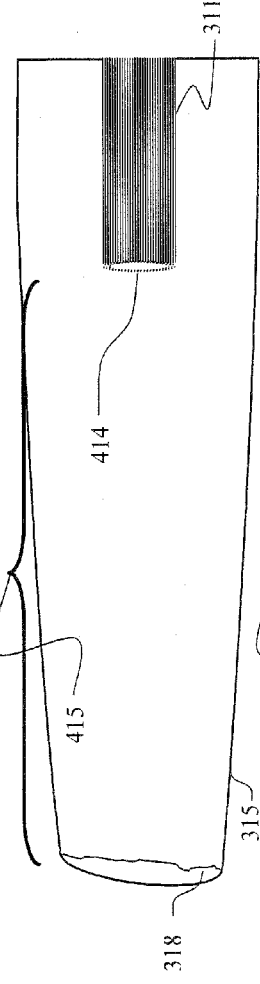
FIG. 4D shows PCR 404 after yet more collapsing the holey region of the endcap.

FIG. 4D is a side-view schematic diagram of a high-peak-power rare-earth-doped photonic-crystal rod 404 after yet further collapsing/filling the holey region. At this point, the holey region end 414 is slightly further than the desired distance from the rod end to allow for removal of material during the angle-polishing process of the rod end 318 to form end facet 319.

Figure 4E:
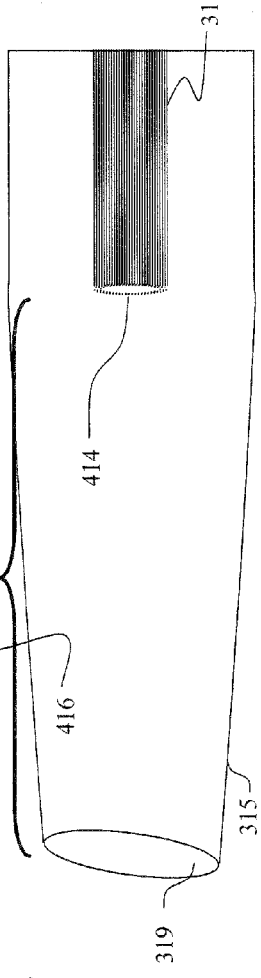
FIG. 4E shows PCR 404 after angle polishing the end of the endcap to form the rod facet.

FIG. 4E is a side-view schematic diagram of a high-peak-power rare-earth-doped photonic-crystal rod 404 with a finished endcap 416 having end facet 319. At this point, a sufficient amount of material is removed from the end facet 319 during the angle-polishing process such that the holey region end 414 is at its final position and desired distance from the polished rod end.

Figure 4F:
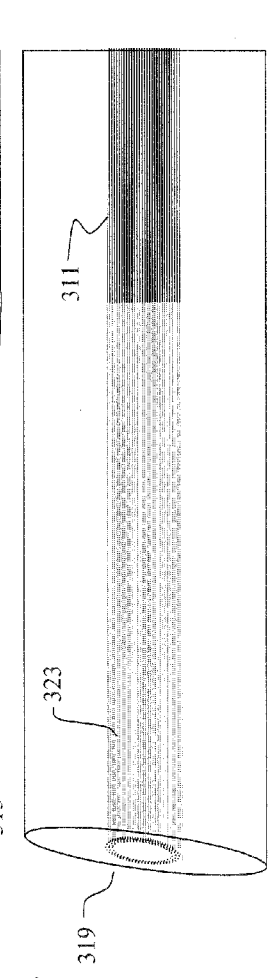
FIG. 4F is a side-view schematic diagram of PCR 405 after injecting an index matching compound into the air cladding at the rod end and polishing the rod end to form a beam-expanding endcap and facet.

FIG. 4F is a side-view schematic diagram of a high-peak-power rare-earth-doped photonic-crystal fiber or rod 405 with a beam-expanding endcap formed by an index-matching compound drawn into the air cladding 311. The index-matching compound creates a non-guiding region 323 in the fiber/rod and allows the beam within the core to freely expand. The fiber/rod does not need to be heated and sealed by an arc from a fusion splicer and is therefore not tapered. The compound seals the air cladding, which allows angle-polishing of the fiber/rod end.

Figure 5A:
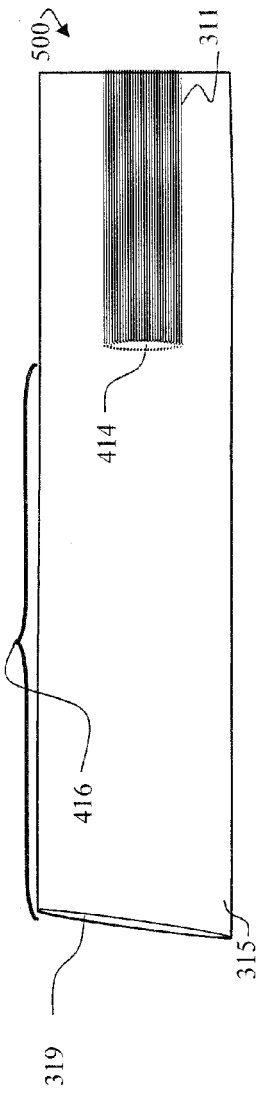
FIG. 5A is a side-view schematic diagram of a high-peak-power rare-earth-doped photonic-crystal fiber (PCF) 500 after faceting and collapsing the holey region of the endcap.

FIG. 5A is a side-view schematic diagram of a high-peak-power rare-earth-doped photonic-crystal fiber (PCF) 500 after collapsing the holey region of the endcap and angle-polishing the end facet 319. In some embodiments, the outer dimension of the PCF is small enough (or the fusion splicer is large enough) that the fiber can be placed into the fusion splicer without tapering, and so no tapering need be done. In some embodiments, polishing of the fiber facet 319 is performed after collapsing the holey region, such that the collapsed region seals the rod's end and prevents contamination of the inner holey region 311 further down the rod 500 during polishing the facet 319.

Figure 5B:
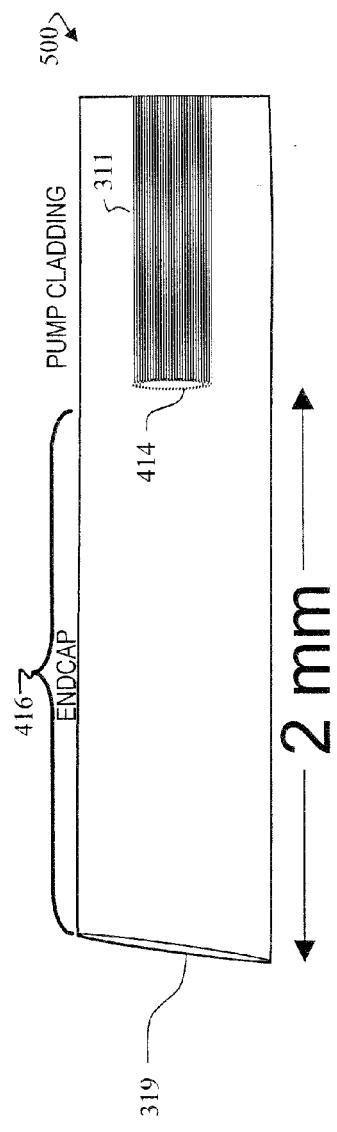
FIG. 5B is a microphotograph of PCF 500.

FIG. 5B is a microphotograph of PCF 500 having an endcap fabricated with the above method on a 40-μm-core PCF. This microphotograph corresponds to the diagram of FIG. 5A.

Figure 6:
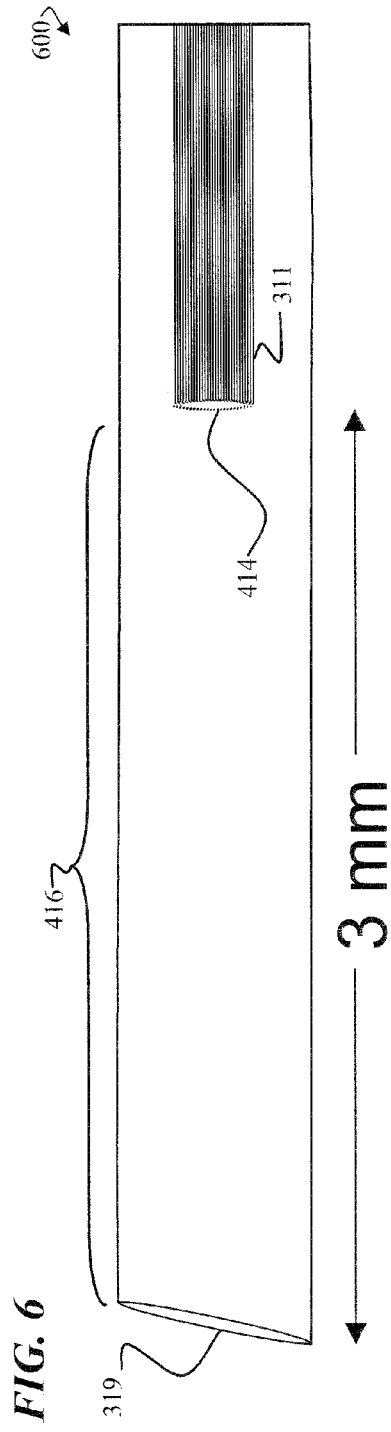
FIG. 6 is a microphotograph of a photonic-crystal rod (PCR) 600 after faceting and collapsing the holey region of the endcap.

FIG. 6 is a microphotograph of PCR 600 after collapsing the holey region a sufficient length and angle-polishing the endcap of a 70-μm-core PCR. These endcaps are the longest ever obtained in photonic-crystal fibers. In particular, the endcap on the PCR is the first obtained for this type of fiber.

FIG. 7A is a side-view block diagram of a system 700 for forming a beam-expanding endcap onto high-peak-power rare-earth-doped photonic-crystal rod 310 at a time before collapsing the holey region of the endcap. In some embodiments, the heating apparatus 710 is a conventional fiber-fusion or fiber-splicing device. PCF or PCR 310 is inserted into the hole of heating apparatus 710. In some embodiments, heating apparatus 710 is oriented such that the axis of its hole is vertical, in order to prevent any bending of the fiber or rod being processed. In some embodiments of FIGS. 7A-7G, a vacuum is applied to the heating apparatus 710 and/or the fiber or rod 310 to prevent leaving any air bubbles after collapsing the holes. In some embodiments, the heating apparatus is flushed with argon to provide an inert environment and prevent contamination during the collapsing process.

FIG. 7B is a side-view block diagram of a system 700 at a time after applying heat and collapsing the end portion of the holey region of the endcap. FIG. 7C is a side-view block diagram of a system 700 at a time after moving the endcap further into the heating region. FIG. 7D is a side-view block diagram of a system 700 at a time after further collapsing the end portion of the holey region of the endcap.

FIG. 7E is a side-view block diagram of photonic-crystal rod 310 at a time after collapsing the holey region 311 of the endcap 416 and angle-polishing the end 318.

FIG. 7F is an end-view block diagram of system 700 having a circular hole 711, used for some embodiments of FIG. 7A, that is useful for collapsing the holey region 311 of a PCR 310 that is cylindrical or otherwise fits within hole 711.

FIG. 7G is an end-view block diagram of a system 701 for forming a beam-expanding endcap onto ribbon-like high-peak-power rare-earth-doped photonic-crystal rod. In some embodiments, system 701 includes a heating block 720 having a hole 721 that is substantially wider than its height, in order to effectively heat a photonic-crystal ribbon such as shown in FIG. 8A.

Figures 8A, 8B:
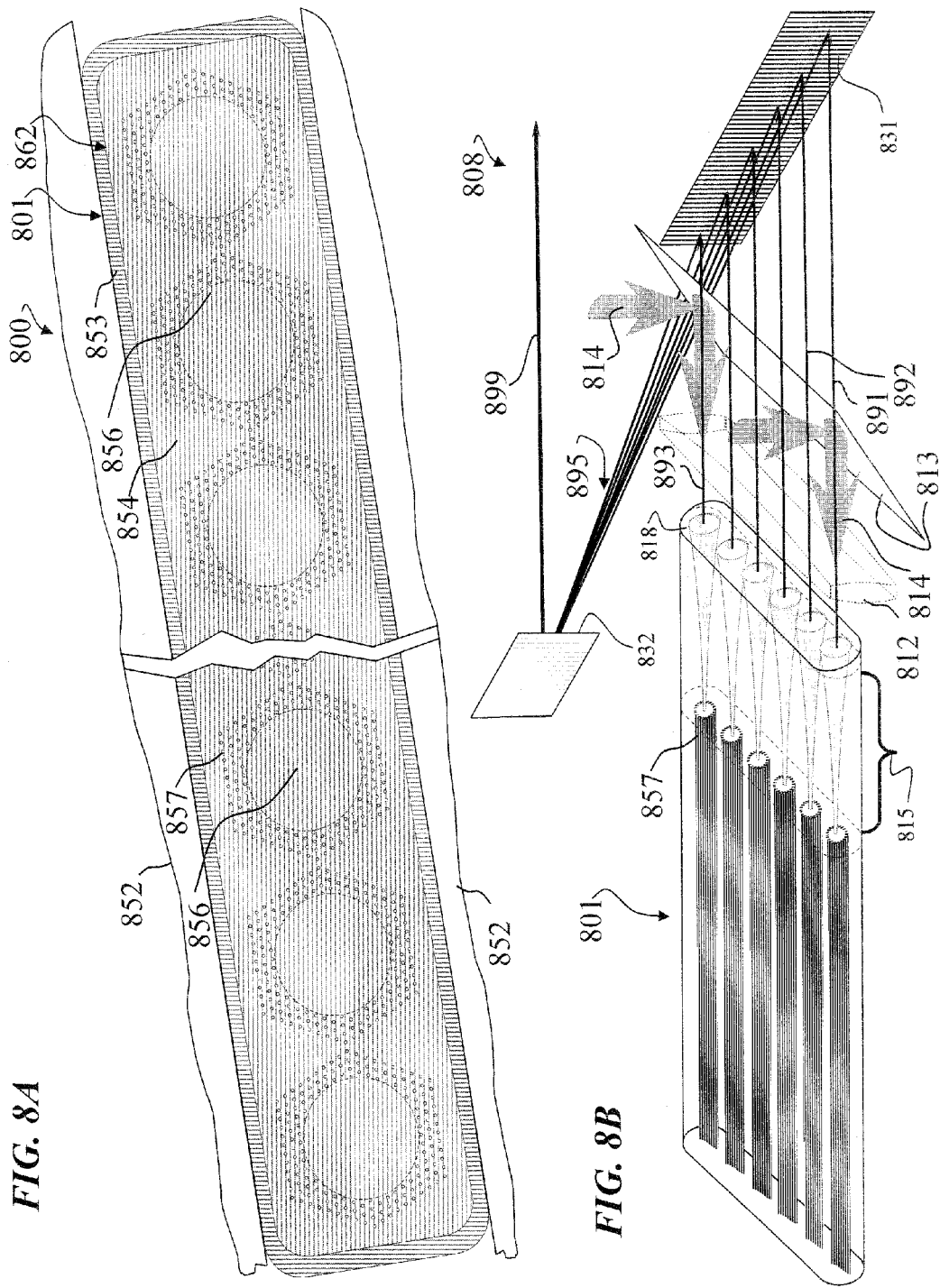
FIG. 8A is a cross-section-view schematic diagram of a ribbon-PCR system 800 having a ribbon-like high-peak-power rare-earth-doped photonic-crystal rod (PCR ribbon).
FIG. 8B is a perspective-view schematic diagram of a ribbon-like high-peak-power rare-earth-doped photonic-crystal-rod spectral-beam combiner output-stage system 808.

FIG. 8A is a cross-section-view schematic diagram of a system 800 having a ribbon-like high-peak-power rare-earth-doped photonic-crystal rod (also called a PCR ribbon) 801. In some embodiments, system 800 includes a heat sink 852 surrounding a double-clad multi-core ribbon 801, which has an outer cladding 853 surrounding inner cladding 854 to contain pump light inside portion 862 so that the pump light can enter the plurality of side-by-side cores 856, each of which is surrounded by a holey region 857. In some embodiments, each holey region 857 is formed with an outer shape (such as a plurality of hexagons, one surrounding each core 856) that allows pump light to enter the cores from all sides while also reducing the lateral distances between the cores and the heatsink material 852.

FIG. 8B is a perspective-view schematic diagram of a ribbon-like high-peak-power rare-earth-doped PCR ribbon spectral-beam-combiner power-amplifier output-stage system 808. In some embodiments, system 808 includes a PCR ribbon 801 that is end-pumped by pump light 814 reflecting off dichroic mirror/beamsplitter 813 through a lens array 812 into facet 818 of PCR ribbon 801. In some embodiments, PCR ribbon 801 includes an endcap 815 where the holey regions 857 are collapsed or filled, in order that the output beams expand before they reach facet 818 to prevent damage to the facet by their high-intensity optical radiation. In some embodiments, the output beams 891, 892, through 893 are of successively shorter wavelengths and are formed into parallel beams by lens 812 (e.g., a doubly telecentric lens), and thus diffract off first diffraction grating 831 at successively different angles to form a group of converging beams 895, and then all reach a single overlapped spot on second diffraction grating 832 (which is parallel to, and has a grating pattern substantially identical to, grating 831), wherein the respective wavelengths and core-to-core spacings are selected such that all beams converge to a single spot on grating 832. All of the beams diffract off grating 832 in one spectrally combined output beam 899. In some embodiments, each beam 891-893 is of a narrow linewidth; however, the second grating 832 removes linewidth spreading introduced by the first grating 831. In some embodiments, system 808 forms the output power amplifier for a plurality of master oscillators as described above for FIG. 1B, wherein each master oscillator is wavelength-tuned to a respective wavelength suitable for spectral combining by grating 831, grating 832, the grating spacing, and the core-to-core spacing.

Some embodiments of the present invention optionally include certain aspects disclosed in U.S. patent application Ser. No. 11/342,336, titled "APPARATUS AND METHOD FOR SPECTRAL-BEAM COMBINING OF HIGH-POWER FIBER LASERS" (which issued as U.S. Pat. No. 7,199,924 on Apr. 3, 2007) and Ser. No. 11/342,337, titled "METHOD AND APPARATUS FOR SPECTRAL-BEAM COMBINING OF HIGH-POWER FIBER LASERS" (which issued as U.S. Pat. No. 7,233,442 on Jun. 19, 2007), which are hereby incorporated by reference in their entirety.

Figure 8C:
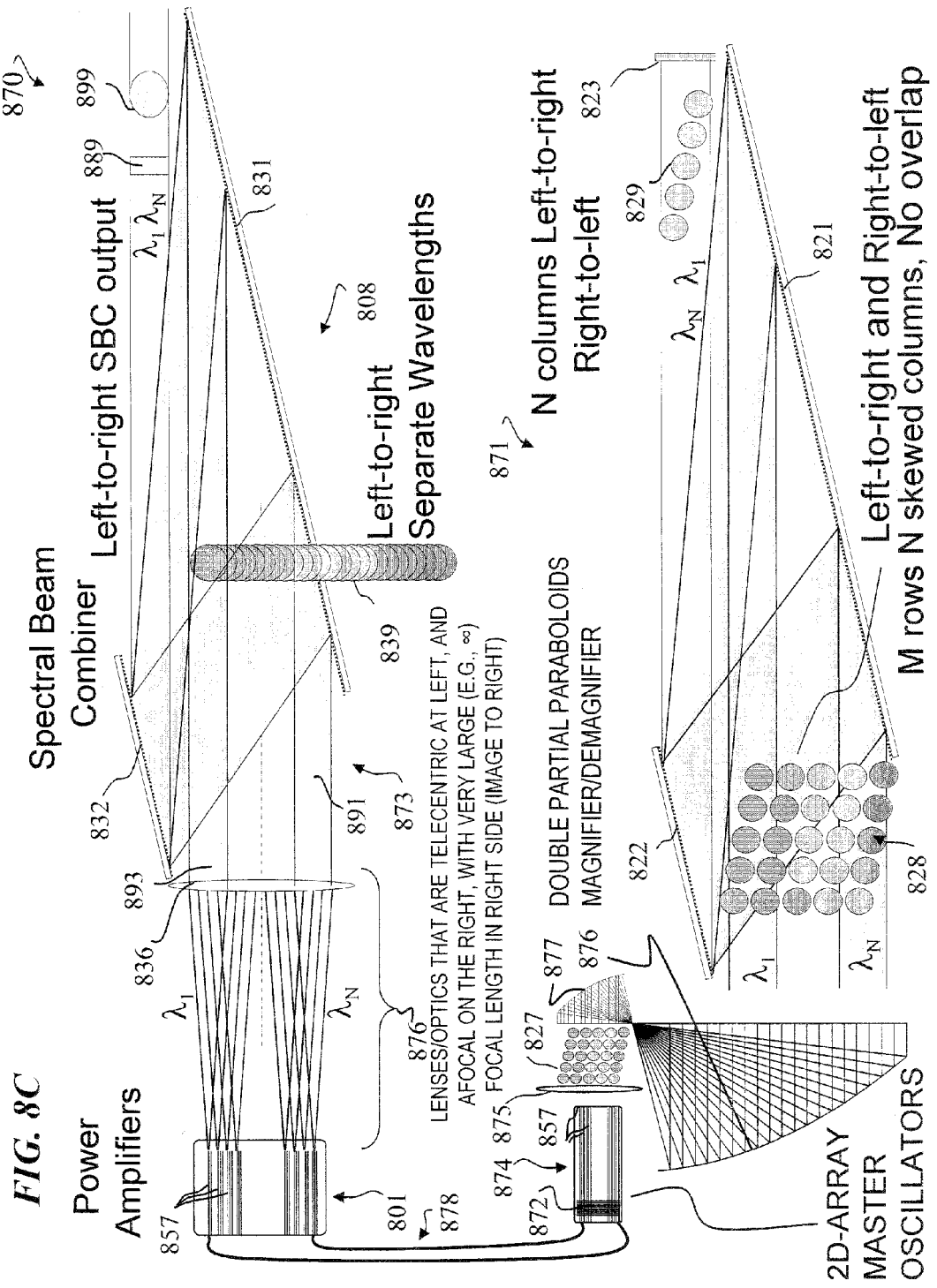
FIG. 8C is a plan-view schematic diagram of a master-oscillator/power-amplifier (MOPA) high-peak-power rare-earth-doped photonic-crystal-ribbon laser system 870 using a ribbon-like high-peak-power rare-earth-doped photonic-crystal rod spectral-beam combiner output-stage system 808.

FIG. 8C is a plan-view schematic diagram of a master-oscillator/power-amplifier (MOPA) high-peak-power rare-earth-doped photonic-crystal-ribbon laser system 870 using PCR-ribbon power-amplifier output-stage system 808. In some embodiments, system 808 includes a PCR ribbon 801 power amplifier having a plurality of parallel side-by-side photonic-crystal-fiber cores 857, a lens/focusing unit 836 that forms a plurality of parallel beams 891-893 of wavelengths $\lambda_1$-$\lambda_N$ (which, in some embodiments, are circular Gaussian beams overlapped one to another such as shown in schematic pattern 839), which are spectrally combined into a single output beam 899 by the spectral-beam combiner 873 formed by parallel gratings 831 and 832. In some embodiments, lens unit 836 is a telecentric lens having a very long focal length (e.g., infinite) to the right.

In some embodiments, master oscillator 871 also includes a photonic-crystal ribbon 874 having a partially reflecting grating 872 at its left end, and a spectral-beam combiner (gratings 821 and 822) and back mirror 823 at its right end to form a lasing cavity for a plurality of different-wavelength beams of wavelengths $\lambda_1$-$\lambda_N$. In some embodiments, the distance between the two gratings 821 and 822 can be increased in order to narrow the linewidth of each lasing beam, and/or mirror 823 can be placed at a suitable position (e.g., further away) and sized (e.g., smaller radius) to select a suitably narrow linewidth (with a suitable adjustment to the core-to-core spacings of the photonic-crystal waveguides 857). In some embodiments, lens unit 875 is a telecentric lens having a very long focal length (e.g., infinite) to the right. In some embodiments, paraboloid-mirror magnifiers/demagnifiers 876 and 877 are each partial (e.g., half) paraboloids, and are used for two-dimensional enlarging of the parallel beam pattern 827 to form parallel beam pattern 828 left-to-right and two-dimensional shrinking of the parallel beam pattern 828 to form parallel beam pattern 827 right-to-left. In some embodiments, the beams at the end of PCR ribbon 874 are circular Gaussian beams separated one from another such as shown in schematic pattern 827, and the parallel beams between partial paraboloid 876 and grating 821 are circular Gaussian beams non-overlapped one to another such as shown in schematic pattern 828. In some embodiments, the combined feedback beam 829 includes a plurality of side-by-side partially combined component beams that together are of a different height than the height 889 of the output beam 899. In some embodiments, the photonic-crystal waveguides 857 of PCR ribbon 874 and the photonic-crystal waveguides 857 of PCR ribbon 801 are of very low NA (which would have high bending losses) in order to support a single mode (e.g., LP01), but are connected to each respective other by connection 878 formed of one or more ribbons and/or individual fibers of a much higher NA and much lower bending losses, in order to provide a more compact form factor. In some embodiments, the PCR ribbons are end-pumped as shown in FIG. 8B. In some embodiments, the connection 878 also includes optical isolators and/or narrow band-pass filters (BPFs).

FIG. 8D is a cross-section-view schematic diagram of a preform 861 configured to compensate for lateral shrinkage. In some embodiments, preform 861 is heated to a melted or partially melted state, and a multicore ribbon is then pulled to a final desired cross-section and length. The lateral shrinkage naturally occurs due to surface tension of the melted glass when ribbon 862 (see FIG. 8E) is pulled from the preform 861. The ribbon-like high-peak-power rare-earth-doped-core photonic-crystal-rod 862 (herein also called ribbon-rod 862) includes pump-cladding 865 and core portions 868. In some embodiments, ribbon-rod 862 is sandwiched between heat-sink portions 852 (see FIG. 8A). Referring again to FIG. 8D, in some embodiments, each preform core 866 and the surrounding photonic-crystal hole pattern 867 is wider than high in a ratio (e.g., empirically derived) that, once the final ribbon is pulled from the melting preform, the pulling process will reshape into the desired final shape and ratio (e.g., circular cross-sectioned cores), as shown in FIG. 8E. The portion 864 of the preform 861, when pulled, forms the pump cladding 865 (i.e., the region into which the pump light is to be injected) of ribbon-rod 862.

FIG. 8E is a cross-section-view schematic diagram of a high-peak-power rare-earth-doped-core photonic-crystal ribbon-rod 862. In some embodiments, an outer cladding is added to the outer edge such that a heatsink can be added without disrupting pump-light flow, while in other embodiments, no outer cladding is used (e.g., air (for terrestrial, naval or aircraft uses) or a vacuum (for spaceship uses) forms the outer cladding).

FIG. 8F is a cross-section-view schematic diagram of a polarizing PCF or PCR 880 having a single core 868 having one or more stress rods 882 on two opposite sides of the core to induce birefringence to preferentially support a single polarization state. In some embodiments, a pump cladding 865 carries the pump light down the length of the fiber, which enters the core 868 along its entire length, and an optional outer cladding 863 keeps the pump light inside its inner radius.

FIG. 8G is a cross-section-view schematic diagram of a polarizing PCF or PCR ribbon (or ribbon-like high-peak-power rare-earth-doped photonic-crystal-rod) 881 having a plurality of separate cores 868 each having one or more stress rods 882 on two opposite sides of each core to introduce a non-linearity to preferentially support a single linear polarization mode in each core. In some embodiments, a pump cladding 865 carries the pump light down the length of the fibers, which enters the cores 868 along their entire length, and an optional outer cladding 883 keeps the pump light inside its inner surface.

FIG. 8H is a cross-section-view schematic diagram of ribbon PCR 887 having generally planar stress-inducing regions 886 that run the length of the ribbon PCR 887 in order to induce birefringence and single-polarization behavior in cores 868.

FIG. 8-I is a cross-section-view of a central portion of the cleaved end of a high-peak-power rare-earth-doped photonic-crystal rod (PCR) 890, according to some embodiments of the invention. In some embodiments, the core diameter, denoted here as CR, is 100 microns, and the pump-cladding diameter, denoted here as PUMP CDG is 280 microns. The core diameter is made large in order to spread the high-power optical pulse over a larger area to reduce the power density, and thus reduce the optical damage to the core from high-power pulses. The NA of the core is kept very low (e.g., NA=0.01 to 0.02, in some embodiments) in order to support only a single low-order mode (e.g., LP01) in the large-mode-area core 868, in order to shorten the interaction length of the high-power pulse with the core material (e.g., silica, in some embodiments), which reduces NLEs. The ratio of cladding diameter to core diameter is kept small in order to force more pump light into the core over a shorter distance. Pump cladding 865 carries the pump light down the length of the fiber, which enters the core 868 along its entire length, and a large-diameter outer cladding 863 keeps the pump light inside its inner radius, as well as providing substantial stiffness to the PCR 890. In some embodiments, the outer diameter of outer cladding 863 is well over 1 mm, to provide stiffness. In some embodiments, the rod has an outer cladding glass having a high Young's modulus value selected to increase stiffness of the rod.

In some embodiments, the core NA is 0.09 or less and larger than zero. In some embodiments, the core NA is 0.08 or less and larger than zero. In some embodiments, the core NA is 0.07 or less and larger than zero. In some embodiments, the core NA is 0.06 or less and larger than zero. In some embodiments, the core NA is 0.05 or less and larger than zero. In some embodiments, the core NA is 0.04 or less and larger than zero. In some embodiments, the core NA is 0.03 or less and larger than zero. In some embodiments, the core NA is 0.02 or less and larger than zero. In some embodiments, the core NA is 0.015 or less and larger than zero. In some embodiments, the core NA is 0.01 or less and larger than zero. In some embodiments, the core NA is 0.008 or less and larger than zero. In some embodiments, the core NA is 0.005 or less and larger than zero.

Some embodiments obtain the following performance: a pulse duration of 1 ns, obtain a peak power of 4.5 MW, a pulse energy of 4.3 mJ, an average power of 40 W, a spectral linewidth of 20 GHz, and a beam-quality $M^2$ value of 1.3. In some embodiments, the following design features of a 100-micron-core, Yb-doped, photonic crystal rod 890 are instrumental to achieve this performance: the number of holes removed from the native hexagonal array to produce the core is 19, the core diameter is 100 microns, the diameter of each cladding hole is 5.88 microns, the spacing between holes (also known as the hole pitch) is 17.3 microns, the diameter-to-pitch ratio is 0.34, the core NA is less than 0.02, the pump-cladding diameter is 280 microns, the diameter of the outer cladding 863 (which is made of pure glass) is 1490 microns, the Yb concentration in the core is $3.0 \times 10^{25}$ $m^{-3}$ (corresponding to 976 nm-wavelength pump absorption of about 33 dB/m), the rod material are fused silica with co-dopants of Fluorine and Aluminum (used in the core only), and the rod is about one meter long. In some embodiments, the PCR 890 is available custom made by Crystal Fibre (Crystal Fibre A/S, Blokken 84, DK-3460 Birkerod, Denmark). Note that as far as the inventors know, this PCR is the largest-core fiber ever to exhibit single-transverse-mode operation and the fiber with the lowest core NA ever. In some embodiments, the fiber is end-pumped with a pump wavelength of 976 nm, an incident pump power of about 78 Watts (this is the pump power towards the end facet), and a launched pump power of about 67 Watts (this is the pump power that gets into the fiber after coupling losses at the end facet).

In other embodiments, PCR 890 is another PCR having core diameter of 70 microns that the inventors have used. From this 70-micron-core PCR, the following performance was obtained: a pulse duration of 1 ns, a peak power of 3.0 MW, a pulse energy of 3.1 mJ, an average power of 29 W, a spectral linewidth of 13 GHz, and a beam-quality $M^2$ value of 1.1. In some embodiments, the following design features of a 70-micron-core, Yb-doped, photonic crystal rod 890 are used to achieve this performance: number of holes removed from the native hexagonal array to produce the core is 19, the core diameter is 70 microns, the diameter of each cladding hole is 1.68 microns, the spacing between holes (also known as the hole pitch) is 12.0 microns, the diameter-to-pitch ratio is 0.14, the core NA is less than 0.02, the pump-cladding diameter is 197 microns, the diameter of the outer cladding 863 (which is made of pure glass) is 1650 microns, the Yb concentration in the core is $3.0 \times 10^{25}$ m$^{-3}$ (corresponding to 976 nm-wavelength pump absorption of about 33 dB/m), the rod material are fused silica with co-dopants of Fluorine and Aluminum (used in the core only), and the rod is about one meter long. In some embodiments, the fiber is end-pumped with a pump wavelength of 976 nm, an incident pump power of about 55 Watts, and a launched pump power of about 45 Watts.

FIG. 9A is a schematic diagram of a multi-stage amplifier PCF or PCR ribbon MOPA laser system 900. In some embodiments, system 900 includes a PCF or PCR ribbon 915 having a plurality of parallel photonic-crystal-fiber cores 917 in a monolithic substrate 910 to provide a plurality of amplification stages. In some embodiments, the seed-laser signal from master oscillator 110 is injected through an end of one of the corner reflectors 929, through band-pass filter (BPF) 914 at the near end (in some embodiments, each one of the BPFs 914 serve a plurality of side-by-side beams) and into a first photonic-crystal-fiber core 917 (e.g., one just to left of the center, in order that the highest power is in the cores at the outside edges, for better heat distribution). After exiting the far end of the first photonic-crystal-fiber core 917, the beam passes through dichroic mirror/beamsplitter 913 (which, in some embodiments, serves a plurality of side-by-side beams, and is used to inject counter-propagating pump light into each of the left-hand cores), reflects twice from the upper corner reflector 929 and after going through the far-end BPF 914, re-enters into a second photonic-crystal-fiber core 917 (e.g., one just to the right of the center). After exiting the near end of the first photonic-crystal-fiber core 917, the beam passes through the lower-right-hand dichroic mirror/beamsplitter 913 (used, in some embodiments, to inject counter-propagating pump light into a plurality of side-by-side beams, one into each of the right-hand cores), reflects twice from the lower corner reflector 929 and after going through the near-end BPF 914, re-enters into a third photonic-crystal-fiber core 917 (e.g., one just to the left of the first core 917). In some embodiments, after a plurality of such round trips through successive cores, the beam exits system 900.

FIG. 9B is a plan-view schematic diagram of MOPA laser system 900, as described above.

FIG. 9C is an elevation-view schematic diagram of MOPA laser system 900, as described above.

Figure 10:
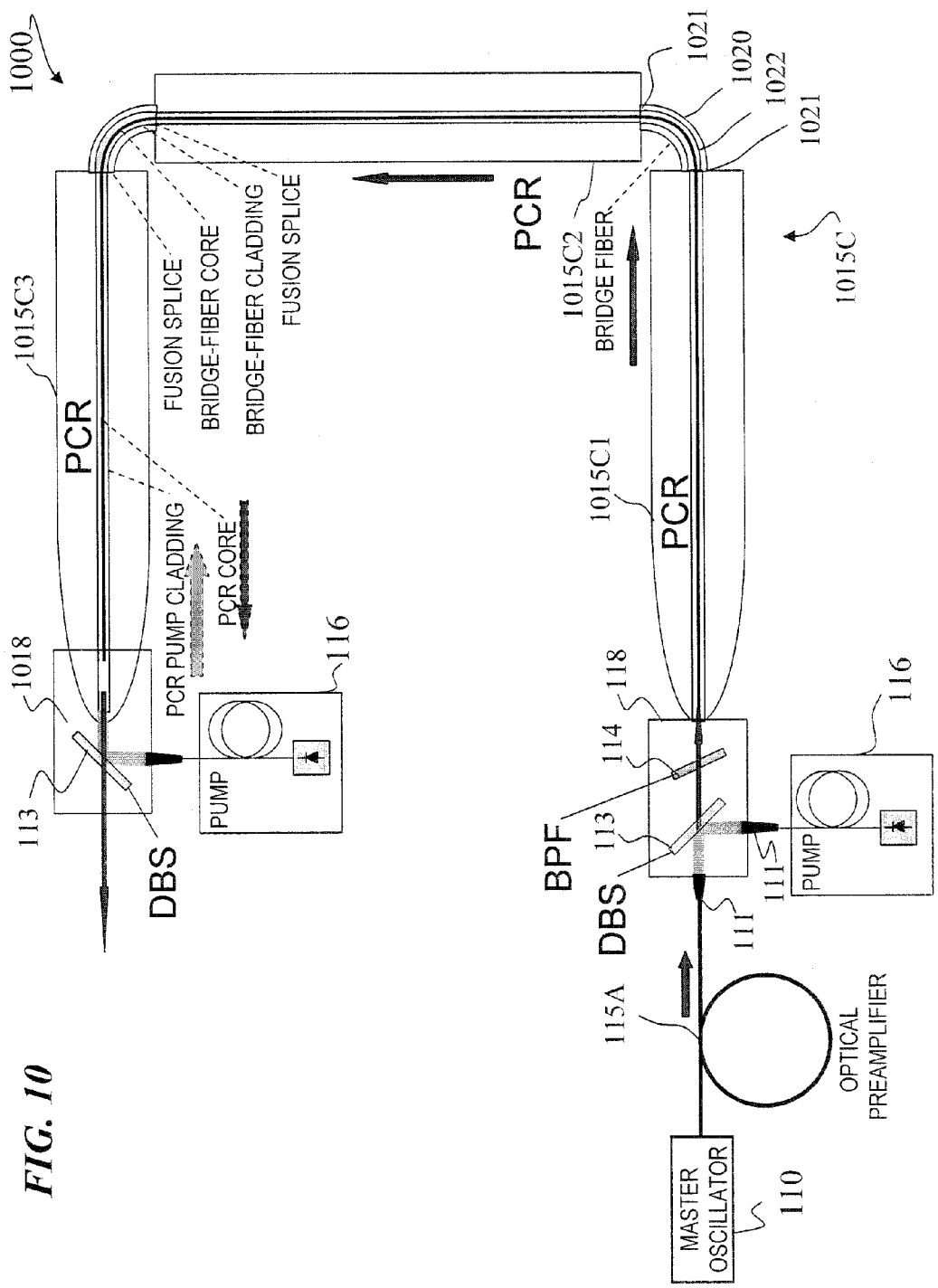
FIG. 10 is a plan-view schematic diagram of MOPA laser system 1000 having a segmented final gain section having fiber splices.

FIG. 10 is a plan-view schematic diagram of a multi-segment MOPA laser system 1000 having a segmented final gain section with a plurality of segments connected using fiber splices. In some embodiments, system 1000 includes a compound PCF or PCR 1015C having a plurality of successive photonic-crystal-fiber (PCF) or photonic-crystal-rod (PCR) segments 1015C1, 1015C2, 1015C3, to provide a plurality of amplification segments (e.g., for configurations that achieve a smaller footprint). In some embodiments, the seed-laser signal from master oscillator 110 is amplified by optical preamplifier 115A, and then passes through connector 111 into pump block 118 including dichroic beamsplitter (DBS) mirror 113 and band-pass filter (BPF) 114 at the lower-right end and into the core of a first photonic-crystal-rod segment 1015C1. After exiting the far end of the core of first photonic-crystal-rod segment 1015C1, the beam passes through a curved pigtail 1020 into the core of second photonic-crystal-rod segment 1015C2, then through a curved pigtail 1020 into the core of final photonic-crystal-rod segment 1015C3, and then out through pump block 1018.

In some embodiments of the system shown in FIG. 10, more than one middle segment 1015C2 is provided, each linked by a respective bridge fiber 1020 to the next, while, in other embodiments, the middle segment 1015C2 is omitted and the first segment 1015C1 is connected to the final segment 1015C3 using a bridge fiber 1020. The embodiment shown in FIG. 10 has the bridge fibers providing a bend of about ninety degrees; however, other embodiments use different bend angles (e.g., 180-degree bends to connect parallel PCF segments or PCR segments).

In some embodiments, one or more pump lasers feed pump light in a counter-propagating direction using a DBS minor 113 to reflect pump light from a pump 116 into the output end of PCR 1015C1 while the output signal passes through that DBS minor 113. In some embodiments, each pair of segments 1015C1-1015C2 and 1015C2-1015C3 is connected by welding a bridge fiber 1020, i.e., a short (e.g., in some embodiments, an approximately 1-cm or shorter) bendable piece of low-bend-loss or high NA fiber that is fusion spliced at its ends to two successive segments of the PCR 1015C. The bridge fiber 1020, in some embodiments, is a double-clad passive (undoped) fiber featuring core diameter equal to the PCR core diameter, a core NA high enough to sustain bending without loss (e.g., NA of about 0.1), and cladding diameter equal or larger than the PCR pump cladding. Because of the relatively high NA of the bridge-fiber core 1022, the fiber 1020 can sustain multiple transverse modes, in some embodiments. However, the fundamental mode of the PCR 1015C exhibits high spatial overlap with transverse modes of the bridge fiber 1020 that feature a central maximum (for example, the fundamental mode) and, therefore, correspond to good beam quality. In some embodiments, given the very short length of the bridge fiber, parasitic inter-modal coupling (mode scrambling) is negligible. For these reasons, the signal field propagating in the bridge fiber 1020 does not degrade its spatial quality significantly compared to that in the PCR segments of compound PCR 1015C. As a result, despite the core NA mismatch at the splice 1021 between the bridge fiber 1020 and successive segments of compound PCR 1015C, the splice loss remains low. In some embodiments, a suitably small physical footprint or a particular desired shape is achieved using the folding obtained by the bridge fiber(s). In some embodiments, the bottom sides of two or more of the plurality of segments of compound PCR 1015C are laser-welded to a suitable monolithic substrate (such as a glass substrate that is compatible with the glass of the PCR 1015C, and to which all the relevant components are laser-welded) for physical stability (for example, see the configuration of substrate 1155 of FIG. 11B). In some embodiments, the laser-welded assembly is placed and/or sealed in a housing (e.g., similar to housing 109 of FIG. 1C).

FIG. 11A is a perspective-view schematic diagram of a high-peak-power rare-earth-doped laser-welded PCF or PCR monolithic MOPA laser system 1100. System 1100 is similar in some ways to system 1000 of FIG. 10, except that the bridge fiber connections are replaced by a free-space optical coupling, e.g., using micro lenses 1151 and reflecting prisms 1152, in some embodiments. In some embodiments, the bottom sides of two or more of the plurality of segments (1114C1, 1114C2, 1114C3) of compound PCR 1114C are laser-welded to a suitable monolithic substrate 1155 (such as a glass substrate that is compatible with the glass of the compound PCR 1114C) for physical stability. In some embodiments, the sides of two or more of the plurality of segments of compound PCR 1114C are laser-welded to each other (see FIG. 11C). In some embodiments, the laser-welded assembly 1100 is placed and/or sealed in a housing.

In some embodiments of the systems shown in FIGS. 11A to 11-I, more than one middle segment (e.g., 1114C2) is provided, each related to the next by the optical components shown in the respective figures, while, in other embodiments, the middle segment (e.g., 1114C2) is omitted and the first segment (e.g., 1114C1) is optically connected to the final segment (e.g., 1114C3) by the optical components shown in the respective figures.

FIG. 11B is a side-elevation-view schematic diagram of MOPA laser system 1100 as seen along cut-line 11B of FIG. 11A.

FIG. 11C is an end-view schematic diagram of MOPA laser system 1100 as seen along cut-line 11C of FIG. 11A.

FIG. 11D is a perspective-view schematic diagram of another high-peak-power rare-earth-doped laser-welded PCF or PCR monolithic MOPA laser system 1101. System 1101 is similar in some ways to system 1100 of FIG. 11A, except that one or more of the micro lenses 1151 are replaced by integrated lens caps 1153 that perform the focusing function for the free-space optical coupling that, for example, also uses reflecting prisms 1152. In some embodiments, the lens caps 1153 are polished directly on the ends of the component segments (first segment 1115C1, optionally one or more intermediate segments 1115C2, and final segment 1115C3) of compound PCR 115C, while in other embodiments, lenses are laser-welded (similar to the configuration shown in FIG. 12C, but with the lenses laser-welded or fused onto the ends of component segments (1115C1, 1115C2, 1115C3) of compound PCR 115C). In some embodiments, the lens caps 1153 are configured to perform the focusing function needed to couple the signal and/or pump light across the free-space gap between the segments of compound PCR 115C and prisms 1152. In some embodiments, the bottom sides of two or more of the plurality of segments of compound PCR 115C are laser-welded to a suitable monolithic substrate 1155 (such as a glass substrate that is compatible with the glass of the PCR 115C) for physical stability. In some embodiments, the sides of two or more of the plurality of segments of compound PCR 115C are laser-welded to each other (see FIG. 11F). In some embodiments, the laser-welded assembly 1101 is placed and/or sealed in a housing.

FIG. 11E is a side-elevation-view schematic diagram of MOPA laser system 1101 as seen along cut-line 11E of FIG. 11D.

FIG. 11F is an end-view schematic diagram of MOPA laser system 1101 as seen along cut-line 11F of FIG. 11D.

Figures 11G, 11H:
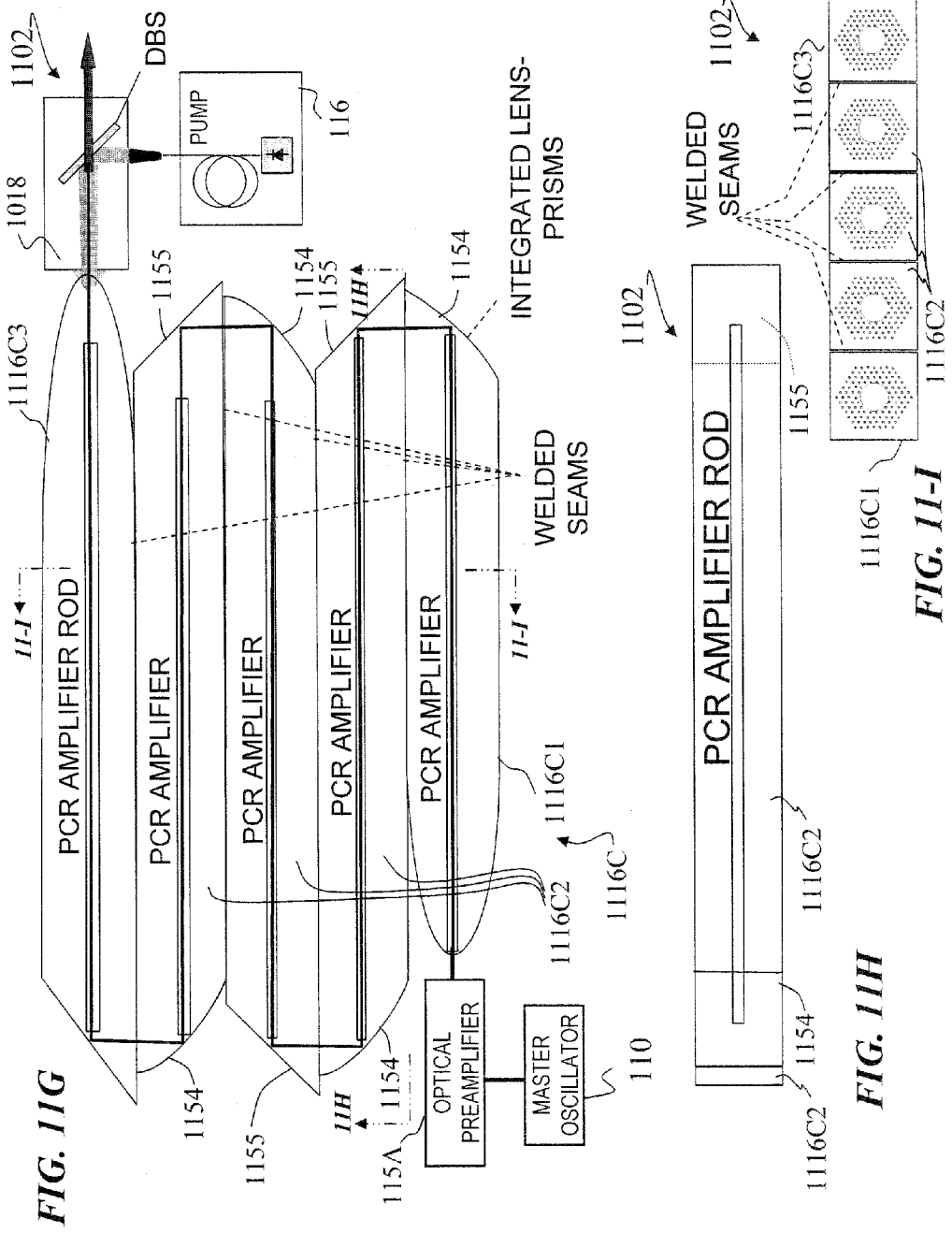
FIG. 11G is a perspective-view schematic diagram of yet another high-peak-power rare-earth-doped laser-welded PCF or PCR MOPA laser system 1102.
FIG. 11H is an elevation-view schematic diagram of MOPA laser system 1102.

FIG. 11G is a perspective-view schematic diagram of yet another high-peak-power rare-earth-doped laser-welded PCF or PCR MOPA laser system 1102. System 1102 is similar in some ways to system 1101 of FIG. 11D, except that one or more of the refracting lens caps 1153 and prisms 1152 are replaced by integrated angled reflecting focusing-mirror endcaps 1154 that perform the focusing function for the internal optical coupling that, for example, also uses flat reflecting prism endcaps 1155, in some embodiments, each of which is formed directly on the ends of PCR segments (1116C1, 1116C2, 1116C3) of compound PCR 1116C. The focusing endcaps 1154 and/or flat endcaps 1155 are reflection coated (e.g., using high-efficiency layered dielectric coatings, in some embodiments) to form an optical path between the ends of successive PCR cores. In some embodiments, the transverse cross sections of PCR segments (1116C1, 1116C2, 1116C3) of compound PCR 1116C have flat sides (e.g., a rectangular (as shown in FIG. 114), hexagonal, octagonal, or other suitable shape) such that when laser-welded together (or, in other embodiments, connected by other material such as index-matching transparent plastic or oil or gel), a continuous internal optical path is formed between the ends of successive PCR cores. In some embodiments, the bottom sides of two or more of the plurality of segments of compound PCR 1116C are laser-welded to a suitable monolithic substrate 1155 (such as a glass substrate (as shown in FIG. 11E) that is compatible with the glass of the PCR 1116C) for physical stability. In other embodiments, only the sides of segments of compound PCR 1116C are welded together, and substrate 1155 is omitted (as shown in FIG. 11H and FIG. 11-I). In some embodiments, the sides of two or more of the plurality of segments of compound PCR 1116C are laser-welded to each other (see FIG. 11-I) for mechanical stability and to form a continuous internal optical path. In some embodiments, the laser-welded assembly 1100 is placed and/or sealed in a housing.

FIG. 11H is an elevation-view schematic diagram of MOPA laser system 1102.

FIG. 11-I is an end-view schematic diagram of MOPA laser system 1102.

FIG. 12A is a schematic diagram of a high-peak-power rare-earth-doped PCF or PCR MOPA laser system 1200 having an improved delivery fiber 1230. In some embodiments, pump laser 116 provides pump light into the output end of PCR 115C through pump block 1218 that includes a dichroic mirror/beamsplitter 113 (see pump block 1018 of FIG. 10). In some embodiments, delivery fiber 1230 includes an input connector endcap 1220 or 1222, and/or an output connector and/or endcap 1210. In some embodiments, delivery fiber 1230 is a hollow-core photonic-crystal (PC) fiber (also called a photonic-bandgap fiber). Further detailed description is provided below.

FIG. 12B is a cross-section-view schematic diagram of an output endcap 1210 of improved delivery fiber 1230. In some embodiments, a tube 1214 (e.g., a glass ferrule tube, in some embodiments) is laser-welded (joint 1215) at one end to the output end of hollow-core PC delivery fiber 1230 and at the other end to output window 1219, in order to seal out contaminants from the PCF holes and hollow core of PC delivery fiber 1230. In some embodiments, output window 1219 is angled and anti-reflection coated at its inner and/or outer surfaces, in order to reduce detrimental reflections. In some embodiments, the length of tube 1214 is sufficient such that the length of inner chamber 1216 allows some spreading of the output-signal beam, in order to reduce the power density as the beam encounters window 1219 and thus reduce optical damage to window 1219 and window surfaces 1218 at high beam powers. In some embodiments, a threaded ferrule connector 1223 (see FIG. 12C) is also included around tube 1214, in order to connect to an external system component.

FIG. 12C is a cross-section-view schematic diagram of an input end 1220 of improved delivery fiber 1230. In some embodiments, input end 1220 includes a tube 1224 (e.g., a glass ferrule tube, in some embodiments) that is laser-welded at one end (joint 1225) to the input end of hollow-core PC delivery fiber 1230 and at the other end to lens 1229, in order to seal out contaminants from the PCF holes and hollow core of PC delivery fiber 1230. In some embodiments, lens 1229 is anti-reflection coated at its inner and/or outer surfaces, in order to reduce detrimental reflections. In some embodiments, the length of tube 1224 is sufficient such that the length of inner chamber 1216 allows lens 1229 to focus the output-signal beam into the hollow core of delivery fiber 1230.

FIG. 12D is a cross-section-view schematic diagram of an alternative input end 1222 of improved delivery fiber 1230. In some embodiments, input end 1222 includes a shaped sealed endcap (in order to seal out contaminants from PCF holes and the hollow core of PC delivery fiber 1230, and to focus the output signal beam) formed from collapsing the PCF holes and hollow core of PC delivery fiber 1230—or fusion splicing the photonic bandgap fiber to a coreless fiber with a suitable diameter, and polishing a focusing surface 1238 onto the input end 1239. In some embodiments, the focusing surface 1238 is coated with a dielectric anti-reflection coating. In some embodiments, a tube 1234 (e.g., a glass ferrule tube, in some embodiments) is laser-welded (joint 1235) at one end to the input end of hollow-core PC delivery fiber 1230, to seal out contaminants from the pump block 1218 (see FIG. 12A). In some embodiments, lens-shaped fused cap 1239 is anti-reflection coated at its inner and/or outer surfaces, in order to reduce detrimental reflections. In some embodiments, the length of the fused portion of cap 1239 is sufficient to allow the lens portion of cap 1239 to focus an incident beam into the hollow core of delivery fiber 1230.

Fiber- or Rod-Based Optical Source Featuring a Large-Core, Rare-Earth-Doped Photonic-Crystal Device for Generation of High-Power Pulsed Radiation and Method In some embodiments, the present invention provides an apparatus that includes a first photonic-crystal optical device that includes a first waveguide that has a diameter of about 40 microns or more and maintains a single transverse mode. In some embodiments, the first waveguide has a diameter of more than 40 microns. In some embodiments, the first optical device is a first photonic-crystal fiber and the first waveguide is a first core of the first photonic-crystal device and is capable of operation with a peak power of about 1 MW or more. In some embodiments, the first core of the first photonic-crystal fiber is capable of operation with a peak power of more than 1 MW. In some embodiments, the first core of the first photonic-crystal device is capable of operation with a near-diffraction-limited output beam having $M^2<1.2$. In some embodiments, the first core of the first photonic-crystal device is capable of operation with a near-diffraction-limited output beam having $M^2<1.2$ to generate linearly polarized pulses and a peak power of about 100 kW or more.

Some embodiments further include one or more wavelength-conversion optical media (e.g., non-linear frequency doublers, optical parametric oscillators and the like) operable to receive high-peak-power input radiation having a first wavelength from the first waveguide of the first photonic-crystal device and to generate radiation having a peak power of about 100 kW or more and of a shorter second wavelength through wavelength conversion. In some embodiments, the second wavelength radiation includes visible light having a wavelength between about 400 nm and about 700 nm. In some embodiments, the second wavelength radiation includes ultraviolet light having a wavelength of about 400 nm or shorter.

Some embodiments further include at least one wavelength-conversion optical medium (e.g., non-linear frequency doublers, optical parametric oscillators and the like) operable to receive high-peak-power input radiation having a first wavelength from the first waveguide of the first photonic-crystal device and to generate radiation having a peak power of at least about 100 kW and of a different second wavelength through wavelength conversion. In some embodiments, the second-wavelength radiation is of a shorter second wavelength than the first wavelength. In some such embodiments, the radiation of the shorter second wavelength is at least 200 kW. In some such embodiments, the radiation of the shorter second wavelength is at least 300 kW. In some such embodiments, the radiation of the shorter second wavelength is at least 400 kW. In some such embodiments, the radiation of the shorter second wavelength is at least 500 kW. In some such embodiments, the radiation of the shorter second wavelength is at least 600 kW. In some such embodiments, the radiation of the shorter second wavelength is at least 700 kW. In some such embodiments, the radiation of the shorter second wavelength is at least 800 kW. In some such embodiments, the radiation of the shorter second wavelength is at least 900 kW. In some such embodiments, the radiation of the shorter second wavelength is at least 1000 kW. In some embodiments, the radiation of the shorter second wavelength includes visible light having a wavelength between about 400 nm and about 700 nm. In some embodiments, the second-wavelength radiation includes ultraviolet light having a wavelength of about 400 nm or shorter. In other embodiments, the second-wavelength radiation is of a longer wavelength than the first wavelength. In some such embodiments, the radiation of the longer second wavelength is at least 200 kW. In some such embodiments, the radiation of the longer second wavelength is at least 300 kW. In some such embodiments, the radiation of the longer second wavelength is at least 400 kW. In some such embodiments, the radiation of the longer second wavelength is at least 500 kW.

In some embodiments, the first optical device is a first photonic-crystal fiber and the first waveguide is a first core of the first photonic-crystal device that supports a mode area having a diameter of about 50 microns or larger and a cladding having a diameter of about 1,000 microns or larger. In some embodiments, the first optical device is a first photonic-crystal fiber and the first waveguide is a first core of the first photonic-crystal device, and the apparatus further includes a first optical isolator, a first narrow-bandwidth filter, and a master-oscillator subsystem operable to generate a narrow-linewidth seed-laser signal operably coupled to the first core of the first photonic-crystal fiber through the first optical isolator and the first narrow-bandwidth filter. In some embodiments, the master-oscillator subsystem further includes a second optical isolator, a second narrow-bandwidth filter, a second photonic-crystal-fiber optical amplifier having a core, and a master-oscillator seed laser operable to generate a seed-laser signal operably coupled to the core of the second photonic-crystal fiber through the second optical isolator and the second narrow-bandwidth filter, wherein the second photonic-crystal fiber outputs the narrow-linewidth seed-laser signal.

In some embodiments, the first waveguide of the first photonic-crystal device is surrounded by a plurality of longitudinal holes that define a transverse extent of the first waveguide, and wherein the holes are closed for a first length at a first end of the first photonic-crystal fiber to form an endcap. In some embodiments, the first optical device is a first photonic-crystal fiber and the first waveguide is a first core of the first photonic-crystal device, and wherein the holes of the first core of the first photonic-crystal fiber have been melted shut for the first length. In some embodiments, the holes of the first waveguide of the first photonic-crystal device have been filled with an index-matching material for the first length. In some embodiments, the endcap of the first photonic-crystal fiber is formed to a diameter smaller than a diameter of the first fiber away from the endcap, and a facet is formed at an end of the endcap of the first fiber. Some embodiments further include a third photonic-crystal fiber having an endcap that is formed to a diameter smaller than a diameter of the third fiber away from the endcap, and having a facet formed at an end of the endcap of the third fiber, wherein the endcap of the first fiber is placed side-by-side to the endcap of the third fiber such that the end facet of the first fiber and the end facet of the second fiber are placed at a center-to-center distance smaller than the diameter of the first fiber away from the endcap of the first fiber.

In some embodiments, the first photonic-crystal device further includes a second waveguide that has a diameter of about 40 microns or more and maintains a single transverse mode. In some embodiments, the first optical device is a first photonic-crystal fiber and the first waveguide is a first core of the first photonic-crystal device, and wherein the first photonic-crystal fiber further includes a plurality of other cores that each have a diameter of about 40 microns or more and that each maintain a single transverse mode. In some embodiments, the first optical device is a first photonic-crystal fiber and the first waveguide is a first core of the first photonic-crystal device, and wherein the first photonic-crystal fiber further includes a plurality of other cores arranged side-by-side generally along a straight line transverse to a length of the first fiber, and wherein the cores each have a diameter of about 40 microns or more and each maintain a single transverse mode, wherein the fiber includes an inner pump cladding surrounding the cores in order to provide pump light into the cores over a length of the fiber, and an outer cladding that contains the pump light.

In some embodiments, the invention provides a method that includes providing a first photonic-crystal device that includes a first waveguide having a diameter of about 40 microns or more, and optically amplifying light in the first waveguide in a single transverse mode. In some embodiments, the first waveguide has a diameter of more than 40 microns. In some embodiments, the amplifying of the light in the first waveguide generates a peak power of about 1 MW or more. In some embodiments, the amplifying of the light in the first waveguide generates a peak power of more than 1 MW. In some embodiments, the amplifying of the light in the first waveguide generates a near-diffraction-limited output beam having $M^2<1.2$. In some embodiments, the amplifying of the light in the first waveguide generates a near-diffraction-limited output beam having ($M^2<1.2$) linearly polarized pulses having a peak power of about 100 kW or more.

Some embodiments of the method further include converting high-peak-power light having a first wavelength from the first waveguide of the first photonic-crystal device to generate light having a peak power of about 100 kW or more of a shorter second wavelength through non-linear wavelength conversion. In some embodiments, the second-wavelength radiation includes visible light having a wavelength between about 400 nm and about 700 nm. In some embodiments, the second-wavelength radiation includes ultraviolet light having a wavelength of about 400 nm or shorter. In some embodiments, the first core of the first photonic-crystal device supports a mode area having a diameter of about 50 microns or larger and has a cladding having a diameter larger than the core. In some embodiments, the first photonic-crystal device is a rod having an outer diameter of about 1,000 microns (1 mm) or larger. In some embodiments, the first optical device is a first photonic-crystal fiber and the first waveguide is a first core of the first photonic-crystal device, and the method further includes generating a narrow-linewidth seed-laser signal, optically isolating the narrow-linewidth seed-laser signal, narrow-bandwidth filtering the narrow-linewidth seed-laser signal, and amplifying the isolated filtered narrow-linewidth seed-laser signal using the first waveguide of the first photonic-crystal device. In some embodiments, the generating of the narrow-linewidth seed-laser signal further includes generating an original seed-laser signal, optically isolating the original seed-laser signal, narrow-bandwidth filtering the original seed-laser signal, providing a second photonic-crystal fiber optical amplifier having a core, and amplifying the isolated filtered original seed-laser signal using the core of the second photonic-crystal fiber, wherein the second photonic-crystal fiber outputs the narrow-linewidth seed-laser signal. In some embodiments, the first waveguide of the provided first photonic-crystal device is surrounded by a plurality of longitudinal holes that define a transverse extent of the first waveguide, and the method further includes closing the holes for a first length at a first end of the first photonic-crystal fiber to form an endcap. In some embodiments, the closing of the holes of the first waveguide of the first photonic-crystal fiber includes melting the holes shut for the first length. In some embodiments, the closing of the holes of the first waveguide of the first photonic-crystal fiber includes filling the holes with an index-matching material for the first length. In some embodiments, the first optical device is a first photonic-crystal fiber and the first waveguide is a first core of the first photonic-crystal device, and the method further includes forming the endcap of the first photonic-crystal fiber to a diameter smaller than a diameter of the first fiber away from the endcap, and forming a facet at an end of the endcap of the first fiber. Some embodiments further include providing a third photonic-crystal fiber, forming an endcap on an end of the third fiber to a diameter smaller than a diameter of the third fiber away from the endcap, forming a facet at an end of the endcap of the third fiber, and placing the endcap of the first fiber side-by-side to the endcap of the third fiber such that the end facet of the first fiber and the end facet of the second fiber are placed at a center-to-center distance smaller than the diameter of the first fiber away from the endcap of the first fiber.

In some embodiments, the first photonic-crystal device further includes a second waveguide that has a diameter of about 40 microns or more, and the method further includes optically amplifying light in the second waveguide with a single transverse mode. In some embodiments, the first photonic-crystal fiber further includes a plurality of other waveguides that each have a diameter of about 40 microns or more, and the method further includes maintaining a single transverse mode in each of the plurality of waveguides. In some embodiments, the first optical device is a first photonic-crystal fiber and the first waveguide is a first core of the first photonic-crystal fiber, wherein the first photonic-crystal fiber further includes a plurality of other cores arranged side-by-side generally along a straight line transverse to a length of the first fiber, wherein the fiber includes an inner pump cladding surrounding the plurality of cores and an outer cladding surrounding the inner cladding, and wherein the cores each have a diameter of about 40 microns or more, and the method further includes maintaining a single transverse mode in each of the plurality of cores, and providing pump light into the inner pump cladding surrounding the cores in order to provide pump light into the cores over a length of the fiber, and containing the pump light inside an outer-extent radius of the inner cladding.

In some embodiments, the present invention provides an apparatus that includes a photonic-crystal optical device having a waveguide that has a diameter of about 40 microns or more and is doped with rare-earth ions (or other rare-earth species) capable of optical amplification and maintains a single transverse mode and is capable of operation with a peak power of about 1 MW or more when used as a pulsed optical amplifier or laser. In some embodiments, the waveguide has a diameter of at least 40 microns. In some embodiments, the waveguide has a diameter of more than 40 microns. In some embodiments, the waveguide has a diameter of at least 45 microns. In some embodiments, the waveguide has a diameter of at least 50 microns. In some embodiments, the waveguide has a diameter of more than 50 microns. In some embodiments, the waveguide has a diameter of at least 55 microns. In some embodiments, the waveguide has a diameter of at least 60 microns. In some embodiments, the waveguide has a diameter of at least 65 microns. In some embodiments, the waveguide has a diameter of at least 70 microns. In some embodiments, the waveguide has a diameter of at least 85 microns. In some embodiments, the waveguide has a diameter of at least 80 microns. In some embodiments, the waveguide has a diameter of at least 85 microns. In some embodiments, the waveguide has a diameter of at least 90 microns. In some embodiments, the waveguide has a diameter of at least 95 microns. In some embodiments, the waveguide has a diameter of at least 100 microns. In some embodiments, the waveguide has a diameter of more than 100 microns. In some embodiments, the waveguide has a diameter of at least 105 microns. In some embodiments, the waveguide has a diameter of at least 110 microns. In some embodiments, the waveguide has a diameter of at least 120 microns. In some embodiments, the waveguide has a diameter of at least 130 microns. In some embodiments, the waveguide has a diameter of at least 140 microns. In some embodiments, the waveguide has a diameter of at least 150 microns. In some embodiments, the waveguide has a diameter of at least 200 microns.

In some embodiments, the optical device includes a photonic-crystal fiber and the waveguide is a core of the photonic-crystal fiber. In some embodiments, the fiber also includes an inner cladding surrounding the core in order to provide pump light into the cores over a length of the fiber.

In some such embodiments, the core of the photonic-crystal fiber is capable of operation with a peak power of at least 200 kW. In some such embodiments, the core of the photonic-crystal fiber is capable of operation with a peak power of at least 300 kW. In some such embodiments, the core of the photonic-crystal fiber is capable of operation with a peak power of at least 400 kW. In some such embodiments, the core of the photonic-crystal fiber is capable of operation with a peak power of at least 500 kW. In some such embodiments, the core of the photonic-crystal fiber is capable of operation with a peak power of at least 600 kW. In some such embodiments, the core of the photonic-crystal fiber is capable of operation with a peak power of at least 700 kW. In some such embodiments, the core of the photonic-crystal fiber is capable of operation with a peak power of at least 800 kW. In some such embodiments, the core of the photonic-crystal fiber is capable of operation with a peak power of at least 900 kW. In some such embodiments, the core of the photonic-crystal fiber is capable of operation with a peak power of at least 1000 kW.

In some such embodiments, the core of the photonic-crystal fiber is capable of operation with a peak power of at least 1100 kW. In some such embodiments, the core of the photonic-crystal fiber is capable of operation with a peak power of at least 1200 kW. In some such embodiments, the core of the photonic-crystal fiber is capable of operation with a peak power of at least 1300 kW. In some such embodiments, the core of the photonic-crystal fiber is capable of operation with a peak power of at least 1400 kW. In some such embodiments, the core of the photonic-crystal fiber is capable of operation with a peak power of at least 1500 kW. In some such embodiments, the core of the photonic-crystal fiber is capable of operation with a peak power of at least 1600 kW. In some such embodiments, the core of the photonic-crystal fiber is capable of operation with a peak power of at least 1700 kW. In some such embodiments, the core of the photonic-crystal fiber is capable of operation with a peak power of at least 1800 kW. In some such embodiments, the core of the photonic-crystal fiber is capable of operation with a peak power of at least 1900 kW. In some such embodiments, the core of the photonic-crystal fiber is capable of operation with a peak power of at least 2000 kW.

In some such embodiments, the core of the photonic-crystal fiber is capable of operation with a peak power of at least 2100 kW. In some such embodiments, the core of the photonic-crystal fiber is capable of operation with a peak power of at least 2200 kW. In some such embodiments, the core of the photonic-crystal fiber is capable of operation with a peak power of at least 2300 kW. In some such embodiments, the core of the photonic-crystal fiber is capable of operation with a peak power of at least 2400 kW. In some such embodiments, the core of the photonic-crystal fiber is capable of operation with a peak power of at least 2500 kW. In some such embodiments, the core of the photonic-crystal fiber is capable of operation with a peak power of at least 2600 kW. In some such embodiments, the core of the photonic-crystal fiber is capable of operation with a peak power of at least 2700 kW. In some such embodiments, the core of the photonic-crystal fiber is capable of operation with a peak power of at least 2800 kW. In some such embodiments, the core of the photonic-crystal fiber is capable of operation with a peak power of at least 2900 kW. In some such embodiments, the core of the photonic-crystal fiber is capable of operation with a peak power of at least 3000 kW.

In some such embodiments, the core of the photonic-crystal fiber is capable of operation with a peak power of at least 3100 kW. In some such embodiments, the core of the photonic-crystal fiber is capable of operation with a peak power of at least 3200 kW. In some such embodiments, the core of the photonic-crystal fiber is capable of operation with a peak power of at least 3300 kW. In some such embodiments, the core of the photonic-crystal fiber is capable of operation with a peak power of at least 3400 kW. In some such embodiments, the core of the photonic-crystal fiber is capable of operation with a peak power of at least 3500 kW. In some such embodiments, the core of the photonic-crystal fiber is capable of operation with a peak power of at least 3600 kW. In some such embodiments, the core of the photonic-crystal fiber is capable of operation with a peak power of at least 3700 kW. In some such embodiments, the core of the photonic-crystal fiber is capable of operation with a peak power of at least 3800 kW. In some such embodiments, the core of the photonic-crystal fiber is capable of operation with a peak power of at least 3900 kW. In some such embodiments, the core of the photonic-crystal fiber is capable of operation with a peak power of at least 4000 kW.

In some such embodiments, the core of the photonic-crystal fiber is capable of operation with a peak power of more than 0.5 MW. In some such embodiments, the core of the photonic-crystal fiber is capable of operation with a peak power of more than 1 MW. In some such embodiments, the core of the photonic-crystal fiber is capable of operation with a peak power of more than 2 MW. In some such embodiments, the core of the photonic-crystal fiber is capable of operation with a peak power of more than 3 MW. In some such embodiments, the core of the photonic-crystal fiber is capable of operation with a peak power of more than 4 MW. In some of these embodiments, the core of the photonic-crystal device is capable of operation at these powers with a near-diffraction-limited output beam having $M^2<1.5$. In some embodiments, the output beam includes linearly polarized pulses having a degree of polarization of at least 15 dB (wherein the degree of polarization is defined as ten times the log (base 10) of the ratio of optical power along the polarization axis to the optical power along the orthogonal axis). In some such embodiments, the degree of polarization is at least 16 dB. In some embodiments, the output beam includes linearly polarized pulses having a degree of polarization of at least 17 dB. In some such embodiments, the degree of polarization is at least 18 dB. In some such embodiments, the degree of polarization is at least 19 dB. In some embodiments, the output beam includes linearly polarized pulses having a degree of polarization of at least 20 dB.

In some embodiments, the core of the photonic-crystal device is capable of operation with a near-diffraction-limited output beam having $M^2<1.5$.

In some embodiments, the core of the photonic-crystal device is capable of operation with a near-diffraction-limited output beam having $M^2<1.5$ to generate linearly polarized pulses and a peak power of about 100 kW or more. In some such embodiments, the core of the photonic-crystal device is capable of peak power of about 200 kW or more. In some such embodiments, the core of the photonic-crystal device is capable of peak power of about 300 kW or more. In some such embodiments, the core of the photonic-crystal device is capable of peak power of about 500 kW or more.

Some embodiments further include one or more wavelength-conversion optical media operable to receive high-peak-power input radiation having a first wavelength from the first waveguide of the first photonic-crystal device and to generate an output beam radiation having a peak power of at least about 100 kW and of a shorter second wavelength through wavelength conversion.

Some embodiments further include one or more wavelength-conversion optical media operable to receive high-peak-power input radiation having a first wavelength from the first waveguide of the first photonic-crystal device and to generate radiation having a peak power of about 100 kW or more and of a second wavelength (different than the first wavelength) through wavelength conversion. In some embodiments, the output beam radiation of the second wavelength obtained through wavelength conversion exhibits peak power of 300 kW or more. In some embodiments, the output beam radiation of the second wavelength obtained through wavelength conversion exhibits peak power of 400 kW or more. In some embodiments, the output beam radiation of the second wavelength obtained through wavelength conversion exhibits peak power of 500 kW or more. In some embodiments, the output beam radiation of the second wavelength obtained through wavelength conversion includes visible light having a wavelength between about 400 nm and about 700 nm. In some embodiments, the output beam radiation of the second wavelength obtained through wavelength conversion includes ultraviolet light having a wavelength of about 400 nm or shorter. In some embodiments, the output beam radiation of the second wavelength includes a wavelength longer than the first wavelength.

In some embodiments, the optical device includes a photonic-crystal fiber and the waveguide is the core of the photonic-crystal fiber that supports a fundamental mode field having a diameter of at least about 50 microns and has a pump cladding having a diameter larger than that of the core. In some such embodiments, the fundamental mode field has a diameter of at least 60 microns. In some such embodiments, the fundamental mode field as a diameter of at least 70 microns. In some such embodiments, the fundamental mode field as a diameter of at least 80 microns. In some such embodiments, the fundamental mode field as a diameter of at least 90 microns. In some such embodiments, the fundamental mode field as a diameter of at least 100 microns.

Another aspect of the present invention provides an apparatus that includes a photonic-crystal optical amplifier having a waveguide that has a diameter of about 40 microns or more, that is doped with at least one rare-earth species capable of optical amplification, that maintains a single transverse mode, and that is capable of operation with a peak power of at least about 1 MW when used as a pulsed optical amplifier or laser, wherein the optical device includes a photonic-crystal fiber and the waveguide is a first core of the photonic-crystal device, the apparatus further including a first optical isolator; a first wavelength-sensitive optical filter, and a master-oscillator subsystem operable to generate a narrow-linewidth, single-frequency seed-laser signal coupled to the first core of the first photonic-crystal fiber through the first optical isolator and the first wavelength-sensitive optical filter. In some such embodiments, the first wavelength-sensitive optical filter includes a narrow-bandwidth band-pass filter. In some embodiments, the first wavelength-sensitive optical filter includes a long-pass optical filter. In some embodiments, the first wavelength-sensitive optical filter includes a short-pass optical filter.

Multi-Stage Optical Amplifier Having Photonic-Crystal Waveguides for Generation of High-Power Pulsed Radiation and Associated Method In some embodiments, the present invention provides an apparatus including an optical amplifier having a segmented photonic-crystal fiber that includes a first amplifying segment having a rare-earth-doped photonic-crystal core and a second amplifying segment having a rare-earth-doped photonic-crystal core, a master oscillator operable to generate a seed-laser signal, and a first optical connector subassembly operatively coupled between the first segment and the second segment. In some embodiments, the master-oscillator subsystem includes a first optical isolator and a first narrow-bandwidth band-pass optical filter, and is operable to generate a narrow-linewidth, single-frequency seed-laser signal coupled to the core of the first segment through the first optical isolator and the first narrow-bandwidth band-pass optical filter. In some embodiments, the master-oscillator subsystem includes a first optical isolator and a first long-pass optical filter, and is operable to generate a narrow-linewidth, single-frequency seed-laser signal coupled to the core of the first segment through the first optical isolator and the first long-pass optical filter.

In some embodiments, the first optical connector subassembly includes a pump block, wherein the pump block includes a pump-light injection port, a dichroic device that operates to convey signal wavelengths from the first segment towards the second segment and to convey pump wavelengths from the pump-light injection port towards the first segment, and an optical filter through which the signal passes and that blocks at least some wavelengths other than the signal's primary wavelength.

In some embodiments, a peak power of the signal's optical pulses emitted by the second segment is at least 1 MW and a ratio between optical power in the signal's optical pulses and optical power in a continuous-wave background emitted by the second segment is at least 15 dB. In some embodiments, a ratio between optical power in the signal's optical pulses and optical power in a continuous-wave background emitted by the second segment is at least 16 dB. In some embodiments, a ratio between optical power in the signal's optical pulses and optical power in a continuous-wave background emitted by the second segment is at least 17 dB. In some embodiments, a ratio between optical power in the signal's optical pulses and optical power in a continuous-wave background emitted by the second segment is at least 18 dB. In some embodiments, a ratio between optical power in the signal's optical pulses and optical power in a continuous-wave background emitted by the second segment is at least 19 dB. In some embodiments, a ratio between optical power in the signal's optical pulses and optical power in a continuous-wave background emitted by the second segment is at least 20 dB.

In some embodiments, a pulse energy of the optical pulses emitted by the second segment of photonic-crystal fiber is at least 1 mJ and the pulse has a duration of no more than 5 ns. In some embodiments, a pulse energy of the optical pulses emitted by the second segment of photonic-crystal fiber is at least 1 mJ and the pulse has a duration of no more than 4 ns. In some embodiments, a pulse energy of the optical pulses emitted by the second segment of photonic-crystal fiber is at least 1 mJ and the pulse has a duration of no more than 3 ns. In some embodiments, a pulse energy of the optical pulses emitted by the second segment of photonic-crystal fiber is at least 2 mJ and the pulse has a duration of no more than 5 ns. In some embodiments, a pulse energy of the optical pulses emitted by the second segment of photonic-crystal fiber is at least 2 mJ and the pulse has a duration of no more than 4 ns. In some embodiments, a pulse energy of the optical pulses emitted by the second segment of photonic-crystal fiber is at least 2 mJ and the pulse has a duration of no more than 3 ns. In some embodiments, a pulse energy of the optical pulses emitted by the second segment of photonic-crystal fiber is at least 3 mJ and the pulse has a duration of no more than 3 ns. In some embodiments, a pulse energy of the optical pulses emitted by the second segment of photonic-crystal fiber is at least 4 mJ and the pulse has a duration of no more than 5 ns. In some embodiments, a pulse energy of the optical pulses emitted by the second segment of photonic-crystal fiber is at least 4 mJ and the pulse has a duration of no more than 4 ns. In some embodiments, a pulse energy of the optical pulses emitted by the second segment of photonic-crystal fiber is at least 4 mJ and the pulse has a duration of no more than 3 ns.

In some embodiments, the seed-laser signal from the master oscillator is coupled into the photonic-crystal core of the first segment and amplified therein and an output of the first segment is transmitted through the first optical connector subassembly and then coupled into the photonic-crystal core of the second segment and further amplified therein and the amplified signal is emitted through an output end of the second segment.

In some embodiments, the plurality of segments arranged in series is operated as a composite, single optical amplifier for the seed-laser signal emitted from the master oscillator. In some such embodiments, the first optical connector subassembly includes a short multimode piece of fiber that is fused to an output end of the first segment and to an input end of the second segment. Some embodiments further include a third segment having a photonic-crystal core and a second optical connector subassembly operable connected between the master oscillator and the first segment.

In some embodiments, the seed-laser signal emitted by the master oscillator is optically amplified in a plurality of rare-earth-doped photonic crystal fiber segments arranged in series and each rare-earth-doped photonic-crystal fiber segment provides a fraction of the overall optical gain experienced by the seed-laser signal.

In some embodiments, each optical subassembly positioned between successive segments of rare-earth-doped photonic-crystal fiber includes at least one collimating lens, at least one optical filter that separates light of the wavelength of the signal pulses from light of the wavelength of the pump laser, at least one narrow-band optical band-pass filter and at least one focusing lens. In some such embodiments, at least one optical subassembly further includes at least one optical isolator.

In some embodiments, at least one optical component included in at least one optical subassembly positioned between successive segments of rare-earth-doped photonic-crystal fiber is laser-welded to an enclosure.

In some embodiments, the narrow-band optical band-pass filter included in at least one optical subassembly is operated also as an optical isolator that blocks light at wavelengths other than the signal pulses that counter-propagate with respect to the signal pulses.

In some embodiments, at least one optical component included in at least one optical subassembly positioned between successive pieces of rare-earth-doped photonic-crystal fiber is soldered to an enclosure.

In some embodiments, an end of at least one segment of photonic-crystal fiber is attached to the first optical subassembly using connectors that do not contain any epoxy or other organic material. In some such embodiments, at least one connector includes a hollow ferrule made of an optically clear material, laser-welded to an outer surface of an end of a segment of photonic-crystal fiber. In some such embodiments, the hollow ferrule is attached to the photonic-crystal fiber end by thermally induced shrinkage.

In some embodiments, the ends of at least one segment of photonic-crystal fiber are laser-welded to an enclosure.

In some embodiments, the ends of at least one segment of photonic-crystal fiber are soldered to an enclosure.

In some embodiments, the optical beam emitted by at least one segment is linearly polarized with a degree of polarization being at least 15 dB. In some embodiments, the optical beam emitted by at least one segment is linearly polarized with a degree of polarization being at least 16 dB. In some embodiments, the optical beam emitted by at least one segment is linearly polarized with a degree of polarization being at least 17 dB. In some embodiments, the optical beam emitted by at least one segment is linearly polarized with a degree of polarization being at least 18 dB. In some embodiments, the optical beam emitted by at least one segment is linearly polarized with a degree of polarization being at least 19 dB. In some embodiments, the optical beam emitted by at least one segment is linearly polarized with a degree of polarization being at least 20 dB.

Some embodiments further include at least one wavelength-conversion optical medium, operable to receive as input a high-peak-power optical-signal beam from the second amplifying segment having a first wavelength, and to generate through wavelength conversion an output optical beam having a second wavelength and a peak power of at least about 100 kW.

In some embodiments, the second-wavelength optical beam has a wavelength shorter than that of the first-wavelength beam. In some such embodiments, the peak power of the second-wavelength optical beam is 200 kW or more. In some such embodiments, the peak power of the second-wavelength optical beam is 300 kW or more. In some such embodiments, the peak power of the second-wavelength optical beam is 400 kW or more. In some such embodiments, the peak power of the second-wavelength optical beam is 500 kW or more. In some such embodiments, the peak power of the second-wavelength optical beam is 600 kW or more. In some such embodiments, the peak power of the second-wavelength optical beam is 700 kW or more. In some such embodiments, the peak power of the second-wavelength optical beam is 800 kW or more. In some such embodiments, the peak power of the second-wavelength optical beam is 900 kW or more. In some such embodiments, the peak power of the second-wavelength optical beam is 1000 kW or more.

In some embodiments, the second-wavelength optical beam has a wavelength longer than the first-wavelength beam. In some such embodiments, the peak power of the longer-wavelength optical beam is 200 kW or more. In some such embodiments, the peak power of the longer-wavelength optical beam is 300 kW or more. In some such embodiments, the peak power of the longer-wavelength optical beam is 400 kW or more. In some such embodiments, the peak power of the longer-wavelength optical beam is 500 kW or more.

Photonic-Crystal Rod Amplifiers for High-Power Pulsed Optical Radiation and Associated Method In some embodiments, the present invention provides an apparatus that includes a first photonic-crystal rod (PCR), having rare-earth-doped core with a diameter of at least 40 microns and an external diameter of at least 1 mm such that the rod is therefore thick enough to substantially and readily hold its shape when released. In some such embodiments, the core of the PCR has a diameter of at least 50 microns. In some such embodiments, the core of the PCR has a diameter of at least 60 microns. In some such embodiments, the core of the PCR has a diameter of at least 70 microns. In some such embodiments, the core of the PCR has a diameter of at least 80 microns. In some such embodiments, the core of the PCR has a diameter of at least 90 microns. In some such embodiments, the core of the PCR has a diameter of at least 100 microns. In some such embodiments, the core of the PCR has a diameter of at least 110 microns. In some such embodiments, the core of the PCR has a diameter of at least 120 microns. In some such embodiments, the core of the PCR has a diameter of at least 130 microns. In some such embodiments, the core of the PCR has a diameter of at least 140 microns. In some such embodiments, the core of the PCR has a diameter of at least 150 microns. In some embodiments, the apparatus is operable to generate a peak signal power of at least 500 kW.

In some embodiments, the optical beam emitted by the PCR is linearly polarized with a degree of polarization being at least 15 dB. In some embodiments, the optical beam emitted by at least one segment is linearly polarized with a degree of polarization being at least 16 dB. In some embodiments, the optical beam emitted by the PCR is linearly polarized with a degree of polarization being at least 17 dB. In some embodiments, the optical beam emitted by at least one segment is linearly polarized with a degree of polarization being at least 18 dB. In some embodiments, the optical beam emitted by at least one segment is linearly polarized with a degree of polarization being at least 19 dB. In some embodiments, the optical beam emitted by the PCR is linearly polarized with a degree of polarization being at least 20 dB.

Some embodiments further include at least one wavelength-conversion optical medium, operable to receive as input a high-peak-power optical-signal beam from the PCR having a first wavelength, and to generate through wavelength conversion an output optical beam having a second wavelength and a peak power of at least about 100 kW.

In some embodiments, the second-wavelength optical beam has a wavelength shorter than that of the first-wavelength beam. In some such embodiments, the peak power of the shorter second-wavelength optical beam is 200 kW or more. In some such embodiments, the peak power of the shorter second-wavelength optical beam is 300 kW or more. In some such embodiments, the peak power of the shorter second-wavelength optical beam is 400 kW or more. In some such embodiments, the peak power of the shorter second-wavelength optical beam is 500 kW or more. In some such embodiments, the peak power of the shorter second-wavelength optical beam is 600 kW or more. In some such embodiments, the peak power of the shorter second-wavelength optical beam is 700 kW or more. In some such embodiments, the peak power of the shorter second-wavelength optical beam is 800 kW or more. In some such embodiments, the peak power of the shorter second-wavelength optical beam is 900 kW or more. In some such embodiments, the peak power of the shorter second-wavelength optical beam is 1000 kW or more.

In some embodiments, the second-wavelength optical beam has a wavelength longer than the first-wavelength beam. In some such embodiments, the peak power of the longer second-wavelength optical beam is 200 kW or more. In some such embodiments, the peak power of the longer second-wavelength optical beam is 300 kW or more. In some such embodiments, the peak power of the longer second-wavelength optical beam is 400 kW or more. In some such embodiments, the peak power of the longer second-wavelength optical beam is 500 kW or more.

Multi-Segment Photonic-Crystal-Rod Waveguides for Amplification of High-Power Pulsed Optical Radiation and Associated Method In some embodiments, the present invention provides an apparatus that includes a first segmented photonic-crystal rod (PCR), having rare-earth-doped core with a diameter of at least 40 microns and an external diameter of at least 1 mm such that the rod is therefore thick enough to substantially and readily hold its shape when released, and wherein the photonic-crystal rod is configured as at least two segments that are serially encountered along a signal's optical path. In some embodiments, each two consecutive PCR segments in the series are joined using a piece of bridge optical fiber having an outer diameter different from that of the PCR segments and its ends spliced to the ends of the PCR segments so as to form a chain of alternating PCR segments and bridge-fiber segments, wherein the chain is operable as a continuous optical waveguide. In some such embodiments, each bridge fiber is fused at its ends to its two PCR segments. In some such embodiments, each bridge fiber is laser welded to its two PCR segments. In some such embodiments, the laser welding acts to seal ends of the PCR's core's holes.

In some embodiments, at least one of the PCR segments is arranged at a non-zero angle to (and non-parallel with respect to) a preceding PCR segment in the chain. In some embodiments, at least one of the PCR segments is arranged in parallel with, but non-co-linear with, a preceding PCR segment in the chain.

In some embodiments, at least one piece of bridge fiber in the chain has an un-doped core having a diameter of at least 50 microns and a core numerical aperture sufficiently high to withstand bending with low optical loss for the fundamental transverse mode of the core.

In some embodiments, at least one piece of bridge fiber in the chain features a core surrounded by a concentric cladding that transports pump light from one PCR segment to the next. In some embodiments, the bridge fiber is a double-clad fiber.

In some embodiments, at least one piece of bridge fiber in the chain has a rare-earth-doped core. In some embodiments, the doped core of the bridge fiber provides additional amplification to the signal.

In some embodiments, at least one piece of bridge fiber in the chain has a hollow core.

In some embodiments, at least one pair of the photonic-crystal-rod segments in the series is interspaced by a free-space gap and is operated such that the optical beam exiting one segment is coupled into the successive segment using a plurality of optical components. In some such embodiments, the plurality of optical components used to couple the optical beam from a PCR segment into the successive PCR segment include at least one lens and at least one optical prism. In some embodiments, the PCR segments are arranged so that at least one PCR segment forms a non-zero angle with respect to a preceding one.

In some embodiments, at least one of the PCR segments has one of its end facets shaped to form a lens that collimates the optical beam propagating outward from the core of the segment. In some embodiments, at least one of the PCR segments has one of its end facets shaped to form a lens that focuses into the PCR segment's core an optical beam that is coupled into the segment from outside the segment.

In some embodiments, the apparatus includes at least two photonic-crystal-rod (PCR) segments arranged side by side such that their cores run parallel to one another and the optical beam exiting a first segment is coupled into a second segment without the aid of external optical components (for example, as shown in FIG. 11G, where the sides of the segments are laser-welded to one another to prevent air gaps, at least in the optical path), such that the optical beam traverses the first segment from left to right, the second segment from right to left. In some embodiments, the apparatus includes at least three photonic-crystal-rod (PCR) segments arranged side by side such that their cores run parallel to one another and the optical beam exiting one or more segments is coupled into the successive segment without the aid of external optical components, but rather by reflective output facets and input facets that are shaped to direct an optical beam exiting one segment into the core of an adjacent segment, such that the optical beam traverses one segment from left to right, the successive segment from right to left, and the successive segment from right to left, in a zigzag fashion. In some such embodiments, at least one of the PCR segments has its input-end facet and output-end facet formed into curved reflective surfaces such that the input facet reflects an input optical beam at an angle and focuses it into the core of the PCR segment and the output facet reflects at an angle the optical beam exiting the core of the PCR segment and collimates this beam. In some such embodiments, the facets of the at least one PCR segment are coated for high reflectivity at the wavelengths of the optical beam propagating in the segment. In some embodiments, the reflective coating is a multi-layered dielectric coating.

In some embodiments, at least two of the PCR segments have an external surface laser-welded to that of a neighboring PCR segment such that the laser-welded seam runs parallel to their cores and no free-space gap is encountered by the optical signal beam between exiting one segment and entering the successive segment that is laser-welded to it, the path of the optical beam being entirely confined within the bodies of the adjacent segments so as to avoid interfacial optical loss.

In some embodiments, at least one of the PCR segments outputs a linearly polarized optical beam having degree of polarization of at least 15 dB. In some such embodiments, the degree of polarization is at least 16 dB. In some such embodiments, the degree of polarization is at least 17 dB. In some such embodiments, the degree of polarization is at least 18 dB. In some such embodiments, the degree of polarization is at least 19 dB. In some such embodiments, the degree of polarization is at least 20 dB.

Some embodiments further include at least one wavelength-conversion optical medium, operable to receive as input a high-peak-power optical-signal beam from the segmented PCR having a first wavelength, and to generate through wavelength conversion an output optical beam having a second wavelength and a peak power of at least about 100 kW.

In some embodiments, the second-wavelength optical beam has a wavelength shorter than that of the first-wavelength beam. In some such embodiments, the peak power of the second-wavelength optical beam is 200 kW or more. In some such embodiments, the peak power of the second-wavelength optical beam is 300 kW or more. In some such embodiments, the peak power of the second-wavelength optical beam is 400 kW or more. In some such embodiments, the peak power of the second-wavelength optical beam is 500 kW or more. In some such embodiments, the peak power of the second-wavelength optical beam is 600 kW or more. In some such embodiments, the peak power of the second-wavelength optical beam is 700 kW or more. In some such embodiments, the peak power of the second-wavelength optical beam is 800 kW or more. In some such embodiments, the peak power of the second-wavelength optical beam is 900 kW or more. In some such embodiments, the peak power of the second-wavelength optical beam is 1000 kW or more.

In some embodiments, the second-wavelength optical beam has a wavelength longer than the first-wavelength beam. In some such embodiments, the peak power of the longer-wavelength optical beam is 200 kW or more. In some such embodiments, the peak power of the longer-wavelength optical beam is 300 kW or more. In some such embodiments, the peak power of the longer-wavelength optical beam is 400 kW or more. In some such embodiments, the peak power of the longer-wavelength optical beam is 500 kW or more.

Multi-Stage Optical Amplifier Having Photonic-Crystal-Rod Waveguides and Normal Optical Fiber and Associated Method In some embodiments, the present invention provides an apparatus including an optical amplifier having a photonic-crystal rod having a rare-earth-doped photonic-crystal core having a diameter of at least 40 microns and a cladding having an outer diameter of at least 1 mm, a master oscillator operable to generate a seed-laser signal, and a first optical component having a solid-body fiber optically coupled to the photonic-crystal rod, wherein the solid-body fiber does not have a photonic-crystal structure in the optical signal path.

In some embodiments, the master-oscillator subsystem includes a first optical isolator and a first narrow-bandwidth band-pass optical filter, and is operable to generate a narrow-linewidth, single-frequency seed-laser signal coupled to the core of the first segment through the first optical isolator and the first narrow-bandwidth band-pass optical filter. In some embodiments, the master-oscillator subsystem includes a first optical isolator and a first long-pass optical filter, and is operable to generate a narrow-linewidth, single-frequency seed-laser signal coupled to the core of the first segment through the first optical isolator and the first long-pass optical filter.

In some embodiments of the apparatus, the core of the photonic-crystal rod (PCR) has a diameter of at least 50 microns. In some such embodiments, the core of the PCR has a diameter of at least 60 microns. In some such embodiments, the core of the PCR has a diameter of at least 70 microns. In some such embodiments, the core of the PCR has a diameter of at least 80 microns. In some such embodiments, the core of the PCR has a diameter of at least 90 microns. In some such embodiments, the core of the PCR has a diameter of at least 100 microns. In some such embodiments, the core of the PCR has a diameter of at least 110 microns. In some such embodiments, the core of the PCR has a diameter of at least 120 microns. In some such embodiments, the core of the PCR has a diameter of at least 130 microns. In some such embodiments, the core of the PCR has a diameter of at least 140 microns. In some such embodiments, the core of the PCR has a diameter of at least 150 microns. In some embodiments, the apparatus is operable to generate a peak signal power of at least 500 kW.

In some embodiments, the photonic-crystal rod (PCR) is separated into a plurality of PCR segments. In some such embodiments, the solid-body fiber is fused to respective ends of two of the PCR segments to form an optical path between their respective cores.

In some embodiments, the apparatus has an output beam that includes linearly polarized pulses having a degree of polarization of at least 15 dB (wherein the degree of polarization is defined as ten times the log (base 10) of the ratio of optical power along the polarization axis to the optical power along the orthogonal axis). In some such embodiments, the degree of polarization is at least 16 dB. In some embodiments, the output beam includes linearly polarized pulses having a degree of polarization of at least 17 dB. In some such embodiments, the degree of polarization is at least 18 dB. In some such embodiments, the degree of polarization is at least 19 dB. In some embodiments, the output beam includes linearly polarized pulses having a degree of polarization of at least 20 dB.

Some embodiments further include at least one wavelength-conversion optical medium (e.g., non-linear frequency doublers, optical parametric oscillators and the like) operable to receive high-peak-power input radiation having a first wavelength from the first waveguide of the first photonic-crystal device and to generate radiation having a peak power of at least about 100 kW and of a different second wavelength through wavelength conversion. In some embodiments, the second-wavelength radiation is of a shorter wavelength than the first wavelength. In some such embodiments, the radiation of the shorter second wavelength is at least 200 kW. In some such embodiments, the radiation of the shorter second wavelength is at least 300 kW. In some such embodiments, the radiation of the shorter second wavelength is at least 400 kW. In some such embodiments, the radiation of the shorter second wavelength is at least 500 kW. In some such embodiments, the radiation of the shorter second wavelength is at least 600 kW. In some such embodiments, the radiation of the shorter second wavelength is at least 700 kW. In some such embodiments, the radiation of the shorter second wavelength is at least 800 kW. In some such embodiments, the radiation of the shorter second wavelength is at least 900 kW. In some such embodiments, the radiation of the shorter second wavelength is at least 1000 kW. In some embodiments, the radiation of the shorter second wavelength includes visible light having a wavelength between about 400 nm and about 700 nm. In some embodiments, the second-wavelength radiation includes ultraviolet light having a wavelength of about 400 nm or shorter. In other embodiments, the second-wavelength radiation is of a longer wavelength than the first wavelength. In some such embodiments, the radiation of the longer second wavelength is at least 200 kW. In some such embodiments, the radiation of the longer second wavelength is at least 300 kW. In some such embodiments, the radiation of the longer second wavelength is at least 400 kW. In some such embodiments, the radiation of the longer second wavelength is at least 500 kW.

In some embodiments, the optical device includes a photonic-crystal fiber and the waveguide is the core of the photonic-crystal fiber that supports a fundamental mode field having a diameter of at least about 50 microns and has a pump cladding having a diameter larger than that of the core. In some such embodiments, the fundamental mode field has a diameter of at least 60 microns. In some such embodiments, the fundamental mode field as a diameter of at least 70 microns. In some such embodiments, the fundamental mode field as a diameter of at least 80 microns. In some such embodiments, the fundamental mode field as a diameter of at least 90 microns. In some such embodiments, the fundamental mode field as a diameter of at least 100 microns.

In some embodiments, the present invention provides an apparatus that includes an optical amplifier having a segmented fiber that includes a first amplifying segment having a rare-earth-doped photonic-crystal core and a second amplifying segment having a rare-earth-doped photonic-crystal core, wherein the first segment amplifies to a higher power than the second segment and is non-contiguous with the second segment, a master-oscillator subsystem operable to obtain a seed laser signal light and to optically couple the seed laser signal light into the second segment, and a first optical-connector subassembly operatively coupled between the second segment and the first segment.

In some embodiments, the master-oscillator subsystem includes a first optical isolator and a first narrow-bandwidth band-pass optical filter, and is operable to obtain a narrow-linewidth, single-frequency seed laser signal having a spectrally narrow signal bandwidth of less than 20 GHz, optically coupled to the core of the second segment through the first optical isolator and the first narrow-bandwidth band-pass optical filter.

In some embodiments, the master-oscillator subsystem includes a first optical isolator and a first long-pass optical filter, and is operable to obtain a narrow-linewidth, single-frequency seed laser signal having a spectrally narrow signal bandwidth of less than 20 GHz, optically coupled to the core of the second segment through the first optical isolator and the first long-pass optical filter.

In some embodiments, the first optical-connector subassembly includes a second narrow-bandwidth band-pass optical filter that is operable to pass wavelengths of the narrow-linewidth, single-frequency seed laser signal having a spectrally narrow signal bandwidth of less than 20 GHz, and to at least partially block wavelengths of amplified spontaneous emission (ASE) propagating back from the first segment.

In some embodiments, the first optical-connector subassembly includes a substrate, an optical band-pass filter, and a dichroic mirror/beamsplitter that directs pump light into the second segment in a counter-propagating direction relative to signal light, and directs signal light from the second segment to the first segment through the optical band-pass filter, wherein the filter and the mirror/beamsplitter are affixed to the substrate to form a unitized assembly.

In some embodiments, the first optical-connector subassembly includes a substrate, an optical band-pass filter attached to the substrate, a dichroic mirror/beamsplitter, attached to the substrate, that directs pump light into the second segment in a counter-propagating direction relative to signal light, and directs signal light from the second segment to the first segment through the optical band-pass filter, and at least one lens attached to the substrate, wherein at least one of the filter, the mirror/beamsplitter and the lens is laser welded to the substrate to form a unitized assembly.

In some embodiments, the first optical-connector subassembly includes an enclosure having a substrate, an optical band-pass filter attached to the substrate, a dichroic mirror/beamsplitter, attached to the substrate, that directs pump light into the second segment in a counter-propagating direction relative to signal light, and directs signal light from the second segment to the first segment through the optical band-pass filter, and at least one lens attached to the substrate, wherein at least one of the filter, the mirror/beamsplitter and the lens is soldered to the enclosure to form a unitized assembly.

In some embodiments, the first optical-connector subassembly is a non-photonic-crystal bridge fiber having a multimode core having a numerical aperture (NA) higher than either the first or second segment's photonic-crystal core NA, and wherein a fundamental mode of the photonic-crystal cores exhibits high spatial overlap with those transverse modes in the bridge fiber that exhibit a single central maximum.

In some embodiments, at least one of the first amplifying segment and the second amplifying segment is capable of operation with a signal-output peak power of at least 500 kW.

In some embodiments, at least one of the first amplifying segment and the second amplifying segment is capable of operation with a signal-output peak power of at least 2 megawatts (MW).

In some embodiments, at least one of the first amplifying segment and the second amplifying segment is capable of operation with a signal-output-beam peak power of at least 500 kW and a beam-quality $M^2$ value of less than 1.5.

In some embodiments, at least one of the first amplifying segment and the second amplifying segment is capable of generating linearly polarized pulses having degree of polarization of at least 15 dB (wherein the degree of polarization is a value of ten times the log (base 10) of the ratio of optical power along the polarization axis to the optical power along the orthogonal axis), a beam-quality $M^2$ value of less than 1.5, and a peak power of at least about 100 kW.

In some embodiments, the present invention provides an apparatus having an optical amplifier that includes first photonic-crystal means for amplifying optical signal pulses to obtain high-power optical signal pulses, second photonic-crystal means for amplifying optical signal pulses to obtain intermediate-power optical signal pulses, wherein the second means is non-contiguous with the first means, and means for optically coupling the intermediate-power optical signal pulses to the first amplifying means from the second amplifying means, and means for generating optical seed signal pulses and for coupling the optical seed signal pulses into the second amplifying means.

In some embodiments, the means for generating further includes means for optically isolating the optical seed signal pulses, and means for filtering the optical seed signal pulses before they enter the core of the second photonic-crystal means to obtain narrow-linewidth, single-frequency optical seed signal pulses having a spectrally narrow signal bandwidth of less than 20 GHz.

In some embodiments, the means for optically coupling further includes means for filtering the intermediate-power optical signal pulses and substantially passing from the second photonic-crystal means toward the first photonic-crystal means those wavelengths corresponding to the narrow-linewidth, single-frequency seed laser signal and substantially blocking other wavelengths of amplified spontaneous emission (ASE) propagating back from the first photonic-crystal means, wherein the means for filtering the intermediate-power optical signal pulses are part of a unitized assembly.

In some embodiments, the means for optically coupling further includes means for filtering the intermediate-power signal light and substantially passing from the second photonic-crystal means those wavelengths corresponding to the narrow-linewidth, single-frequency seed laser signal and substantially blocking other wavelengths of amplified spontaneous emission (ASE) propagating back from the first photonic-crystal means, means for directing pump light into the second photonic-crystal means in a counter-propagating direction relative to signal light, and means for directing the filtered intermediate-power signal light toward the first photonic-crystal means, wherein the means for filtering the intermediate-power optical signal pulses, the means for directing pump light, and the means for directing the filtered intermediate-power signal light are part of a unitized assembly.

In some embodiments, the present invention provides a method that includes providing an optical amplifier having a segmented photonic-crystal fiber that includes a higher-power first amplifying segment having a rare-earth-doped photonic-crystal core and a lower-power second amplifying segment having a rare-earth-doped photonic-crystal core, obtaining a seed laser signal, optically coupling the seed laser signal into the core of the second amplifying segment, amplifying the seed laser signal in the second amplifying segment to obtain intermediate-power signal light, operatively coupling the intermediate-power signal light to the first amplifying segment from the second amplifying segment, and amplifying the intermediate-power signal light in the first amplifying segment to obtain higher-power signal light.

Some embodiments of the method further include optically isolating the seed laser signal light, and narrow-bandwidth band-pass filtering the seed laser signal light before it enters the core of the second segment to obtain a narrow-linewidth, single-frequency seed laser signal having a spectrally narrow signal bandwidth of less than 20 GHz, and optically coupling the seed laser signal to the core of the second segment.

Some embodiments of the method further include optically isolating the seed laser signal, and long-pass optically filtering the seed laser signal to obtain a narrow-linewidth, single-frequency seed laser signal optically coupled to the core of the second segment.

Some embodiments of the method further include narrow-bandwidth band-pass filtering the intermediate-power signal light and substantially passing from the second segment toward the first segment those wavelengths corresponding to the narrow-linewidth, single-frequency seed laser signal and substantially blocking other wavelengths of amplified spontaneous emission (ASE) propagating back from the first segment.

Some embodiments of the method further include narrow-bandwidth band-pass filtering the intermediate-power signal light and substantially passing from the second segment toward the first segment those wavelengths corresponding to the narrow-linewidth, single-frequency seed laser signal and substantially blocking other wavelengths of amplified spontaneous emission (ASE) propagating back from the first segment, directing pump light into the second segment in a counter-propagating direction relative to signal light, and directing the narrow-bandwidth band-pass filtered intermediate-power signal light toward the first segment within a unitized assembly.

Some embodiments of the method further include narrow-bandwidth band-pass filtering the intermediate-power signal light and substantially passing from the second segment toward the first segment those wavelengths corresponding to the narrow-linewidth, single-frequency seed laser signal and substantially blocking other wavelengths of amplified spontaneous emission (ASE) propagating back from the first segment, focusing pump light into the second segment in a counter-propagating direction relative to the signal light, and focusing the narrow-bandwidth band-pass filtered intermediate-power signal light into the core of the first segment within a unitized assembly.

In some embodiments, the operatively coupling the intermediate-power signal light to the first amplifying segment from the second amplifying segment is performed through a non-photonic-crystal bridge fiber having a multimode core having a numerical aperture (NA) higher than either the first or second segment's photonic-crystal core NA, and wherein a fundamental mode of the photonic-crystal cores exhibits high spatial overlap with those transverse modes in the bridge fiber that exhibit a single central maximum.

In some embodiments, the amplifying of the intermediate-power signal light in the first amplifying segment generates a peak power of at least 500 kW. In some embodiments, the amplifying of the intermediate-power signal light in the first amplifying segment generates a peak power of at least 2 MW.

In some embodiments, the amplifying of the intermediate-power signal light in the first amplifying segment generates a peak power of at least 500 kW and a beam-quality $M^2$ value of less than 1.5.

In some embodiments, the amplifying of the intermediate-power signal light in the first amplifying segment generates linearly polarized pulses having degree of polarization of at least 15 dB (wherein the degree of polarization is a value of ten times the log (base 10) of the ratio of optical power along the polarization axis to the optical power along the orthogonal axis), a beam-quality $M^2$ value of less than 1.5, and a peak power of at least about 100 kW.

Optical Hollow-Core Delivery Fiber and Termination and Associated Method

Some embodiments of the invention provide an apparatus that includes a hollow-core photonic-crystal fiber (HCPCF) configured to receive an optical beam such that the optical beam is coupled into its hollow core and is guided therein with low optical loss along the whole length of this fiber and wherein a first end of the fiber is cleaved to form an end facet and is sealed to a first closed-end connector attached to the fiber without the aid of epoxy adhesives or other organic compounds.

In some embodiments, the first closed-end connector includes a slanted end window and a hollow cavity between the end facet of the HCPCF and the end window.

In some embodiments, the first closed-end connector includes an end-mounted collimating lens window and a hollow cavity between the end facet of the HCPCF and the end window.

Some embodiments further include a second closed-end connector attached to a second end of the HCPCF, wherein the second closed-end connector includes an end-mounted focusing lens window and a hollow cavity between the end facet of the HCPCF and the end window.

In some embodiments, the first closed-end connector includes a hollow cavity that is laser welded around the first end of the HCPCF.

In some embodiments, the first closed-end connector includes a hollow cavity that attached around the first end of the HCPCF by heat shrinking In some embodiments, the first closed-end connector includes a hollow cavity that soldered around the first end of the HCPCF.

In some embodiments, the first closed-end connector includes a hollow glass ferrule that is laser welded around the first end of the HCPCF, and an end window laser welded to the ferrule.

Some embodiments further include a photonic-crystal amplifier device (PCAD) having a core diameter of at least 100 microns and configured to amplify dispersively stretched pulses, wherein the PCAD is optically coupled to deliver high-power optical pulses to the HCPCF, and wherein the HCPCF has dispersive properties tailored to recompress the amplified stretched pulses.

In some embodiments, the first connector is an enclosure that has a hollow first end with an internal surface that is laser-welded along part of its length to an outer surface of the HCPCF in proximity of the first end of the fiber. In some such embodiments, the connector has a sealed second end such that the first end of the fiber is fully enclosed and sealed within an inner space of the attached connector. In some embodiments, the sealed second end of the first connector is terminated by an optical window located at a distance from the end facet of the HCPCF and oriented at a non-perpendicular angle with respect a central axis of an optical beam emitted from the end facet, such that the inner space of the connector forms a hollow, sealed region. This seal protects the exposed holes in the end facet of the HCPCF from contamination from external impurities. The non-perpendicular angle between the connector's window and the optical axis of the beam exiting the HCPCF facet reduces the optical feedback into the fiber by minimizing the fraction of light exiting the fiber that is back-reflected by the window and coupled back into the HCPCF. In some embodiments, at least one surface of the optical windows terminating the first connector is anti-reflection coated for wavelengths of the optical beam propagating within the HCPCF.

In some embodiments, the sealed second end of the first connector is terminated by a lens-shaped optical window located at a distance from the end facet of the HCPCF, such that the inner space of the connector forms a hollow, sealed region. In some embodiments, the lens-shaped optical window is shaped and located to provide collimation for the optical beam exiting the HCPCF and propagating through the lens-shaped window. In other embodiments, the lens-shaped optical window is shaped and located to provide focusing for the optical beam propagating through the window and then entering the HCPCF.

In some embodiments, the apparatus further includes at least a first and a second rare-earth-doped photonic crystal fiber (REDPCF), wherein the HCPCF is operably coupled between the first REDPCF and second REDPCF such that an optical output beam from the first rare-earth-doped photonic-crystal fiber is coupled into the hollow-core photonic-crystal fiber and propagates therein along the whole length of the hollow core and exits the hollow core and is coupled into the second rare-earth-doped fiber, and wherein each piece of hollow-core photonic-crystal fiber constitutes an optical-beam-delivery medium between pieces of rare-earth-doped fiber positioned at a distance with respect to each other and the optical beam propagating in each piece of hollow-core photonic-crystal fiber undergoes negligible optical nonlinear effect as it propagates through the whole hollow-core fiber length.

In some embodiments, the HCPCF is positioned between and optically couples a piece of rare-earth-doped solid-body fiber and a piece of rare-earth-doped photonic-crystal fiber. In some embodiments, the HCPCF is positioned between and optically couples a first piece of rare-earth-doped solid-body fiber and a second piece of rare-earth-doped solid-body fiber. In some embodiments, the HCPCF is positioned between and optically couples a rare-earth-doped photonic-crystal rod and a piece of rare-earth-doped photonic-crystal fiber. In some embodiments, the HCPCF is positioned between and optically couples a rare-earth-doped photonic-crystal rod (REDPCR) and a piece of rare-earth-doped solid-body fiber (REDPCF). In some embodiments, the HCPCF is positioned between and optically couples two rare-earth-doped photonic-crystal rods.

In some embodiments, the present invention provides an apparatus having a hollow-core photonic-crystal fiber (HCPCF) having a first end of the HCPCF cleaved to form an end facet, and a first closed-end connector having an optically-transmissive port, and means for connecting the first end into the first closed-end connector attached to the first end of the HCPCF without the aid of epoxy adhesives or other organic compounds.

In some embodiments, the first closed-end connector includes a slanted end window and a hollow cavity between the end facet of the HCPCF and the end window.

In some embodiments, the first closed-end connector includes an end-mounted collimating lens window and a hollow cavity between the end facet of the HCPCF and the end window.

Some embodiments further include a second closed-end connector, wherein the second closed-end connector includes an end-mounted focusing lens window and a hollow cavity between the end facet of the HCPCF and the end window, and means for attaching the second closed-end connector to a second end of the HCPCF.

In some embodiments, the first closed-end connector includes a hollow cavity, wherein the connecting further includes laser welded means for connecting the first closed-end connector around the first end of the HCPCF.

In some embodiments, the present invention provides method that includes providing a hollow-core photonic-crystal fiber (HCPCF) having a first end of the HCPCF cleaved to form an end facet, and a first closed-end connector having an optically-transmissive port, and connecting the first end into the first closed-end connector attached to the first end of the HCPCF without the aid of epoxy adhesives or other organic compounds.

In some embodiments, the first closed-end connector includes a slanted end window and a hollow cavity between the end facet of the HCPCF and the end window.

In some embodiments, the first closed-end connector includes an end-mounted collimating lens window and a hollow cavity between the end facet of the HCPCF and the end window.

Some embodiments further include providing a second closed-end connector, wherein the second closed-end connector includes an end-mounted focusing lens window and a hollow cavity between the end facet of the HCPCF and the end window, and attaching the second closed-end connector to a second end of the HCPCF.

In some embodiments, the first closed-end connector includes a hollow cavity, wherein the connecting further includes laser welding the first closed-end connector around the first end of the HCPCF.

In some embodiments, the first closed-end connector includes a hollow cavity, wherein the connecting further includes attaching the first closed-end connector around the first end of the HCPCF by heat shrinking In some embodiments, the first closed-end connector includes a hollow cavity, wherein the connecting further includes soldering the first closed-end connector around the first end of the HCPCF.

In some embodiments, the first closed-end connector includes a hollow glass ferrule and the method further includes laser welding the first closed-end connector around the first end of the HCPCF, and laser welding an end window to the ferrule.

Some embodiments further include providing a photonic-crystal amplifier device (PCAD) having a core diameter of at least 100 microns, configuring the PCAD to amplify dispersively stretched pulses, optically coupling the PCAD to deliver high-power optical pulses to the HCPCF, and configuring the HCPCF to have dispersive properties tailored to recompress the amplified stretched pulses.

Method and Apparatus for Long-Range Lidar and Active Imaging with Optical Output from a Photonic-Crystal Rod In some embodiments, the present invention provides an apparatus that includes a first photonic-crystal optical device that includes a first waveguide that has a diameter of at least about 40 microns, maintains a single transverse mode, and is operable to directly generate optical pulses having a peak power of at least 500 kW, a spectral linewidth of 1 nm or less, a pulse-to-CW-background ratio of at least 20 dB, and a beam quality $M^2<2$ at a wavelength of 1.5 microns or longer (thereby meeting the requirement for "eye safe" operation), and is operated as a component of an optical transmitter within a device that performs long-range active optical imaging, the list of applicable devices including Light Detector and Ranging (LIDAR) devices that include at least one laser.

In some embodiments, the photonic crystal device is a photonic-crystal fiber having a core doped with Erbium and having a core diameter larger than 40 microns. In some embodiments, the photonic-crystal device is a photonic-crystal fiber having a core codoped with Erbium and Ytterbium and having a core diameter larger than 40 microns. In some embodiments, the photonic crystal device is a photonic crystal fiber having a core doped with Thulium and having a core diameter larger than 40 microns. In some embodiments, the photonic-crystal device is a photonic-crystal fiber having a core codoped with Thulium and Holmium and having a core diameter larger than 40 microns.

In some embodiments, the photonic-crystal device is a photonic-crystal rod having a core doped with Erbium and having a core diameter larger than 60 microns. In some embodiments, the photonic-crystal device is a photonic-crystal rod having a core codoped with Erbium and Ytterbium and having a core diameter larger than 60 microns. In some embodiments, the photonic-crystal device is a photonic-crystal rod having a core doped with Thulium and having a core diameter larger than 60 microns. In some embodiments, the photonic-crystal device is a photonic-crystal rod having a core codoped with Thulium and Holmium and having a core diameter larger than 60 microns.

In some embodiments, the present invention provides an apparatus including an optical amplifier having a segmented photonic-crystal fiber (PCF) that includes a first amplifying segment having a rare-earth-doped photonic-crystal core and a second amplifying segment having a rare-earth-doped photonic-crystal core, a master oscillator operable to generate a seed-laser signal, and a first optical connector subassembly operatively coupled between the first segment and the second segment, wherein the segmented PCF receives in input and emits as output an optical beam of wavelength of 1.5 microns or longer, the output of the apparatus as a whole including optical pulses having a peak power of at least 500 kW, a spectral linewidth of 1 nm or less, a pulse-to-CW-background ratio of at least 20 dB, and a beam quality $M^2<2$ at a wavelength of 1.5 microns or longer (thereby meeting the requirement for "eye safe" operation), and wherein the apparatus is operated as a component of an optical transmitter device that performs long-range active optical imaging.

In some embodiments, the apparatus further includes a plurality of photonic-crystal optical devices each producing an output beam, and a plurality of dispersive optical elements (e.g., diffraction gratings) arranged to combine the plurality of output beams into a single optical beam, the apparatus as a whole being operated as a component of an optical transmitter, wherein each photonic-crystal device is a rare-earth-doped photonic-crystal fiber having core diameter of at least 40 microns and is operated as an optical pulse amplifier so as to directly generate optical pulses of peak power of 500 kW or more and spectral linewidth of 1 nm or less and pulse-to-CW-background ratio of 20 dB or more and beam quality $M^2<2$ at a wavelength of 1.5 microns or longer, thereby meeting the requirement for "eye safe" operation, and is operated as a component of an optical transmitter within a device that performs long-range active optical imaging, the list of applicable devices including Light Detector and Ranging (LIDAR) devices that include at least one laser.

In some embodiments, the present invention provides an apparatus including an optical transmitter component configured for use in a long-range optical measuring device, the component including a signal laser that emits a laser signal, and a photonic-crystal optical amplifier device operatively coupled to receive the signal laser signal, the photonic-crystal optical amplifier device having a first signal waveguide that has a diameter of at least about 40 microns, maintains a single transverse mode, and is operable to directly generate an output signal of optical pulses having a peak power of at least 500 kW, a spectral linewidth of 1 nm or less, a pulse-to-CW-background ratio of at least 20 dB, and a beam-quality $M^2$ value of less than 2 at a wavelength of 1.5 microns or longer.

Some embodiments further include a scanning component that scans at least a portion of the output signal across an area, an imager component that obtains an image signal representing at least a portion of the scanned area, and a display component that displays an image based on the image signal.

Some embodiments further include a scanning component that scans at least a portion of the output signal across an area, an imager component that obtains an image signal representing at least a portion of the scanned area, a distance-determining component that determines a distance based on a time-of-flight measurement of at least one of the optical pulses, and a display component that displays an image based on the image signal, wherein the image also provides an indication of the distance determined by the distance-determining component.

Some embodiments further include a distance-determining component that determines a distance based on a measurement of at least one of the optical pulses, and a display component that displays an indication of the distance determined by the distance-determining component.

Some embodiments further include a beam-expanding component that expands at least a portion of the output signal to illuminate an area, a shuttered imager component that obtains an image signal representing at least a portion of the illuminated area during a pulse, and a display component that displays an image based on the image signal.

Some embodiments further include a scanning component that scans at least a portion of the output signal across an area, wherein temporally different pulses illuminate various portions of the area, an imager component having a two-dimensional array of pixels that obtain an image signal representing at least a portion of the scanned area, and wherein different subsets of the array of pixels, each having fewer than all the pixels, obtain image information from different pulses, and a display component that displays an image based on the image information.

In some embodiments, the photonic-crystal optical amplifier device is an optical fiber, and the first signal waveguide is a core of the fiber, the core exhibiting a numerical aperture defined by photonic-crystal structures.

In some embodiments, the present invention provides method that includes obtaining a laser signal having pulses, coupling the pulsed laser signal to a first photonic-crystal optical amplifier device having a first signal waveguide that has a diameter of at least about 40 microns, and which maintains a single transverse mode, and amplifying the pulsed laser signal to generate an output signal of optical pulses having a peak power of at least 500 kW, a spectral linewidth of 1 nm or less, a pulse-to-CW-background ratio of at least 20 dB, and a beam-quality $M^2$ value of less than 2 at a signal wavelength of 1.5 microns or longer.

Some embodiments further include scanning at least a portion of the output signal across an area, generating an image signal representing at least a portion of the scanned area, and displaying an image based on the image signal.

Some embodiments further include scanning at least a portion of the output signal across an area, generating an obtains an image signal representing at least a portion of the scanned area, determining a distance based on a time-of-flight measurement of at least one of the optical pulses, and displaying an image based on the image signal, wherein the image also provides an indication of the distance determined by the distance-determining component.

Some embodiments further include determining a distance based on a measurement of at least one of the optical pulses, and displaying an indication of the distance determined by the distance-determining component.

Some embodiments further include expanding at least a portion of the output signal to illuminate an area, shuttered-imaging the area to obtain an image signal representing at least a portion of the illuminated area during a pulse, and displaying an image based on the image signal.

Some embodiments further include scanning at least a portion of the output signal across an area, wherein temporally different pulses illuminate various portions of the area, generating an image signal representing a two-dimensional array of pixels of at least a portion of the scanned area, and wherein different subsets of the array of pixels, each having fewer than all the pixels, represent image information from different pulses, and displaying an image based on the image information.

In some embodiments, the present invention provides an apparatus that includes an optical transmitter component configured for use in a long-range optical measuring device, the component including a signal laser that emits a pulsed laser signal, and photonic-crystal means for amplifying the pulsed laser signal while maintaining a single transverse mode to generate an output signal of optical pulses having a peak power of at least 500 kW, a spectral linewidth of 1 nm or less, a pulse-to-CW-background ratio of at least 20 dB, and a beam-quality $M^2$ value of less than 2 at a signal wavelength of 1.5 microns or longer.

Some embodiments further include means for scanning at least a portion of the output signal across an area, means for generating an image signal representing at least a portion of the scanned area, and means for displaying an image based on the image signal.

Some embodiments further include means for scanning at least a portion of the output signal across an area, means for generating an obtains an image signal representing at least a portion of the scanned area, means for determining a distance based on a time-of-flight measurement of at least one of the optical pulses, and means for displaying an image based on the image signal, wherein the image also provides an indication of the distance determined by the distance-determining component.

Some embodiments further include means for determining a distance based on a measurement of at least one of the optical pulses, and means for displaying an indication of the distance determined by the distance-determining component.

Some embodiments further include means for expanding at least a portion of the output signal to illuminate an area, means for shuttered-imaging the area to obtain an image signal representing at least a portion of the illuminated area during a pulse, and means for displaying an image based on the image signal.

Some embodiments further include means for scanning at least a portion of the output signal across an area, wherein temporally different pulses illuminate various portions of the area, means for generating an image signal representing a two-dimensional array of pixels of at least a portion of the scanned area, and wherein different subsets of the array of pixels, each having fewer than all the pixels, represent image information from different pulses, and means for displaying an image based on the image information.

In some embodiments, the photonic-crystal means for amplifying includes an optical fiber having a core exhibiting a numerical aperture defined by photonic-crystal structures.

In some embodiments, the photonic-crystal means for amplifying includes a photonic crystal fiber having a core diameter larger than 40 microns.

In some embodiments, the photonic-crystal means for amplifying includes a photonic crystal rod having a core diameter larger than 60 microns.

In some embodiments, the photonic-crystal means for amplifying includes a photonic crystal rod having a core is doped with Erbium.

In some embodiments, the photonic-crystal means for amplifying includes a photonic crystal rod having a core is codoped with Erbium and Ytterbium.

In some embodiments, the photonic-crystal means for amplifying includes a photonic crystal rod having a core is doped with Thulium.

In some embodiments, the photonic-crystal means for amplifying includes a photonic crystal rod having a core is codoped with Thulium and Holmium.

Some embodiments further include at least one other signal laser that each emits a pulsed laser signal, and at least one other photonic-crystal means for amplifying the at least one other pulsed laser, and means for spectral-beam combining output signals from the plurality of means for amplifying into a single optical beam.

Method and Apparatus for Ultra-Violet-Wavelength Laser-Induced Fluorescence (UV-LIF) Using Optical Output from a Photonic-Crystal Rod In some embodiments, the present invention provides an apparatus that includes a first photonic-crystal optical device that includes a first waveguide that has a diameter of at least 40 microns and maintains a single transverse mode, and at least one wavelength-conversion optical medium (e.g., non-linear frequency doublers, optical parametric oscillators and the like) operable to receive high-peak-power input radiation having a first wavelength from the first waveguide of the first photonic-crystal device and to generate radiation having a peak power of at least about 100 kW and of a different second wavelength through wavelength conversion, wherein the apparatus is operated as an optical transmitter within a device that performs ultra-violet-wavelength laser-induced-fluorescence (UV-LIF) detection and wherein the optical beam of shorter wavelength generated by the apparatus through the wavelength conversion optical media falls in the 200-400-nm wavelength range and its peak power is of at least 100 kW and the optical beam can be directed towards an airborne cloud carrying inorganic chemicals, organic chemicals and/or biological compounds, these chemicals or compounds being able to absorb light at the wavelength of the optical beam and release light at a different wavelength by fluorescence and this emitted light can be received and detected by one or more optical devices that are operated along with the transmitter within the UV-LIF device.

In some embodiments, the photonic-crystal optical device includes a segmented photonic-crystal fiber that includes a first amplifying segment having a rare-earth-doped photonic-crystal core and a second amplifying segment having a rare-earth-doped photonic-crystal core, a master oscillator operable to generate a seed-laser signal, and a first optical connector subassembly operatively coupled between the first segment and the second segment.

In some embodiments, the present invention provides an apparatus that includes a first photonic-crystal rod (PCR), having rare-earth-doped core with a diameter of at least 40 microns and an external diameter of at least 1 mm such that the rod is therefore thick enough to substantially and readily hold its shape when released.

In some embodiments, the photonic-crystal optical device includes a first segmented photonic-crystal rod (PCR), having rare-earth-doped core with a diameter of at least 40 microns and an external diameter of at least 1 mm such that the rod is therefore thick enough to substantially and readily hold its shape when released, and wherein the photonic-crystal rod is configured as at least two segments that are serially encountered along a signal's optical path. In some embodiments, each two consecutive PCR segments in the series are joined using a piece of bridge optical fiber having an outer diameter different from that of the PCR segments and its ends spliced to the ends of the PCR segments so as to form a chain of alternating PCR segments and bridge-fiber segments, wherein the chain is operable as a continuous optical waveguide. In some such embodiments, each bridge fiber is fused at its ends to its two PCR segments. In some such embodiments, each bridge fiber is laser-welded to its two PCR segments. In some such embodiments, the laser welding acts to seal ends of the PCR's core's holes.

In some embodiments, the apparatus is an enabling optical transmitter for performing long-range detection of airborne chemicals and biological agents.

In some embodiments, the present invention provides an apparatus that includes an optical transmitter component configured for use in a long-range optical measuring device, the component including a signal laser that emits a laser signal, and a first photonic-crystal optical device operatively coupled to receive the signal laser signal, the photonic-crystal optical amplifier device including a signal waveguide that has a diameter of at least 40 microns and maintains a single transverse mode, and at least one wavelength-conversion optical medium operable to receive high-peak-power input radiation having a first wavelength from the signal waveguide of the first photonic-crystal device and to generate radiation having a peak power of at least about 100 kW and a second wavelength that is shorter than 400 nm through wavelength conversion.

In some embodiments, the wavelength-conversion optical medium includes at least one non-linear frequency doubler.

In some embodiments, the wavelength-conversion optical medium includes an optical parametric oscillator.

Some embodiments further include a detector configured to detect ultra-violet-wavelength laser-induced-fluorescence (UV-LIF), wherein the first photonic-crystal optical device is operated as part of an optical transmitter within a device that directs the optical beam towards an airborne cloud material to be analyzed, and an analysis unit configured to detect specific substances.

In some embodiments, the analysis unit is configured to analyze inorganic chemicals.

In some embodiments, the analysis unit is configured to analyze organic chemicals.

In some embodiments, the analysis unit is configured to analyze biological compounds.

In some embodiments, the present invention provides a method that includes obtaining a pulsed laser signal, amplifying the signal laser signal using a photonic-crystal optical amplifier device that includes a signal waveguide that has a diameter of at least 40 microns and maintains a single transverse mode and generates, high-peak-power pulsed radiation, and wavelength-converting the high-peak-power pulsed radiation having a first wavelength from the signal waveguide of the photonic-crystal device to generate radiation having a peak power of at least about 100 kW and a second wavelength that is shorter than 400 nm.

In some embodiments of the method, the wavelength-converting includes at least one non-linear frequency doubling.

In some embodiments, the wavelength-converting includes optical parametric oscillating.

Some embodiments further include optically transmitting the optical beam towards an airborne cloud material to be analyzed, detecting ultra-violet-wavelength laser-induced-fluorescence (UV-LIF), and analyzing the detected UV_LIF to detect specific substances.

In some embodiments, the analyzing is configured to analyze inorganic chemicals.

In some embodiments, the analyzing is configured to analyze organic chemicals.

In some embodiments, the analyzing is configured to analyze biological compounds.

In some embodiments, the present invention provides an apparatus that includes an optical transmitter component configured for use in a long-range optical measuring device, the component including a signal laser that emits a laser signal, photonic-crystal means for amplifying the signal laser signal having a signal waveguide that has a diameter of at least 40 microns and maintains a single transverse mode and that generates high-peak-power pulsed radiation having a first wavelength, and means for wavelength-converting the high-peak-power pulsed radiation to generate radiation having a peak power of at least about 100 kW and a second wavelength that is wavelength shorter than 400 nm.

In some embodiments, the means for wavelength-converting includes at least one non-linear means for frequency doubling.

In some embodiments, the means for wavelength-converting includes an optical parametric oscillator.

Some embodiments further include means for optically transmitting the optical beam towards an airborne cloud material to be analyzed, means for detecting ultra-violet-wavelength laser-induced-fluorescence (UV-LIF), and means for analyzing the detected UV_LIF to detect specific substances.

In some embodiments, the means for analyzing is configured to analyze inorganic chemicals.

In some embodiments, the means for analyzing is configured to analyze organic chemicals.

In some embodiments, the means for analyzing is configured to analyze biological compounds.

Chirped Pulse Amplifiers Using Optical Output from a Photonic-Crystal Rod (PCR) and Associated Method In some embodiments, the present invention provides an apparatus that includes a first photonic-crystal rod (PCR), having rare-earth-doped core with a diameter of at least 50 microns and an external diameter of at least 1 mm such that the rod is therefore thick enough to substantially and readily hold its shape when released, wherein the rare-earth-doped photonic-crystal rod (REDPCR) receives, as signal input, spectrally broad chirped optical pulses having a FWHM spectral linewidth of at least 10 nm and a duration of at least 100 ps, and amplifies the pulses to obtain an output pulse energy of at least 0.5 mJ, peak power of at least 1 MW, and beam quality $M^2<1.5$. In some embodiments, the spectrally broad optical input pulses are obtained by temporally stretching and spectrally chirping optical pulses having duration of 100 ps or less emitted from an external optical source. In some embodiments, the rare-earth-doped photonic-crystal rod includes internal elements (e.g., stress rods) that induce birefringence in the core thereby ensuring that the optical beam emitted by the photonic-crystal rod is linearly polarized and the degree of polarization is at least 15 dB. In some embodiments, the optical beam emitted by at least one segment is linearly polarized with a degree of polarization being at least 16 dB. In some embodiments, the optical beam emitted by at least one segment is linearly polarized with a degree of polarization being at least 17 dB. In some embodiments, the optical beam emitted by at least one segment is linearly polarized with a degree of polarization being at least 18 dB. In some embodiments, the optical beam emitted by at least one segment is linearly polarized with a degree of polarization being at least 19 dB. In some embodiments, the optical beam emitted by at least one segment is linearly polarized with a degree of polarization being at least 20 dB.

In some embodiments, the present invention provides an apparatus having a plurality of optical devices including photonic-crystal fibers, photonic-crystal rods, and solid-body fibers, each of which has a rare-earth-doped core, and which are arranged in series and are separated by subassemblies and operated as optical amplifiers having a segmented photonic-crystal fiber that includes a first amplifying segment having a rare-earth-doped photonic-crystal core and a second amplifying segment having a rare-earth-doped photonic-crystal core, a master oscillator operable to generate a seed-laser signal, and a first optical connector subassembly operatively coupled between the first segment and the second segment. In some embodiments, the master-oscillator subsystem includes a first optical isolator and a first narrow-bandwidth band-pass optical filter, and is operable to generate a narrow-linewidth, single-frequency seed-laser signal coupled to the core of the first segment through the first optical isolator and the first narrow-bandwidth band-pass optical filter. In some embodiments, the master-oscillator subsystem includes a first optical isolator and a first long-pass optical filter, and is operable to generate a narrow-linewidth, single-frequency seed-laser signal coupled to the core of the first segment through the first optical isolator and the first long-pass optical filter.

In some embodiments, the apparatus receives, as signal input, spectrally broad chirped optical pulses having an FWHM spectral linewidth of at least 10 nm and a duration of at least 100 ps, the output from the final amplifier having spectrally broad chirped optical pulses having an FWHM spectral linewidth of at least 10 nm and a duration of at least 100 ps, and an output pulse energy of at least 0.5 mJ, peak power of at least 1 MW, and beam quality $M^2<1.5$.

In some embodiments, the output optical beam from the final amplifier is linearly polarized and the degree of polarization is at least 15 dB.

In some embodiments, the present invention provides a method that includes a first photonic-crystal rod (PCR), having rare-earth-doped core with a diameter of at least 50 microns and an external diameter of at least 1 mm such that the rod is therefore thick enough to substantially hold its shape when released, wherein the rare-earth-doped photonic-crystal rod (REDPCR) receives, as signal input, spectrally broad chirped optical pulses having a FWHM spectral linewidth of at least 10 nm and a duration of 1 ns of less, and amplifies the pulses to obtain an output pulse energy of at least 0.5 mJ, peak power of at least 1 megawatts (MW), and beam-quality $M^2$ value of less than 1.5.

In some embodiments, the spectrally broad optical input pulses are obtained by temporally stretching and spectrally chirping optical pulses having duration of 100 ps or less emitted from an external optical source.

In some embodiments, the rare-earth-doped photonic-crystal rod includes internal stress rods that induce birefringence in the core thereby ensuring that the optical beam emitted by the photonic-crystal rod is linearly polarized and the degree of polarization is at least 15 dB.

In some embodiments, the rare-earth-doped photonic-crystal rod includes internal elements that induce birefringence in the core thereby ensuring that the optical beam emitted by the photonic-crystal rod is linearly polarized and the degree of polarization is at least 15 dB.

In some embodiments, the peak power is at least 4 MW.

Some embodiments further include at least one solid-body fiber, at least one seed laser subsystem configured to emit chirped pulses, and at least one photonic-crystal rod, wherein the first photonic-crystal rod, the solid-body fiber, the laser subsystem, and the photonic-crystal fiber are parts of a series of optical components separated by free-space optical subassemblies that provide pump light into the series of optical components.

Some embodiments further include at least one solid-body fiber, at least one seed laser subsystem configured to emit chirped pulses, and at least one photonic-crystal fiber, wherein the first photonic-crystal rod, the solid-body fiber, the laser subsystem, and the photonic-crystal fiber are parts of a series of optical components separated by free-space optical subassemblies that provide pump light into the series of optical components, and wherein the rare-earth-doped photonic-crystal rod includes internal elements that induce birefringence in the core thereby ensuring that the optical beam emitted by the photonic-crystal rod is linearly polarized and the degree of polarization is at least 15 dB.

In some embodiments, the present invention provides a method that includes providing a first photonic-crystal rod (PCR) having rare-earth-doped core with a diameter of at least 50 microns and an external diameter of at least 1 mm such that the rod is therefore thick enough to substantially hold its shape when released, optically coupling as signal input into the rare-earth-doped photonic-crystal rod (REDPCR) spectrally broad chirped optical pulses having a FWHM spectral linewidth of at least 10 nm and a duration of 1 ns of less, and amplifying the pulses in the REDPCR to obtain an output pulse energy of at least 0.5 mJ, peak power of at least 1 MW, and beam-quality $M^2$ value of less than 1.5.

Some embodiments further include obtaining optical pulses having duration of 100 ps or less, and temporally stretching and spectrally chirping the optical pulses to produce the spectrally broad optical input pulses.

Some embodiments further include ensuring that the optical beam emitted by the photonic-crystal rod is linearly polarized and the degree of polarization is at least 15 dB by including, in the rare-earth-doped photonic-crystal rod, internal stress rods that induce birefringence in the core of the rare-earth-doped photonic-crystal rod.

Some embodiments further include ensuring that the optical beam emitted by the photonic-crystal rod is linearly polarized and the degree of polarization is at least 15 dB by including, in the rare-earth-doped photonic-crystal rod, internal elements that induce birefringence in the core of the rare-earth-doped photonic-crystal rod.

In some embodiments, the amplifying generates peak power of at least 4 MW.

Some embodiments further include serially connecting at least one solid-body fiber, at least one seed laser subsystem configured to emit chirped pulses, and at least one photonic-crystal fiber, as parts of a series of optical components separated by free-space optical subassemblies, and injecting pump light into the series of optical components through the free-space optical subassemblies.

Some embodiments further include serially connecting at least one solid-body fiber, at least one seed laser subsystem configured to emit chirped pulses, and at least one photonic-crystal fiber, as parts of a series of optical components separated by free-space optical subassemblies, injecting pump light into the series of optical components through the free-space optical subassemblies, and ensuring that the optical beam emitted by the photonic-crystal rod is linearly polarized and the degree of polarization is at least 15 dB by including, in the rare-earth-doped photonic-crystal rod, internal elements that induce birefringence in the core of the rare-earth-doped photonic-crystal rod.

In some embodiments, the present invention provides an apparatus that includes photonic-crystal-rod means for amplifying, the means for amplifying having rare-earth-doped means for waveguiding with a diameter of at least 50 microns and means for substantially holding the shape of the means for amplifying when released, means for optically coupling as signal input into the rare-earth-doped photonic-crystal rod (REDPCR) spectrally broad chirped optical pulses having a FWHM spectral linewidth of at least 10 nm and a duration of 1 ns of less, and means for pumping the means for amplifying in order to obtain an output pulse energy of at least 0.5 mJ, peak power of at least 1 MW, and beam-quality $M^2$ value of less than 1.5.

Some embodiments further include means for obtaining optical pulses having duration of 100 ps or less, and means for temporally stretching and spectrally chirping the optical pulses to produce the spectrally broad optical input pulses.

Some embodiments further include means for ensuring that the optical beam emitted by the photonic-crystal rod is linearly polarized and the degree of polarization is at least 15 dB including internal means for stressing the means for waveguiding.

Some embodiments further include means for ensuring that the optical beam emitted by the photonic-crystal rod is linearly polarized and the degree of polarization is at least 15 dB including means for inducing birefringence in the means for waveguiding.

In some embodiments, the means for amplifying generates peak power of at least 4 MW.

Some embodiments further include means for serially connecting at least one solid-body fiber, at least one seed laser subsystem configured to emit chirped pulses, and at least one photonic-crystal fiber, as parts of a series of optical components separated by free-space optical subassemblies, and means for injecting pump light into the series of optical components through the free-space optical subassemblies.

Some embodiments further include means for serially connecting at least one solid-body fiber, at least one seed laser subsystem configured to emit chirped pulses, and at least one photonic-crystal fiber, as parts of a series of optical components separated by free-space optical subassemblies, means for injecting pump light into the series of optical components through the free-space optical subassemblies, and means for ensuring that the optical beam emitted by the photonic-crystal rod is linearly polarized and the degree of polarization is at least 15 dB including means for inducing birefringence in the means for waveguiding.

Method and Apparatus for Spectral-Beam Combining of Megawatt-Peak-Power Beams from Photonic-Crystal Rods In some embodiments, the present invention provides an apparatus that includes a plurality of photonic-crystal optical devices, each including a first waveguide that has a diameter of about 40 microns or more and maintains a single transverse mode, wherein the plurality of photonic-crystal optical devices are arranged side-by-side and operated such that each device can emit a pulsed optical beam of a wavelength different from that of the other devices therein, the apparatus further including at least one external dispersive optical element that receives the emitted optical beams and combines them into a single combined beam having $M^2<2$ and peak power of at least 2 MW, the peak power of the combined beam being at least 50% of the sum of the peak powers in the optical beams.

In some embodiments, the combined beam exhibits peak power of at least 3 MW. In some embodiments, the combined beam exhibits peak power of at least 4 MW. In some embodiments, the combined beam exhibits peak power of at least 5 MW. In some embodiments, the combined beam exhibits peak power of at least 6 MW. In some embodiments, the combined beam exhibits peak power of at least 7 MW. In some embodiments, the combined beam exhibits peak power of at least 8 MW. In some embodiments, the combined beam exhibits peak power of at least 9 MW. In some embodiments, the combined beam exhibits peak power of at least 10 MW. In some embodiments, the combined beam exhibits peak power of at least 20 MW. In some embodiments, the combined beam exhibits peak power of at least 30 MW. In some embodiments, the combined beam exhibits peak power of at least 40 MW. In some embodiments, the combined beam exhibits peak power of at least 50 MW. In some embodiments, the combined beam exhibits peak power of at least 60 MW. In some embodiments, the combined beam exhibits peak power of at least 70 MW. In some embodiments, the combined beam exhibits peak power of at least 80 MW. In some embodiments, the combined beam exhibits peak power of at least 90 MW. In some embodiments, the combined beam exhibits peak power of at least 100 MW.

In some embodiments, each photonic-crystal optical device further includes a respective master oscillator operable to emit an optical beam of a different wavelength than those of the other master oscillators, an optical isolator, and a narrow-bandwidth filter, wherein the master oscillator is operable to generate a narrow-linewidth seed-laser signal operably coupled to the core of the respective photonic-crystal optical device through the first optical isolator and the first narrow-bandwidth filter.

In some embodiments, the first waveguide has a diameter of more than 40 microns. In some embodiments, the first optical device includes a first photonic-crystal fiber and the first waveguide is a first core of the first photonic-crystal device and is capable of operation with a peak power of about 1 MW or more. In some embodiments, the first core of the first photonic-crystal fiber is capable of operation with a peak power of more than 1 MW. In some embodiments, the first core of the first photonic-crystal device is capable of operation with a near-diffraction-limited output beam having $M^2<1.2$. In some embodiments, the first core of the first photonic-crystal device is capable of operation with a near-diffraction-limited output beam having $M^2<1.2$ to generate linearly polarized pulses and a peak power of about 100 kW or more.

In some embodiments, the present invention provides an apparatus that includes a plurality of photonic-crystal optical devices, each including a first waveguide that has a diameter of at least about 40 microns and maintains a single transverse mode, wherein the plurality of photonic-crystal optical devices are arranged side-by-side and operable such that each device emits a pulsed optical beam of a wavelength different from that of the other devices therein, and at least one external dispersive optical element that receives the emitted optical beams and combines them into a single combined beam having $M^2<2$ and peak power of at least 2 megawatts (MW), the peak power of the combined beam being at least 50% of the sum of the peak powers in the optical beams.

In some embodiments, the combined beam exhibits peak power of at least 5 MW.

In some embodiments, the combined beam exhibits peak power of at least 10 MW.

In some embodiments, the combined beam exhibits peak power of at least 100 MW.

Some embodiments further include an optical isolator, an optical filter, and a master oscillator subsystem for each of the plurality of photonic-crystal optical devices, each master oscillator subsystem operable to generate a narrow-linewidth, single-frequency seed laser signal operably coupled to the core of its respective photonic crystal optical device though the respective optical isolator and the respective optical filter.

In some embodiments, each of the plurality of photonic-crystal optical devices includes a photonic-crystal rod (PCR) having rare-earth-doped core with a diameter of at least 50 microns and an external diameter of at least 1 mm such that the rod is therefore thick enough to substantially hold its shape when released, and is operable to amplify pulses to obtain an output pulse energy of at least 0.5 mJ, peak power of at least 1 MW, and beam-quality $M^2$ value of less than 1.5.

Some embodiments further include an optical isolator, an optical filter, and a master oscillator subsystem for each of the plurality of photonic-crystal optical devices, each master oscillator subsystem operable to generate a narrow-linewidth, single-frequency seed laser signal operably coupled to the core of its respective photonic crystal optical device though the optical isolator and the optical filter, and wherein each of the plurality of photonic-crystal optical devices includes a photonic-crystal rod (PCR) having rare-earth-doped core with a diameter of at least 50 microns and an external diameter of at least 1 mm such that the rod is therefore thick enough to substantially hold its shape when released, and is operable to amplify pulses to obtain an output pulse energy of at least 0.5 mJ, peak power of at least 1 MW, and beam-quality $M^2$ value of less than 1.5.

In some embodiments, the present invention provides a method that includes providing a plurality of photonic-crystal optical devices, each including a first waveguide that has a diameter of at least about 40 microns and maintains a single transverse mode, wherein the plurality of photonic-crystal optical devices are arranged side-by-side and operable such that each device emits a pulsed optical beam of a wavelength different from that of the other devices therein, and receiving the emitted optical beams and combining the emitted optical beams into a single combined beam having $M^2<2$ and peak power of at least 2 MW, the peak power of the combined beam being at least 50% of the sum of the peak powers in the optical beams.

In some embodiments, the combined beam exhibits peak power of at least 5 MW.

In some embodiments, the combined beam exhibits peak power of at least 10 MW.

In some embodiments, the combined beam exhibits peak power of at least 100 MW.

Some embodiments further include providing an optical isolator, an optical filter, and a master oscillator subsystem for each of the plurality of photonic-crystal optical devices, generating from each master oscillator subsystem a narrow-linewidth, single-frequency seed laser signal, and coupling each seed laser signal to the core of its respective photonic crystal optical device though the respective optical isolator and the respective optical filter.

In some embodiments, each of the plurality of photonic-crystal optical devices includes a photonic-crystal rod (PCR) having rare-earth-doped core with a diameter of at least 50 microns and an external diameter of at least 1 mm such that the rod is therefore thick enough to substantially hold its shape when released, and is operable to amplify pulses to obtain an output pulse energy of at least 0.5 mJ, peak power of at least 1 MW, and beam-quality $M^2$ value of less than 1.5.

Some embodiments further include providing an optical isolator, an optical filter, and a master oscillator subsystem for each of the plurality of photonic-crystal optical devices, generating from each master oscillator subsystem a narrow-linewidth, single-frequency seed laser signal, coupling each seed laser signal to the core of its respective photonic crystal optical device though the respective optical isolator and the respective optical filter, wherein each of the plurality of photonic-crystal optical devices includes a photonic-crystal rod (PCR) having rare-earth-doped core with a diameter of at least 50 microns and an external diameter of at least 1 mm such that the rod is therefore thick enough to substantially hold its shape when released, and is operable to amplify pulses to obtain an output pulse energy of at least 0.5 mJ, peak power of at least 1 MW, and beam-quality $M^2$ value of less than 1.5.

In some embodiments, the present invention provides an apparatus that includes a plurality of photonic-crystal optical devices, each including a first waveguide that has a diameter of at least about 40 microns and maintains a single transverse mode, wherein the plurality of photonic-crystal optical devices are arranged side-by-side and operable such that each device emits a pulsed optical beam of a wavelength different from that of the other devices therein, and means for receiving the emitted optical beams and combining the emitted optical beams into a single combined beam having $M^2<2$ and peak power of at least 2 MW, the peak power of the combined beam being at least 50% of the sum of the peak powers in the optical beams.

In some embodiments, the combined beam exhibits peak power of at least 5 MW.

In some embodiments, the combined beam exhibits peak power of at least 10 MW.

In some embodiments, the combined beam exhibits peak power of at least 100 MW.

Some embodiments further include an optical isolator, an optical filter, and a master oscillator subsystem for each of the plurality of photonic-crystal optical devices, means for generating from each master oscillator subsystem a narrow-linewidth, single-frequency seed laser signal, and means for coupling each seed laser signal to the core of its respective photonic crystal optical device though the respective optical isolator and the respective optical filter.

In some embodiments, each of the plurality of photonic-crystal optical devices includes a photonic-crystal rod (PCR) having rare-earth-doped core with a diameter of at least 50 microns and an external diameter of at least 1 mm such that the rod is therefore thick enough to substantially hold its shape when released, and is operable to amplify pulses to obtain an output pulse energy of at least 0.5 mJ, peak power of at least 1 MW, and beam-quality $M^2$ value of less than 1.5.

Some embodiments further include an optical isolator, an optical filter, and a master oscillator subsystem for each of the plurality of photonic-crystal optical devices, means for generating from each master oscillator subsystem a narrow-linewidth, single-frequency seed laser signal, means for coupling each seed laser signal to the core of its respective photonic crystal optical device though the respective optical isolator and the respective optical filter, wherein each of the plurality of photonic-crystal optical devices includes a photonic-crystal rod (PCR) having rare-earth-doped core with a diameter of at least 50 microns and an external diameter of at least 1 mm such that the rod is therefore thick enough to substantially hold its shape when released, and is operable to amplify pulses to obtain an output pulse energy of at least 0.5 mJ, peak power of at least 1 MW, and beam-quality $M^2$ value of less than 1.5.

Method and Apparatus for Spectral-Beam Combining of Megawatt-Peak-Power Beams from Segmented Photonic-Crystal Devices Arranged Side-by-Side Some embodiments include an apparatus including a plurality of devices that each include an optical amplifier having a segmented photonic-crystal waveguide that includes a first amplifying segment having a rare-earth-doped photonic-crystal core and a second amplifying segment having a rare-earth-doped photonic-crystal core, a master oscillator operable to generate a seed-laser signal, and a first optical connector subassembly operatively coupled between the first segment and the second segment, wherein each one of the plurality of devices emits an optical beam of a different wavelength than that of the other devices, and the final amplifying segments of photonic-crystal waveguides are arranged side-by-side, the apparatus further including at least one external dispersive optical element that acts as a spectral-beam combiner, which receives the emitted optical beams from each final amplifying segment of photonic-crystal waveguide and combines them into a single combined beam having $M^2<2$ and peak power of 2 MW or higher, the peak power of the combined beam being at least 50% of the sum of the peak powers in each optical beam. In some such embodiments, the final amplifying segments have an outer diameter of at least 1 mm, and are considered rods, wherein the final photonic-crystal rods are arranged side-by-side, In some embodiments, each respective master oscillator is operable to emit an optical beam of a different wavelength than those of the other master oscillators, and each master oscillator includes an optical isolator, and a narrow-bandwidth filter, wherein the master oscillator is operable to generate a narrow-linewidth seed-laser signal operably coupled to the core of the respective photonic-crystal optical device through the first optical isolator and the first narrow-bandwidth filter.

In some such embodiments, the combined beam exhibits peak power of at least 3 MW. In some such embodiments, the combined beam exhibits peak power of at least 4 MW. In some such embodiments, the combined beam exhibits peak power of at least 5 MW. In some such embodiments, the combined beam exhibits peak power of at least 10 MW. In some such embodiments, the combined beam exhibits peak power of at least 20 MW. In some such embodiments, the combined beam exhibits peak power of at least 30 MW. In some such embodiments, the combined beam exhibits peak power of at least 40 MW. In some such embodiments, the combined beam exhibits peak power of at least 50 MW. In some such embodiments, the combined beam exhibits peak power of at least 60 MW. In some such embodiments, the combined beam exhibits peak power of at least 70 MW. In some such embodiments, the combined beam exhibits peak power of at least 80 MW. In some such embodiments, the combined beam exhibits peak power of at least 90 MW. In some such embodiments, the combined beam exhibits peak power of at least 100 MW.

In some embodiments, the present invention provides an apparatus that includes a first photonic-crystal optical device having a plurality of photonic-crystal fibers or rods, each fiber or rod including a core, and an inner pump cladding surrounding its core in order to provide pump light into the core over a length of the fiber or rod, the device including a first core that has a diameter of at least about 40 microns and maintains a single transverse mode. In some embodiments, the optical device includes the plurality of fibers or rods arranged side-by-side, and wherein the cores of the fibers or rods each have a diameter of at least about 40 microns and each emit a single transverse mode optical beam of different wavelength, the apparatus further including one or more external dispersive optical elements that form a spectral-beam combiner that receives the emitted optical beams from each core and combines them into a single beam having $M^2<2$ and peak power of 2 MW or higher, the peak power of the combined beam being at least 50% of the sum of the peak powers in each optical beam. In some embodiments, the combined beam exhibits peak power of at least 5 MW. In some such embodiments, the combined beam exhibits peak power of at least 10 MW. In some such embodiments, the combined beam exhibits peak power of at least 20 MW. In some such embodiments, the combined beam exhibits peak power of at least 30 MW. In some such embodiments, the combined beam exhibits peak power of at least 40 MW. In some such embodiments, the combined beam exhibits peak power of at least 50 MW. In some such embodiments, the combined beam exhibits peak power of at least 60 MW. In some such embodiments, the combined beam exhibits peak power of at least 70 MW. In some such embodiments, the combined beam exhibits peak power of at least 80 MW. In some such embodiments, the combined beam exhibits peak power of at least 90 MW. In some such embodiments, the combined beam exhibits peak power of at least 100 MW. Some embodiments further include a plurality of master oscillators, each master oscillator emitting an optical beam of different wavelength and each optical beam being coupled into one of the spectral-beam combiners.

In some embodiments, the present invention provides an apparatus that includes a first photonic-crystal rod (PCR), having rare-earth-doped core with a diameter of at least 50 microns and an external diameter of at least 1 mm such that the rod is therefore thick enough to substantially and readily hold its shape when released, wherein the first photonic-crystal rod is ribbon-like and further includes a plurality of other cores arranged side-by-side, with their lengths perpendicular to a straight line transverse to a length of the fiber, and wherein the cores each have a diameter of about 50 microns or more and each emit a single transverse mode optical beam of different wavelength, the fiber further including an inner pump cladding surrounding the core in order to provide pump light into all of the cores over a length of fiber, the apparatus further including one or more external dispersive optical elements that receive the emitted optical beams from each core and combine them into a single beam having $M^2<2$ and peak power of 2 MW or higher, the peak power of the combined beam being a significant fraction (50% or higher) of the sum of the peak powers in each optical beam. In some such embodiments, the combined beam exhibits peak power of at least 5 MW. In some such embodiments, the combined beam exhibits peak power of at least 10 MW. In some such embodiments, the combined beam exhibits peak power of at least 20 MW. In some such embodiments, the combined beam exhibits peak power of at least 30 MW. In some such embodiments, the combined beam exhibits peak power of at least 40 MW. In some such embodiments, the combined beam exhibits peak power of at least 50 MW. In some such embodiments, the combined beam exhibits peak power of at least 60 MW. In some such embodiments, the combined beam exhibits peak power of at least 70 MW. In some such embodiments, the combined beam exhibits peak power of at least 80 MW. In some such embodiments, the combined beam exhibits peak power of at least 90 MW. In some such embodiments, the combined beam exhibits peak power of at least 100 MW. Some embodiments further include a plurality of master oscillators, each master oscillator emitting an optical beam of different wavelength and each optical beam being coupled into one of the spectral-beam combiners.

Monolithic or Ribbon-Like Multi-Core Photonic-Crystal Fibers and Associated Method In some embodiments, the present invention provides an apparatus that includes a first multi-waveguide ribbon device having an external thickness of at least 1 mm such that the first multi-waveguide ribbon device is thick enough to substantially and readily hold its shape when released, and a plurality of substantially parallel cores including a first rare-earth-doped core with a diameter of at least 50 microns defined by photonic-crystal holes and a second rare-earth-doped core with a diameter of at least 50 microns defined by photonic-crystal holes, the first multi-waveguide ribbon device further including an inner pump cladding surrounding the plurality of cores in order to provide pump light into the plurality of cores over a length of the first multi-waveguide ribbon device.

Some embodiments further include at least one external dispersive optical element that receives the emitted optical beams from each of the plurality of cores and combines the beams into a single beam having $M^2<2$ and peak power of 2 megawatts (MW) or higher, the peak power of the combined beam being at least 50% of a sum of the peak powers in each optical beam.

In some embodiments, the holes are thermally collapsed along a portion of the first multi-waveguide ribbon device.

In some embodiments, at least one end of the first multi-waveguide ribbon device is subjected to a side-tapering process.

Some embodiments further include a first diffraction grating device, wherein output beams of the plurality of cores combined into a single beam using the first diffraction grating device.

Some embodiments further include a second multi-waveguide ribbon device having a plurality of substantially parallel cores including a first rare-earth-doped core defined by photonic-crystal structures and a second rare-earth-doped core defined by photonic-crystal structures, the second photonic-crystal ribbon further including an inner pump cladding surrounding the plurality of cores in order to provide pump light into the plurality of cores over a length of the second multi-waveguide ribbon device, a first diffraction grating device, wherein output beams of the plurality of cores from the first multi-waveguide ribbon device combined into a single beam using the first diffraction grating device, and a second diffraction grating device, wherein the cores of the second multi-waveguide ribbon device are all operated as seed lasers having different wavelengths that are set using the second diffraction grating device, wherein light from the seed lasers is amplified using the first multi-waveguide ribbon device.

Some embodiments further include a second multi-waveguide ribbon device having a plurality of substantially parallel cores including a first rare-earth-doped core and a second rare-earth-doped core, the second multi-waveguide ribbon device further including an inner pump cladding surrounding the plurality of cores in order to provide pump light into the plurality of cores over a length of the second ribbon device, a first diffraction grating device that includes two parallel diffraction gratings, wherein output beams of the plurality of cores from the first multi-waveguide ribbon device combined into a single beam using the first diffraction grating device, and a second diffraction grating device that includes two parallel diffraction gratings, wherein the cores of the second multi-waveguide ribbon device are all operated as seed lasers having different wavelengths that are set using the second diffraction grating device, wherein light from the seed lasers is amplified using the first diffraction grating device.

In some embodiments, the present invention provides a method that includes providing a first multi-waveguide ribbon device having an external thickness of at least 1 mm such that the first multi-waveguide ribbon device is thick enough to substantially and readily hold its shape when released, and a plurality of substantially parallel cores including a first rare-earth-doped core with a diameter of at least 50 microns defined by photonic-crystal holes and a second rare-earth-doped core with a diameter of at least 50 microns defined by photonic-crystal holes, and injecting pump light into the plurality of cores over a length of the first multi-waveguide ribbon device.

Some embodiments further include spectral-beam combining the beams into a single beam having $M^2<2$ and peak power of 2 MW or higher, the peak power of the combined beam being at least 50% of a sum of the peak powers in each optical beam.

Some embodiments further include thermally collapsing the holes along a portion of the first multi-waveguide ribbon device.

In some embodiments, at least one end of the first multi-waveguide ribbon device is subjected to a side-tapering process.

Some embodiments further include providing a first diffraction grating device, and combining output beams of the plurality of cores into a single beam using the first diffraction grating device.

Some embodiments further include providing a second multi-waveguide ribbon device having a plurality of substantially parallel cores including a first rare-earth-doped core defined by photonic-crystal structures and a second rare-earth-doped core defined by photonic-crystal structures, the second photonic-crystal ribbon further including an inner pump cladding surrounding the plurality of cores in order to provide pump light into the plurality of cores over a length of the second multi-waveguide ribbon device, spectral-beam combining output beams of the plurality of cores from the first multi-waveguide ribbon device into a single beam using a first diffraction grating device, operating the cores of the second multi-waveguide ribbon device as seed lasers having different wavelengths that are set using a second diffraction-grating device, and amplifying light from the seed lasers using the first multi-waveguide ribbon device.

Some embodiments further include providing a second multi-waveguide ribbon device having a plurality of substantially parallel cores including a first rare-earth-doped core defined by photonic-crystal structures and a second rare-earth-doped core defined by photonic-crystal structures, the second photonic-crystal ribbon further including an inner pump cladding surrounding the plurality of cores in order to provide pump light into the plurality of cores over a length of the second multi-waveguide ribbon device, spectral-beam combining output beams of the plurality of cores from the first multi-waveguide ribbon device into a single beam using a first diffraction grating device that includes two parallel diffraction gratings, operating the cores of the second multi-waveguide ribbon device as seed lasers having different wavelengths that are set using a second diffraction-grating device that includes two parallel diffraction gratings, and amplifying light from the seed lasers using the first multi-waveguide ribbon device.

In some embodiments, the present invention provides an apparatus that includes a first multi-waveguide means for amplifying that substantially and readily holds its shape when released, and includes a plurality of substantially parallel cores including a first rare-earth-doped core with a diameter of at least 50 microns defined by photonic-crystal holes and a second rare-earth-doped core with a diameter of at least 50 microns defined by photonic-crystal holes, and means for injecting pump light into the plurality of cores over a length of the first multi-waveguide ribbon device.

Some embodiments further include means for spectral-beam combining the beams into a single beam having $M^2<2$ and peak power of 2 MW or higher, the peak power of the combined beam being at least 50% of a sum of the peak powers in each optical beam.

Some embodiments further include means for sealing the holes along a portion of the first multi-waveguide ribbon device.

In some embodiments, at least one end of the first multi-waveguide ribbon device is subjected to a side-tapering process.

Some embodiments further include means for combining output beams of the plurality of cores into a single beam.

Some embodiments further include a second multi-waveguide ribbon device having a plurality of substantially parallel cores including a first rare-earth-doped core defined by photonic-crystal structures and a second rare-earth-doped core defined by photonic-crystal structures, the second photonic-crystal ribbon further including an inner pump cladding surrounding the plurality of cores in order to provide pump light into the plurality of cores over a length of the second multi-waveguide ribbon device, means for spectral-beam combining output beams of the plurality of cores from the first multi-waveguide ribbon device into a single beam using a first diffraction grating device, means for operating the cores of the second multi-waveguide ribbon device as seed lasers having different wavelengths that are set using a second diffraction-grating device, means for amplifying light from the seed lasers using the first multi-waveguide ribbon device.

Some embodiments further include a second multi-waveguide ribbon device having a plurality of substantially parallel cores including a first rare-earth-doped core defined by photonic-crystal structures and a second rare-earth-doped core defined by photonic-crystal structures, the second photonic-crystal ribbon further including an inner pump cladding surrounding the plurality of cores in order to provide pump light into the plurality of cores over a length of the second multi-waveguide ribbon device, means for spectral-beam combining output beams of the plurality of cores from the first multi-waveguide ribbon device into a single beam using two parallel means for diffracting, means for operating the cores of the second multi-waveguide ribbon device as seed lasers having different wavelengths that are set using two parallel means for diffracting, and means for amplifying light from the seed lasers using the first multi-waveguide ribbon device.

In some embodiments, the photonic-crystal rod is cut into (or otherwise formed as) a plurality of segments and the segments are arranged as described in the section above labeled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD."

In some embodiments, the devices and apparatuses of the present invention are operated as the optical source or one of the optical sources within a device used to process materials, the processing being any action upon the material that is induced using generated optical beams, including, but not limited to, welding, cutting, drilling, annealing, softening, burnishing, abrading, scoring, ablating, vaporizing, chasing, embossing, and melting. In some embodiments, the generated optical beams are used in particle accelerators, such as desktop particle accelerators that use laser beams on thin foils or focusing cylinders (e.g., such as described by Mike Dunne, "Laser-Driven Particle Accelerators," *Science,* 21 Apr. 2006 312: 374-376).

In some embodiments, the apparatuses are operated as an optical transmitter in a device that performs long-range active optical imaging, the list of applicable devices including Light Detector and Ranging (LIDAR) devices that include at least one laser and the wavelength of one or more optical beams emitted by the apparatus is of 1.0 microns or longer. In some embodiments, the wavelength of one or more optical beams emitted by the apparatus is of 1.5 microns or longer. In some embodiments, the combined optical beam from one or more of these devices is linearly polarized and the degree of polarization is at least 15 dB. In some embodiments, the optical beam emitted by at least one segment is linearly polarized with a degree of polarization being at least 16 dB. In some embodiments, the optical beam emitted by at least one segment is linearly polarized with a degree of polarization being at least 17 dB. In some embodiments, the optical beam emitted by at least one segment is linearly polarized with a degree of polarization being at least 18 dB. In some embodiments, the optical beam emitted by at least one segment is linearly polarized with a degree of polarization being at least 19 dB. In some embodiments, the optical beam emitted by at least one segment is linearly polarized with a degree of polarization being at least 20 dB. Some embodiments further include at least one wavelength-conversion optical medium, operable to receive a high-peak-power input optical beam having a first wavelength and to generate an optical beam having a peak power of about 100 kW or more and of a different second wavelength through wavelength conversion.

In some embodiments, the apparatus is included within, and is being operated as an optical transmitter within, a device that performs ultra-violet-wavelength laser-induced-fluorescence (UV-LIF) detection, wherein the optical beam of shorter wavelength generated by the apparatus through the wavelength-conversion optical media falls in the 200-400-nm wavelength range and its peak power is of 100 kW or more and the optical beam can be directed towards an airborne cloud carrying inorganic chemicals or organic chemicals or biological compounds, these chemicals or compounds being able to absorb light at the wavelength of the optical beam and release light at a different wavelength by fluorescence and this emitted light can be received and detected by one or more optical devices that are operated along with the transmitter within the UV-LIF device Multi-Segment Photonic-Crystal-Rod Waveguides Coupled Across a Free-Space Gap and Associated Method In some embodiments, the present invention provides an apparatus that includes a first segmented photonic-crystal-rod (PCR) waveguide configured as a plurality of segments with non-contiguous photonic-crystal rare-earth-doped waveguide cores, the cores having a diameter of at least 40 microns and the segments having an external diameter of at least 1 mm, including a second PCR segment and a first PCR segment having at least one free-space gap therebetween and that are serially encountered along a signal's optical path.

Some embodiments further include a free-space optical subassembly having an enclosure and a first optical component that forms at least part of an optical path between the second and first segment, wherein the first optical component is laser welded to the enclosure.

In some embodiments, the first optical component is a narrow-band optical band-pass filter that is operated also as an optical isolator for light at wavelengths other than the signal pulses that counter-propagates with respect to the signal pulses.

Some embodiments further include a free-space optical subassembly having an enclosure and a first optical component that forms at least part of an optical path between the second and first segment, wherein the first optical component is attached to the enclosure using solder.

In some embodiments, the first and second PCR segments are interspaced by a free-space gap and are operated such that the optical beam exiting the second segment is optically coupled into the first segment using a plurality of optical components.

In some embodiments, the optical beam exiting the second segment is optically coupled into the first segment using at least a lens and an optical prism.

In some embodiments, the first and second PCR segments are arranged side by side such that their cores run parallel to one another, wherein the first and second PCR segments are laser welded to one another along at least a portion of their sides.

Some embodiments further include a substrate, wherein the first and second PCR segments are arranged side by side such that their cores run parallel to one another, wherein the first and second PCR segments are laser welded to the substrate along at least a portion of their sides, and wherein the prism is also laser welded to the substrate.

Some embodiments further include a pump-block subassembly operatively coupled between the second PCR segment and the first PCR segment, wherein the pump-block subassembly directs pump light into the second PCR segment in a counter-propagating direction relative to signal light, and directs signal light from the second PCR segment to the first PCR segment.

Some embodiments further include a pump-block subassembly operatively coupled between the second PCR segment and the first PCR segment, wherein the pump-block subassembly includes a bandpass optical filter and a dichroic mirror/beamsplitter configured to direct pump light into the second PCR segment in a counter-propagating direction relative to signal light, and to direct signal light from the second PCR segment to the first PCR segment through the bandpass optical filter.

In some embodiments, the core of the first PCR segment is not co-linear with the core of the second PCR segment.

In some embodiments, at least one of the photonic-crystal rod segments has at least one end facet prepared such that the photonic-crystal holes are sealed at the facet and the facet is shaped to form a lens that collimates the optical beam propagating outward from the core of that segment.

In some embodiments, at least one of the photonic-crystal rod segments has at least one end facets prepared such that the cladding holes are sealed at the facet and the facet is shaped to form a lens that focuses into the segment core an optical beam that is optically coupled into the core from outside that segment.

In some embodiments, at least one of the second and first PCR segments includes one or more stress regions to create a waveguide that supports a linearly polarized optical beam having degree of polarization of at least 15 dB.

In some embodiments, the present invention provides a method that includes providing a first segmented photonic-crystal-rod (PCR) waveguide configured as a plurality of segments with non-contiguous photonic-crystal rare-earth-doped waveguide cores, the cores having a diameter of at least 40 microns and the segments having an external diameter of at least 1 mm, including a second PCR segment and a first PCR segment, and forming an optical signal beam path from the core of the second PCR segment to the core of the first PCR segment across at least one free-space gap.

In some embodiments, the forming of the optical signal beam path further includes providing a free-space optical subassembly having an enclosure and a first optical component that forms at least part of an optical path between the second and first segment, and laser welding the first optical component to the enclosure.

In some embodiments, the first optical component is a narrow-band optical band-pass filter, and the method further includes blocking light, at wavelengths other than the signal pulses, that counter-propagates with respect to the signal pulses.

In some embodiments, the forming of the optical signal beam path further includes providing a free-space optical subassembly having an enclosure and a first optical component that forms at least part of an optical path between the second and first segment, and soldering the first optical component to the enclosure.

In some embodiments, the forming of the optical signal beam path further includes optically coupling the optical beam exiting the second segment into the first segment using a plurality of optical components.

In some embodiments, the forming of the optical signal beam path further includes optically coupling the optical beam exiting the second segment into the first segment using at least a lens and an optical prism.

Some embodiments further include providing a substrate, arranging the first and second PCR segments side by side such that their cores run parallel to one another, laser welding the first and second PCR segments to the substrate along at least a portion of their sides, and laser welding the prism to the substrate.

Some embodiments further include arranging the first and second PCR segments side by side such that their cores run parallel to one another, and laser welding the first and second PCR segments to one another along at least a portion of their sides.

Some embodiments further include providing a pump-block subassembly,
  optically coupling signal light from the second PCR segment into the first PCR segment through the pump-block subassembly, and directing pump light into the second PCR segment in a counter-propagating direction relative to signal light.

Some embodiments further include providing a pump-block subassembly, optically coupling and bandpass filtering signal light from the second PCR segment into the first PCR segment using a dichroic mirror/beamsplitter and a filter, and directing pump light into the second PCR segment in a counter-propagating direction relative to signal light using dichroic mirror/beamsplitter.

Some embodiments further include arranging the core of the first PCR segment to be not co-linear with the core of the second PCR segment.

Some embodiments further include sealing photonic-crystal holes of at least one of the photonic-crystal-rod segments at least one end facet, and shaping the facet to form a lens that collimates the optical beam propagating outward from the core of that segment.

Some embodiments further include sealing photonic-crystal holes of at least one of the PCR segments at least one end facet, and shaping the facet to form a lens that focuses an optical beam into the segment's core from outside that segment.

Some embodiments further include amplifying a seed signal beam to form a linearly polarized optical signal beam having degree of polarization of at least 15 dB.

Photonic-Crystal Waveguides with Beam-Expanding Endcaps and Associated Method

In some embodiments, the present invention provides an apparatus that includes a photonic-crystal waveguide having lengthwise holes surrounding a core, the waveguide having a first end facet, wherein the holes surrounding the core of the photonic-crystal rod are thermally collapsed and melted shut over a length of 1 mm or more in a stepwise manner proceeding from the facet through which the optical beam is emitted, this facet being also angle-polished, such that an optical beam propagating through the region wherein the holes are collapsed can expand by free-space diffraction). In some embodiments, the photonic-crystal waveguide is in a photonic-crystal rod having rare-earth-doped core with a diameter of at least 40 microns and an external diameter of at least 1 mm such that the rod is therefore thick enough to substantially and readily hold its shape when released. In some such embodiments, the core of the PCR has a diameter of at least 50 microns. In some such embodiments, the core of the PCR has a diameter of at least 60 microns. In some such embodiments, the core of the PCR has a diameter of at least 70 microns. In some such embodiments, the core of the PCR has a diameter of at least 80 microns. In some such embodiments, the core of the PCR has a diameter of at least 90 microns. In some such embodiments, the core of the PCR has a diameter of at least 100 microns. In some such embodiments, the core of the PCR has a diameter of at least 110 microns. In some such embodiments, the core of the PCR has a diameter of at least 120 microns. In some such embodiments, the core of the PCR has a diameter of at least 130 microns. In some such embodiments, the core of the PCR has a diameter of at least 140 microns. In some such embodiments, the core of the PCR has a diameter of at least 150 microns. In some embodiments, the apparatus is operable to generate a peak signal power of at least 500 kW. In some embodiments, the holes are melted shut over a length of 2 mm or more. In some embodiments, the holes are melted shut over a length of 3 mm or more. In some embodiments, the holes are melted shut over a length of 4 mm or more. In some embodiments, the holes are melted shut over a length of 5 mm or more.

In some embodiments, the photonic-crystal waveguide is in a photonic-crystal fiber, and the length over which such holes are thermally collapsed in a stepwise manner being 2 mm or more. In some embodiments, the holes are melted shut over a length of 3 mm or more. In some embodiments, the holes are melted shut over a length of 4 mm or more. In some embodiments, the holes are melted shut over a length of 5 mm or more.

In some embodiments, the present invention provides an apparatus that includes a photonic-crystal waveguide having lengthwise holes surrounding a core, the waveguide having a first end facet, wherein the holes surrounding the core of the photonic-crystal fiber have been filled with an compound matching the refractive index of the photonic-crystal-fiber inner material for a length of 1 mm or more from the photonic-crystal-fiber facet.

In some embodiments, the photonic crystal rod is mechanically tapered in a region of several millimeters proceeding from one of its facet, wherein the tapering helps the thermal collapse of the holes.

In some embodiments, the present invention provides an apparatus that includes a first photonic-crystal rod (PCR), having rare-earth-doped core with a diameter of at least 50 microns and an external diameter of at least 1 mm such that the rod is therefore thick enough to substantially and readily hold its shape when released, wherein the first photonic crystal rod is ribbon-like and further includes a plurality of other cores arranged side-by-side generally along a straight line transverse to a length of the fiber, and wherein the cores each have a diameter of about 50 microns or more and each emit a single transverse mode optical beam of different wavelength, the fiber further including an inner pump cladding surrounding the core in order to provide pump light into all of the cores over a length of fiber, the apparatus further including one or more external dispersive optical elements that receive the emitted optical beams from each core and combine them into a single beam having $M^2<2$ and peak power of 2 MW or higher, the peak power of the combined beam being a significant fraction (50% or higher) of the sum of the peak powers in each optical beam, wherein the holes surrounding the cores of the photonic crystal fiber are thermally collapsed. In some such embodiments, the ends of the photonic-crystal device are subjected to the above-described tapering process.

In some embodiments, the present invention provides for MW-peak-power radiation at wavelengths of about 1.5 microns or longer produced by PCF/PCR amplifiers.

In some embodiments, the present invention provides the termination techniques for photonic band gap fibers, including forming endcaps by collapsing holes at the end of the fiber and/or fusing a beam-expanding endcap to the end of the fiber.

In some embodiments, the present invention provides for spectral beam combining (SBC) of two or more beams each having about 1-megawatt (1-MW) or more peak-power beams produced by PCF/PCR amplifiers.

In some embodiments, the present invention provides for collapsing of holes to make an endcap or the process of successively collapsing fiber to produce longer end caps.

In some embodiments, the present invention provides a master oscillator (MO) with a preamplifier to produce a beam to seed one or more PCF/PCR amplifiers to generate MW peak-power output.

Fiber- or Rod-Based Optical Source Featuring a Large-Core, Rare-Earth-Doped Photonic-Crystal Device for Generation of High-Power Pulsed Radiation and Associated Method In some embodiments, the present invention provides an apparatus that includes a first photonic-crystal optical device that includes a first waveguide that has a diameter of at least about 40 microns and maintains a single transverse mode, is capable of operation with a peak power of at least 500 kilowatts (kW) and a spectrally narrow signal bandwidth of less than 20 GHz.

In some embodiments, the first waveguide has a diameter of at least 70 microns.

In some embodiments, the first waveguide has a diameter of at least 100 microns.

In some embodiments, the first optical device is a first photonic-crystal fiber and the first waveguide is a first core of the first photonic-crystal device and is capable of operation with a peak power of at least 4 megawatts (MW).

In some embodiments, the first optical device is a first photonic-crystal fiber and the first waveguide is a first core of the first photonic-crystal device and is capable of operation with a near-diffraction-limited output beam having $M^2<1.2$.

In some embodiments, the first optical device is a first photonic-crystal fiber and the first waveguide is a first core of the first photonic-crystal device and is capable of outputting linearly polarized pulses having a peak power of at least about 100 kW and a degree of polarization of at least 15 dB (wherein the degree of polarization is a value of ten times the log (base 10) of the ratio of optical power along the polarization axis to the optical power along the orthogonal axis).

In some embodiments, the first optical device is a first photonic-crystal fiber and the first waveguide is a first core of the first photonic-crystal device and is capable of outputting linearly polarized pulses having a peak power of at least about 100 kW with a near-diffraction-limited output beam having $M^2<1.2$.

In some embodiments, the first optical device is a first photonic-crystal fiber and the first waveguide is a first core of the first photonic-crystal device and is capable of outputting linearly polarized pulses having a peak power of at least about 100 kW with a near-diffraction-limited output beam having $M^2<1.2$ and having a degree of polarization of at least 15 dB (wherein the degree of polarization is a value of ten times the log (base 10) of the ratio of optical power along the polarization axis to the optical power along the orthogonal axis).

In some embodiments, the first optical device is a first photonic-crystal rod having an outer diameter of at least about 1 mm and the first waveguide is a first core of the first photonic-crystal device and has a diameter of at least 50 microns.

Some embodiments further include a second photonic-crystal optical device that includes a core that maintains a single transverse mode, wherein the core is surrounded by a cladding to contain pump light so the pump light can enter the core over its length, a first optical-connector subassembly operatively coupled between the second photonic-crystal optical device and the first photonic-crystal optical device, wherein the first optical-connector subassembly directs pump light into the second photonic-crystal optical device in a counter-propagating direction relative to signal light, and directs signal light from the second photonic-crystal optical device to the first photonic-crystal optical device, and a master-oscillator subsystem operable to obtain a seed laser signal, wherein the master-oscillator subsystem includes a first optical isolator and a first narrow-bandwidth band-pass optical filter, and is operable to obtain a narrow-linewidth, single-frequency seed laser signal optically coupled to the core of the second photonic-crystal optical device through the first optical isolator and the first narrow-bandwidth band-pass optical filter.

In some embodiments, the first photonic-crystal optical device includes a second waveguide that maintains a single transverse mode, wherein the first waveguide and the second waveguide are each surrounded by a cladding to contain pump light so the pump light can enter the cores over their lengths, and the apparatus further includes a first optical-connector subassembly operatively coupled between the second waveguide and the first waveguide, wherein the first optical-connector subassembly directs pump light into the cladding surrounding the second waveguide in a counter-propagating direction relative to signal light, and directs signal light from the second waveguide to the first waveguide, and a master-oscillator subsystem operable to obtain a seed laser signal, wherein the master-oscillator subsystem includes a first optical isolator and a first narrow-bandwidth band-pass optical filter, and is operable to obtain a narrow-linewidth, single-frequency seed laser signal optically coupled to the core of the second waveguide through the first optical isolator and the first narrow-bandwidth band-pass optical filter.

In some embodiments, the first photonic-crystal optical device includes a plurality of segments including a first segment and a second segment, wherein the first segment includes the first waveguide surrounded by a pump cladding and the second segment includes a second waveguide surrounded by a pump cladding, wherein the first segment and the second segment are laser welded to one another side-by-side.

In some embodiments, the present invention provides an apparatus that includes an optical waveguide having a diameter of at least about 40 microns, and photonic-crystal means for amplifying a pulsed optical beam in the waveguide to a peak power of at least about 1 MW having a spectrally narrow signal bandwidth of less than 10 GHz, and a single transverse mode.

In some embodiments, the first waveguide has a diameter of at least 70 microns.

In some embodiments, the first waveguide has a diameter of at least 100 microns.

In some embodiments, the optical waveguide is in a photonic-crystal fiber and the first waveguide is a first core of the photonic-crystal fiber, and wherein the means for amplifying includes means for outputting a near-diffraction-limited output beam having $M^2<1.2$ and linearly polarized pulses having a peak power of at least about 100 kW.

In some embodiments, the present invention provides a method that includes providing a first photonic-crystal optical device that includes a first waveguide having a diameter of at least about 40 microns, and amplifying a pulsed optical beam in the first waveguide while maintaining a single transverse mode to a peak power of at least about 1 MW and a spectrally narrow signal bandwidth of less than 20 GHz.

In some embodiments of the method, the first waveguide has a diameter of at least 70 microns. In some embodiments, the first waveguide has a diameter of at least 100 microns.

In some embodiments, the first optical device is a first photonic-crystal fiber and the first waveguide is a first core of the first photonic-crystal fiber, and wherein the amplifying includes outputting a pulsed beam having a peak power of at least 4 MW.

In some embodiments, the first optical device is a first photonic-crystal fiber and the first waveguide is a first core of the first photonic-crystal fiber, and wherein the amplifying includes outputting a near-diffraction-limited output beam having $M^2<1.2$.

In some embodiments, the first optical device is a first photonic-crystal fiber and the first waveguide is a first core of the first photonic-crystal fiber, and wherein the amplifying includes outputting linearly polarized pulses having a peak power of at least about 100 kW.

In some embodiments, the first optical device is a first photonic-crystal fiber and the first waveguide is a first core of the first photonic-crystal fiber, and wherein the amplifying includes outputting a near-diffraction-limited output beam having $M^2<1.2$ and linearly polarized pulses having a peak power of at least about 100 kW.

In some embodiments, the first optical device is a first photonic-crystal fiber and the first waveguide is a first core of the first photonic-crystal fiber, and wherein the amplifying includes outputting a near-diffraction-limited output beam having $M^2<1.2$ and linearly polarized pulses having a peak power of at least about 100 kW and having a degree of polarization of at least 15 dB.

In some embodiments, the first optical device is a first photonic-crystal rod having an outer diameter of at least about 1 mm and the first waveguide is a first core of the first photonic-crystal rod and has a diameter of at least 50 microns.

In some embodiments, the first photonic-crystal optical device includes a second waveguide that maintains a single transverse mode, and the method further includes generating a single-frequency narrow-linewidth seed laser signal light and directing the seed signal light into the first photonic-crystal optical device, directing pump light into the first photonic-crystal optical device in a counter-propagating direction relative to signal light, providing a second photonic-crystal optical device that includes a core that maintains a single transverse mode and is surrounded by a cladding to contain pump light so the pump light can enter the core over its entire length, optically coupling the narrow-linewidth, single-frequency seed laser signal to the core of the second photonic-crystal optical device, directing pump light into the second photonic-crystal optical device in a counter-propagating direction relative to signal light, amplifying the signal in the second waveguide while maintaining a single transverse mode, and directing amplified signal light from the second photonic-crystal optical device to the first photonic-crystal optical device.

In some embodiments, the first photonic-crystal optical device includes a second waveguide that maintains a single transverse mode, wherein the first waveguide and the second waveguide are each surrounded by cladding to contain pump light so the pump light can enter the cores over their lengths, and the method further includes generating a narrow-linewidth single-frequency seed laser signal, optically coupling the narrow-linewidth single-frequency seed laser signal into the second waveguide, directing pump light into the cladding around the second waveguide in a counter-propagating direction relative to signal light, directing signal light from the second waveguide to the first waveguide, amplifying an optical beam in the second waveguide while maintaining a single transverse mode, and directing signal light from the second waveguide to the first waveguide.

In some embodiments, the first photonic-crystal optical device includes a plurality of segments including a first segment and a second segment, wherein the first segment includes the first waveguide surrounded by a pump cladding and the second segment includes a second waveguide surrounded by a pump cladding, and the method further includes laser welding the first segment and the second segment to one another side-by-side.

Photonic-Crystal-Rod Amplifiers for High-Power Pulsed Optical Radiation and Associated Method In some embodiments, the present invention provides an apparatus that includes a photonic-crystal rod (PCR) having rare-earth-doped core with a diameter of at least 40 microns and an external diameter of at least 1 mm such that the rod is therefore thick enough to substantially and readily hold its shape when released, wherein the apparatus is operable to obtain optical pulses from the rod having a peak power of at least five hundred kilowatts (500 kW).

In some embodiments, the core of the PCR has a diameter of at least 50 microns.

In some embodiments, the core of the PCR has a diameter of at least 70 microns.

In some embodiments, the core of the PCR has a diameter of at least 100 microns.

In some embodiments, the apparatus is operable to obtain optical pulses from the rod having a peak power of at least two megawatts (2 MW).

In some embodiments, the apparatus is operable to obtain optical pulses from the rod having a beam-quality $M^2$ value of less than 1.5.

In some embodiments, the core of the PCR has a diameter of at least 70 microns and is Ytterbium (Yb) doped, and is operable to obtain optical pulses of peak power at least three megawatts (3 MW), a beam-quality $M^2$ value of less than 1.5, and a spectral linewidth of less than 13 GHz.

In some embodiments, the core of the PCR has a diameter of at least 100 microns and is Ytterbium (Yb) doped, and is operable to generate optical pulses of peak power at least four megawatts (4 MW), a beam-quality $M^2$ value of less than 1.5, and a spectral linewidth of less than 20 GHz.

In some embodiments, the core of the PCR is Ytterbium (Yb) doped, and is operable to generate linearly polarized optical pulses of peak power at least one hundred kilowatts (100 kW), and a degree of polarization of at least 15 dB (wherein the degree of polarization is a value of ten times the log (base 10) of the ratio of optical power along the polarization axis to the optical power along the orthogonal axis).

Some embodiments further include at least one wavelength-conversion optical medium operable to receive high-peak-power input radiation having a first wavelength from the core of the rod and to generate radiation of a different second wavelength having a peak power of at least about 100 kW through wavelength conversion.

In some embodiments, the present invention provides a method that includes providing a photonic-crystal rod (PCR) having rare-earth-doped core with a diameter of at least 50 microns and an external diameter of at least 1 mm, and amplifying optical pulses with the rod to generate pulses having a peak power of at least five hundred kilowatts (500 kW).

In some embodiments, the core of the PCR has a diameter of at least 50 microns.

In some embodiments, the core of the PCR has a diameter of at least 70 microns.

In some embodiments, the core of the PCR has a diameter of at least 100 microns.

In some embodiments, the amplifying generates optical pulses from the rod having a peak power of at least two megawatts (2 MW).

In some embodiments, the amplifying generates optical pulses from the rod having a beam-quality $M^2$ value of less than 1.5.

In some embodiments, the amplifying generates optical pulses of peak power at least three megawatts (3 MW), a beam-quality $M^2$ value of less than 1.5, and a spectral linewidth of less than 13 GHz.

In some embodiments, the amplifying generates optical pulses of peak power at least four megawatts (4 MW), a beam-quality $M^2$ value of less than 1.5, and a spectral linewidth of less than 20 GHz.

In some embodiments, the core of the PCR is Ytterbium (Yb) doped, and wherein the amplifying generates linearly polarized optical pulses of peak power at least one hundred kilowatts (100 kW), and a degree of polarization of at least 15 dB (wherein the degree of polarization is a value of ten times the log (base 10) of the ratio of optical power along the polarization axis to the optical power along the orthogonal axis).

Some embodiments further include receiving high-peak-power input radiation having a first wavelength from the PCR, and performing wavelength-conversion to generate radiation of a different second wavelength and having a peak power of at least about 100 kW.

In some embodiments, the present invention provides an apparatus that includes a photonic-crystal rod (PCR) having rare-earth-doped core with a diameter of at least 50 microns and an external diameter of at least 1 mm, and means for amplifying optical pulses with the rod to generate pulses having a peak power of at least five hundred kilowatts (500 kW).

In some embodiments, the means for amplifying generates optical pulses from the rod having a peak power of at least two megawatts (2 MW).

In some embodiments, the means for amplifying generates optical pulses of peak power at least four megawatts (4 MW), a beam-quality $M^2$ value of less than 1.5, and a spectral linewidth of less than 20 GHz.

In some embodiments, the core of the PCR is Ytterbium (Yb) doped, and the means for amplifying generates linearly polarized optical pulses of peak power at least one hundred kilowatts (100 kW), and a degree of polarization of at least 15 dB (wherein the degree of polarization is a value of ten times the log (base 10) of the ratio of optical power along the polarization axis to the optical power along the orthogonal axis).

Some embodiments further include means for performing wavelength-conversion to generate radiation of a different second wavelength and having a peak power of at least about 100 kW.

Multi-Stage Optical Amplifier Having Photonic-Crystal-Rod Waveguides and Non-Photonic-Crystal Optical Fiber Interconnects and Associated Method In some embodiments, the present invention provides an apparatus that includes an optical amplifier having a first photonic-crystal rod (PCR) that has a rare-earth-doped photonic-crystal core with a diameter of at least 40 microns and a cladding having an outer diameter of at least 1 mm, a master oscillator operable to generate a seed laser signal operatively coupled to the optical amplifier, and a first optical component having a solid-body fiber that has a signal waveguide directly optically coupled to the core of the first PCR without a free-space gap, wherein the solid-body fiber does not have a photonic-crystal structure in the optical signal path.

In some embodiments, the core of the first PCR maintains a single transverse mode, is capable of operation with a peak power of at least 500 kW and a spectrally narrow signal bandwidth of less than 20 GHz.

In some embodiments, the core of the first PCR outputs linearly polarized pulses having a peak power of at least about 100 kW and a degree of polarization of at least 15 dB (wherein the degree of polarization is a value of ten times the log (base 10) of the ratio of optical power along the polarization axis to the optical power along the orthogonal axis).

In some embodiments, the core of the first PCR has a diameter of at least 70 microns.

In some embodiments, the optical amplifier further includes a second PCR that has a rare-earth-doped photonic-crystal core with a diameter of at least 40 microns and a cladding having an outer diameter of at least 1 mm, and wherein the signal waveguide of the first optical component is directly optically coupled to the core of the second PCR without a free-space gap.

Some embodiments further include a substrate, wherein the first PCR and the second PCR are arranged side by side such that their cores run parallel to one another, wherein the first PCR and the second PCR are laser welded to the substrate along at least a portion of their sides.

Some embodiments further include a pump-block subassembly operatively coupled to the first PCR, wherein the pump-block subassembly directs pump light into the first PCR in a counter-propagating direction relative to signal light, and directs signal light out from the first PCR.

Some embodiments further include a pump-block subassembly operatively coupled between the second PCR and the first PCR, wherein the pump-block subassembly includes a bandpass optical filter and a dichroic mirror/beamsplitter configured to direct pump light into the second PCR in a counter-propagating direction relative to signal light, and to direct signal light from the second PCR to the first PCR through the bandpass optical filter.

In some embodiments, the present invention provides an apparatus that includes an optical amplifier having a first photonic-crystal rod (PCR) that has a rare-earth-doped photonic-crystal core with a diameter of at least 40 microns and a cladding having an outer diameter of at least 1 mm, and non-photonic-crystal means for forming an optical signal path connected to the core of the first PCR without a free-space gap.

Some embodiments further include means for amplifying optical pulses in the first PCR to a peak power of at least 500 kW and a spectrally narrow signal bandwidth of less than 20 GHz.

Some embodiments further include means for amplifying optical pulses in the first PCR to a peak power of at least about 100 kW and a degree of polarization of at least 15 dB (wherein the degree of polarization is a value of ten times the log (base 10) of the ratio of optical power along the polarization axis to the optical power along the orthogonal axis).

In some embodiments, the provided optical amplifier further includes a second PCR that has a rare-earth-doped photonic-crystal core with a diameter of at least 40 microns and a cladding having an outer diameter of at least 1 mm, wherein the non-photonic-crystal means is also connected to the core of the second PCR without a free-space gap.

In some embodiments, the present invention provides a method that includes providing an optical amplifier having a first photonic-crystal rod (PCR) that has a rare-earth-doped photonic-crystal core with a diameter of at least 40 microns and a cladding having an outer diameter of at least 1 mm, providing a master oscillator, providing a solid-body fiber that has a signal waveguide, wherein the solid-body fiber does not have a photonic-crystal structure in the optical signal path, generating a seed laser signal with the master oscillator, optically coupling the seed laser signal to the optical amplifier, and directly optically coupling the signal waveguide of the solid-body fiber to the core of the first PCR without a free-space gap.

Some embodiments further include amplifying optical pulses in the first PCR to a peak power of at least 500 kW and a spectrally narrow signal bandwidth of less than 20 GHz.

Some embodiments further include amplifying optical pulses in the first PCR to a peak power of at least about 100 kW and a degree of polarization of at least 15 dB (wherein the degree of polarization is a value of ten times the log (base 10) of the ratio of optical power along the polarization axis to the optical power along the orthogonal axis).

In some embodiments, the core of the first PCR has a diameter of at least 70 microns.

In some embodiments, the provided optical amplifier further includes a second PCR that has a rare-earth-doped photonic-crystal core with a diameter of at least 40 microns and a cladding having an outer diameter of at least 1 mm, the method further including directly optically coupling the signal waveguide of the solid-body fiber to the core of the second PCR without a free-space gap.

Some embodiments further include providing a substrate, arranging the first PCR and the second PCR side by side such that their cores run parallel to one another, and laser welding the first PCR and the second PCR to the substrate along at least a portion of their sides.

Some embodiments further include providing a pump-block subassembly, directing pump light with the pump-block subassembly into the first PCR in a counter-propagating direction relative to signal light, and directing signal light out from the first PCR.

Some embodiments further include providing a pump-block subassembly operatively coupled between the second PCR and the first PCR, wherein the pump-block subassembly includes a bandpass optical filter and a dichroic mirror/beamsplitter, optically coupling and bandpass filtering signal light from the second PCR into the first PCR using a dichroic mirror/beamsplitter and a filter, and directing pump light into the second PCR in a counter-propagating direction relative to signal light using dichroic mirror/beamsplitter.

Photonic-Crystal-Rod Optical Amplifier with Sealed-Hole Endcap and Associated Method In some embodiments, the present invention provides an apparatus that includes a photonic-crystal optical device having a core surrounded by a plurality of lengthwise holes that extend from at or near a first end of the device to at or near a second end of the device, wherein the holes are sealed at the second end of the device to form a beam-expanding endcap.

In some embodiments, the device is a first photonic-crystal rod (PCR) having an outer diameter of at least 1 mm.

In some embodiments, the holes are sealed to a distance of at least 1 mm from the second end of the first PCR device.

In some embodiments, the holes are collapsed to a distance of at least 1 mm from the second end of the first PCR device.

In some embodiments, the holes are filled with an index-matching material to a distance of at least 1 mm from the second end of the first PCR device.

In some embodiments, the endcap of the first PCR is formed to a diameter smaller than a diameter of the first PCR away from the endcap, and a facet is formed at an end of the endcap of the first PCR.

Some embodiments further include a second photonic-crystal rod having an endcap that is formed to a diameter smaller than a diameter of the second PCR away from the endcap, and having a facet formed on the endcap of the second PCR, wherein the endcap of the first PCR is placed side-by-side to the endcap of the second PCR such that the end facet of the first PCR and the end facet of the second PCR are placed at a center-to-center distance closer than the diameter of the first PCR away from the endcap of the first PCR.

Some embodiments further include a solid-glass endcap that is laser-welded to the second end of the first PCR device.

Some embodiments further include a solid-glass endcap that is fused to the second end of the first PCR device.

In some embodiments, the present invention provides an apparatus that includes a photonic-crystal optical device having a core surrounded by a plurality of lengthwise holes that extend from a first end of the device to a second end of the device, and means for sealing the holes for a distance from the second end of the device to form a beam-expanding endcap.

In some embodiments, the means for sealing includes a fiber-splicing device

In some embodiments, the device is a first photonic-crystal rod (PCR) having an outer diameter of at least 1 mm, and the means for sealing includes means for melting the holes shut to a distance of at least 1 mm from the second end of the first PCR device, and means for polishing a optical exit facet on the sealed end.

In some embodiments, the device is a first photonic-crystal rod (PCR) having an outer diameter of at least 1 mm, and the means for sealing includes means for temporarily sealing the holes at the second end with an epoxy, means for tapering a diameter of the second end, means for removing the epoxy seal, means for melting the holes shut at the second end, and means for faceting the second end.

In some embodiments, the means for sealing includes means for laser-welding a solid-glass endcap to the second end of the first PCR device.

In some embodiments, the present invention provides a method that includes providing a photonic-crystal optical device having a core surrounded by a plurality of lengthwise holes that extend from a first end of the device to a second end of the device, and sealing the holes for a distance from the second end of the device to form a beam-expanding endcap.

In some embodiments, the sealing includes melting the holes shut at the second end to form a solid-glass beam-expanding endcap.

In some embodiments, the device is a first photonic-crystal rod (PCR) having an outer diameter of at least 1 mm, and the sealing includes melting the holes shut to a distance of at least 1 mm from the second end of the first PCR device, and polishing a optical exit facet on the sealed end.

In some embodiments, the device is a first photonic-crystal rod (PCR) having an outer diameter of at least 1 mm, and the sealing includes affixing a temporary seal to the holes at the second end, reducing a diameter of the second end, removing the temporary seal, melting the holes shut at the second end, and faceting the second end.

In some embodiments, the device is a first photonic-crystal rod (PCR) having an outer diameter of at least 1 mm, and the sealing includes temporarily sealing the holes at the second end with an epoxy, tapering a diameter of the second end, removing the epoxy seal, melting the holes shut at the second end, and faceting the second end.

In some embodiments, the sealing includes sealing the holes to a distance of at least 1 mm from the second end of the first PCR device.

In some embodiments, the sealing includes collapsing the holes to a distance of at least 1 mm from the second end of the first PCR device.

In some embodiments, the sealing includes laser-welding a solid-glass endcap to the second end of the first PCR device.

In some embodiments, the sealing includes fusing a solid-glass endcap to the second end of the first PCR device.

In some embodiments, the sealing includes filling the holes with an index-matching material to a distance of at least 1 mm from the second end of the first PCR device.

Monolithic Pump Block for Optical Amplifiers and Associated Method

In some embodiments, the present invention provides an apparatus that includes an integral pump block having a signal input coupler, a signal output coupler, and a pump input coupler, wherein the pump input coupler is optically coupled to direct pump light into the signal input coupler in a counter-propagating direction relative to signal light, and the signal input coupler is optically coupled to direct signal light into the signal output coupler.

In some embodiments, the pump block further includes a glass substrate and a plurality of optical components that are laser welded to the substrate.

In some embodiments, the pump block further includes a substrate, a bandpass optical filter and a dichroic mirror/beamsplitter configured to direct pump light into the signal input coupler in a counter-propagating direction relative to signal light, and to direct signal light from the signal input coupler to the signal output coupler through the bandpass optical filter, wherein the bandpass filter and the dichroic mirror/beamsplitter are laser welded to the substrate.

In some embodiments, the pump block further includes a first lens configured to collimate signal input light from the signal input coupler toward the dichroic mirror/beamsplitter and bandpass filter and to focus pump light from the dichroic mirror/beamsplitter toward the signal input coupler, a second lens configured to collimate pump light from the pump input coupler toward the dichroic mirror/beamsplitter, and a third lens configured to focus pump light from the dichroic mirror/beamsplitter and bandpass filter toward the signal output coupler.

In some embodiments, the first, second, and third lens are laser welded to the substrate.

In some embodiments, the pump block further includes a substrate and a dichroic mirror/beamsplitter configured to direct pump light into the signal input coupler in a counter-propagating direction relative to signal light, and to direct signal light from the signal input coupler to the signal output coupler, wherein the dichroic mirror/beamsplitter is laser welded to the substrate.

In some embodiments, the pump block further includes a first lens configured to collimate signal input light from the signal input coupler toward the dichroic mirror/beamsplitter and to focus pump light from the dichroic mirror/beamsplitter toward the signal input coupler, a second lens configured to collimate pump light from the pump input coupler toward the dichroic mirror/beamsplitter, and a third lens configured to focus pump light from the dichroic mirror/beamsplitter toward the signal output coupler.

In some embodiments, the pump block further includes a substrate and a plurality of optical components that are affixed to the substrate using solder.

In some embodiments, the pump block further includes a substrate, a bandpass optical filter and a dichroic mirror/beamsplitter configured to direct pump light into the signal input coupler in a counter-propagating direction relative to signal light, and to direct signal light from the signal input coupler to the signal output coupler through the bandpass optical filter, wherein the bandpass filter and the dichroic mirror/beamsplitter are affixed to the substrate using solder.

In some embodiments, the pump block further includes a first lens configured to collimate signal input light from the signal input coupler toward the dichroic mirror/beamsplitter and bandpass filter and to focus pump light from the dichroic mirror/beamsplitter toward the signal input coupler, a second lens configured to collimate pump light from the pump input coupler toward the dichroic mirror/beamsplitter, and a third lens configured to focus pump light from the dichroic mirror/beamsplitter and bandpass filter toward the signal output coupler, wherein the first, second, and third lens are affixed to the substrate using solder.

In some embodiments, the pump block further includes a substrate, a dichroic mirror/beamsplitter configured to direct pump light into the signal input coupler in a counter-propagating direction relative to signal light, and to direct signal light from the signal input coupler to the signal output coupler, a first lens configured to collimate signal input light from the signal input coupler toward the dichroic mirror/beamsplitter and to focus pump light from the dichroic mirror/beamsplitter toward the signal input coupler, a second lens configured to collimate pump light from the pump input coupler toward the dichroic mirror/beamsplitter, and a third lens configured to focus pump light from the dichroic mirror/beamsplitter toward the signal output coupler, wherein at least one of the dichroic mirror/beamsplitter, the first lens, the second lens, and the third lens are affixed to the substrate using solder.

In some embodiments, the present invention provides an apparatus that includes an integral pump block having a signal input coupler, a signal output coupler, and a pump input coupler, wherein the pump input coupler is optically coupled to direct pump light into the signal input coupler in a counter-propagating direction relative to signal light, and the signal input coupler is optically coupled to direct signal light into the signal output coupler.

In some embodiments, the present invention provides a method that includes integrally forming a pump block having a signal input coupler, a signal output coupler, and a pump input coupler, including optically coupling the pump input coupler to direct pump light into the signal input coupler in a counter-propagating direction relative to signal light, and optically coupling the signal input coupler to direct signal light into the signal output coupler.

In some embodiments, the integrally forming includes providing a glass substrate and laser welding a plurality of optical components to the substrate.

In some embodiments, the integrally forming includes providing a glass substrate, a bandpass optical filter, and a dichroic mirror/beamsplitter, and laser welding the bandpass optical filter and the dichroic mirror/beamsplitter to the substrate so as to direct pump light into the signal input coupler in a counter-propagating direction relative to signal light, and to direct signal light from the signal input coupler to the signal output coupler through the bandpass optical filter.

In some embodiments, the integrally forming includes providing a first lens, a second lens, and a third lens, configuring the first lens to collimate signal input light from the signal input coupler toward the dichroic mirror/beamsplitter and bandpass filter and to focus pump light from the dichroic mirror/beamsplitter toward the signal input coupler, configuring the second lens to collimate pump light from the pump input coupler toward the dichroic mirror/beamsplitter, and configuring the third lens to focus pump light from the dichroic mirror/beamsplitter and bandpass filter toward the signal output coupler. In some embodiments, the integrally forming includes laser welding the first, second, and third lens to the substrate.

In some embodiments, the integrally forming includes providing a glass substrate and a dichroic mirror/beamsplitter, and laser welding the dichroic mirror/beamsplitter to the substrate so as to direct pump light into the signal input coupler in a counter-propagating direction relative to signal light, and to direct signal light from the signal input coupler to the signal output coupler.

In some embodiments, the integrally forming includes providing a first lens, a second lens, and a third lens, configuring the first lens to collimate signal input light from the signal input coupler toward the dichroic mirror/beamsplitter and to focus pump light from the dichroic mirror/beamsplitter toward the signal input coupler, configuring the second lens to collimate pump light from the pump input coupler toward the dichroic mirror/beamsplitter, and configuring the third lens to focus pump light from the dichroic mirror/beamsplitter toward the signal output coupler.

In some embodiments, the integrally forming includes laser welding the first, second, and third lens to the substrate. In some embodiments, the integrally forming includes providing a glass substrate and laser welding a plurality of optical components to the substrate.

In some embodiments, the integrally forming includes providing a substrate, a bandpass optical filter, and a dichroic mirror/beamsplitter, and affixing the bandpass optical filter and the dichroic mirror/beamsplitter to the substrate using solder so as to direct pump light into the signal input coupler in a counter-propagating direction relative to signal light, and to direct signal light from the signal input coupler to the signal output coupler through the bandpass optical filter.

In some embodiments, the integrally forming includes providing a first lens, a second lens, and a third lens, configuring the first lens to collimate signal input light from the signal input coupler toward the dichroic mirror/beamsplitter and bandpass filter and to focus pump light from the dichroic mirror/beamsplitter toward the signal input coupler, configuring the second lens to collimate pump light from the pump input coupler toward the dichroic mirror/beamsplitter, and configuring the third lens to focus pump light from the dichroic mirror/beamsplitter and bandpass filter toward the signal output coupler, wherein the first, second, and third lens are affixed to the substrate using solder.

In some embodiments, the integrally forming includes providing a first lens, a second lens, a third lens, a substrate, and a dichroic mirror/beamsplitter, configuring the dichroic mirror/beamsplitter configured to direct pump light into the signal input coupler in a counter-propagating direction relative to signal light, and to direct signal light from the signal input coupler to the signal output coupler, configuring the first lens to collimate signal input light from the signal input coupler toward the dichroic mirror/beamsplitter and to focus pump light from the dichroic mirror/beamsplitter toward the signal input coupler, configuring the second lens to collimate pump light from the pump input coupler toward the dichroic mirror/beamsplitter, and configuring the third lens to focus pump light from the dichroic mirror/beamsplitter toward the signal output coupler, wherein at least one of the configuring of the dichroic mirror/beamsplitter, the first lens, the second lens, and the third lens include affixing to the substrate using solder.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   a photonic-crystal fiber (PCF) having a hollow core; and
   a first connector,
   wherein the PCF includes a first input end and a second output end,
   wherein the first input end of the PCF is connected into a first connector,
   wherein the first connector surrounds a hollow cavity,
   wherein the first input end of the PCF is sealed, and
   wherein the apparatus further includes a first focusing light-input surface attached to the first input end of the PCF that focuses signal light into the hollow core.

2. The apparatus of claim 1, wherein the first connector includes a hollow glass ferrule.

3. The apparatus of claim 1, wherein the first connector is laser welded around the first input end of the PCF.

4. The apparatus of claim 1, wherein the first connector is attached around the first input end of the PCF by heat shrinking.

5. The apparatus of claim 1, wherein the first connector is soldered around the first input end of the PCF.

6. The apparatus of claim 1, wherein the first connector includes a focusing-lens window that is laser welded to an end of the first connector, wherein the first focusing surface is a surface of the focusing-lens window.

7. The apparatus of claim 1, wherein the first connector includes a focusing-lens window that is laser welded to an end of the first connector, wherein the first focusing surface is a surface of the focusing-lens window, and wherein the first focusing surface has an anti-reflection coating configured for wavelengths of the signal light propagating within the hollow core of the PCF.

8. The apparatus of claim 1, wherein the first input end of the PCF is fused shut to form a sealed endcap, wherein an end portion of the hollow core forms the hollow cavity that is surrounded by the first connector, wherein an outer surface of an end of the sealed endcap is shaped to form the first focusing surface, and wherein an inner surface of the end faces the hollow cavity of the sealed endcap and has an anti-reflection coating.

9. The apparatus of claim 1, wherein the first input end of the PCF is fused shut to form a sealed endcap, wherein an end portion of the hollow core forms the hollow cavity that is surrounded by the first connector, wherein an outer surface of an end of the sealed endcap is shaped to form the first focusing surface, and wherein the sealed endcap includes a coreless fiber that is fusion spliced to the first input end of the PCF.

10. The apparatus of claim 1, wherein the first input end of the PCF is fused shut to form a sealed endcap, wherein an end portion of the hollow core forms the hollow cavity that is surrounded by the first connector, wherein an outer surface of an end of the sealed endcap is shaped to form the first focusing surface, and wherein the sealed endcap includes collapsed PCF holes.

11. The apparatus of claim 1, further comprising a photonic-crystal amplifier device (PCAD) having a core diameter of at least 100 microns and configured to amplify dispersively stretched pulses, wherein the PCAD is optically coupled to deliver high-power optical pulses to the PCF, and wherein the PCF has dispersive properties tailored to recompress the amplified stretched pulses.

12. A method comprising:
providing a photonic-crystal fiber (PCF) having a hollow core, wherein the PCF includes a first input end and a second output end;
providing a first connector, wherein the first connector surrounds a hollow cavity;
connecting the first input end of the PCF into the first connector;
sealing the first input end of the PCF;
providing a first focusing light-input surface attached to the first input end of the PCF; and
focusing signal light into the hollow core using the first focusing light-input surface.

13. The method of claim 12, wherein the connecting of the first input end of the PCF includes laser welding the first connector around the first input end of the PCF.

14. The method of claim 12, wherein the connecting of the first input end of the PCF includes attaching the first connector around the first input end of the PCF by heat shrinking.

15. The method of claim 12, wherein the connecting of the first input end of the PCF includes soldering the first connector around the first input end of the PCF.

16. The method of claim 12, wherein the sealing of the first input end of the PCF and the providing of the first focusing light-input surface includes laser welding a focusing-lens window to an end of the first connector.

17. The method of claim 12, wherein the sealing of the first input end of the PCF includes fusion splicing a coreless fiber to the first input end of the PCF to form a sealed endcap, wherein an end portion of the hollow core forms the hollow cavity that is surrounded by the first connector, wherein the providing of the first focusing light-input surface includes shaping an outer focusing surface of the sealed endcap to form the first focusing light-input surface, and wherein the method further comprises anti-reflection coating an inner surface of the sealed endcap.

18. The method of claim 12, wherein the sealing of the first input end of the PCF includes fusion splicing a coreless fiber to the first input end of the PCF to form a sealed endcap, wherein an end portion of the hollow core forms the hollow cavity that is surrounded by the first connector, and wherein the providing of the first focusing light-input surface includes shaping an outer focusing surface of the sealed endcap to form the first focusing light-input surface.

19. The method of claim 12, wherein the sealing of the first input end of the PCF includes collapsing the hollow core and PCF holes of the PCF to form a sealed endcap, wherein an end portion of the hollow core forms the hollow cavity that is surrounded by the first connector, and wherein the providing of the first focusing light-input surface includes shaping an outer focusing surface of the sealed endcap to form the first focusing light-input surface.

20. An apparatus comprising:
a photonic-crystal fiber (PCF) having a hollow core, wherein the PCF includes a first input end and a second output end;
a first connector, wherein the first connector surrounds a hollow cavity;
means for connecting the first input end of the PCF into the first connector;
means for sealing the first input end of the PCF; and
means for focusing signal light into the hollow core.

\* \* \* \* \*